(12) United States Patent
Bishop et al.

(10) Patent No.: US 8,433,658 B2
(45) Date of Patent: *Apr. 30, 2013

(54) METHODS AND APPARATUS FOR CONDUCTING ELECTRONIC TRANSACTIONS

(75) Inventors: Fred A. Bishop, Glendale, AZ (US); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/086,181

(22) Filed: Apr. 13, 2011

(65) Prior Publication Data

US 2011/0191249 A1 Aug. 4, 2011

Related U.S. Application Data

(63) Continuation of application No. 12/275,924, filed on Nov. 21, 2008, now Pat. No. 7,953,671, which is a continuation-in-part of application No. 10/908,434, filed on May 11, 2005, now Pat. No. 7,505,941, which is a continuation-in-part of application No. 09/652,899, filed on Aug. 31, 2000, now Pat. No. 7,343, 351.

(60) Provisional application No. 60/151,880, filed on Aug. 31, 1999, provisional application No. 60/164,668, filed on Nov. 9, 1999, provisional application No. 60/165,577, filed on Nov. 15, 1999, provisional application No. 60/201, 635, filed on May 3, 2000.

(51) Int. Cl.
*G06Q 20/00* (2012.01)
*G06F 7/04* (2006.01)

(52) U.S. Cl.
USPC .................. 705/67; 705/66; 705/71; 705/72; 705/75; 705/76; 726/1; 726/26

(58) Field of Classification Search .................... 705/67; 726/1–36
See application file for complete search history.

(56) References Cited

U.S. PATENT DOCUMENTS

| | | | |
|---|---|---|---|
| 4,453,074 | A | 6/1984 | Weinstein |
| 4,582,985 | A | 4/1986 | Lofberg |

(Continued)

FOREIGN PATENT DOCUMENTS

| | | |
|---|---|---|
| DE | 4339460 | 11/1993 |
| EP | 0927945 | 9/1998 |

(Continued)

OTHER PUBLICATIONS

Office Action dated Aug. 27, 2012 in U.S. Appl. No. 13/086,143.

(Continued)

*Primary Examiner* — Tsan-Yu J Huang
(74) *Attorney, Agent, or Firm* — Snell & Wilmer L.L.P.

(57) ABSTRACT

A system and method for facilitating electronic transactions using an intelligent instrument is disclosed. An authorization server enables users to obtain authorization credentials through the use of the intelligent instrument by issuing a challenge to an intelligent token of the intelligent instrument. The intelligent token generates a challenge response and transmits the challenge response to the authorization server, which assembles credentials including a key for the electronic transaction upon validating the response. The authorization server sends the assembled credentials to the intelligent instrument and the intelligent instrument transmits the assembled credentials to the authorization server during a subsequent transaction. The authorization server validates the assembled credentials and provides authorization for the transaction in response to the validating the assembled credentials.

20 Claims, 16 Drawing Sheets

U.S. PATENT DOCUMENTS

| | | | |
|---|---|---|---|
| 4,747,147 A | 5/1988 | Sparrow | |
| 4,993,068 A | 2/1991 | Piosenka et al. | |
| 5,175,416 A | 12/1992 | Mansvelt et al. | |
| 5,180,902 A | 1/1993 | Schick et al. | |
| 5,193,114 A | 3/1993 | Moseley | |
| 5,245,329 A | 9/1993 | Gokcebay | |
| 5,321,751 A | 6/1994 | Ray et al. | |
| 5,438,184 A | 8/1995 | Roberts et al. | |
| 5,461,217 A | 10/1995 | Claus | |
| 5,513,272 A | 4/1996 | Bogosian, Jr. | |
| 5,521,966 A | 5/1996 | Friedes et al. | |
| 5,534,857 A | 7/1996 | Laing et al. | |
| 5,539,825 A | 7/1996 | Akiyama | |
| 5,541,582 A | 7/1996 | Wagner et al. | |
| 5,559,504 A | 9/1996 | Itsumi et al. | |
| 5,559,887 A | 9/1996 | Davis et al. | |
| 5,577,121 A | 11/1996 | Davis et al. | |
| 5,581,630 A | 12/1996 | Bonneau, Jr. | |
| 5,590,038 A | 12/1996 | Pitroda | |
| 5,590,197 A | 12/1996 | Chen et al. | |
| 5,602,918 A | 2/1997 | Chen et al. | |
| 5,604,801 A | 2/1997 | Dolan et al. | |
| 5,613,001 A | 3/1997 | Bakhoum | |
| 5,668,876 A | 9/1997 | Falk et al. | |
| 5,677,953 A | 10/1997 | Dolphin | |
| 5,721,781 A | 2/1998 | Deo et al. | |
| 5,737,439 A | 4/1998 | Lapsley et al. | |
| 5,739,512 A | 4/1998 | Tognazzini | |
| 5,742,756 A | 4/1998 | Dillaway et al. | |
| 5,742,845 A | 4/1998 | Wagner | |
| 5,757,917 A | 5/1998 | Rose et al. | |
| 5,764,789 A | 6/1998 | Pare, Jr. et al. | |
| 5,778,173 A | 7/1998 | Apte | |
| 5,787,186 A * | 7/1998 | Schroeder | 382/115 |
| 5,790,677 A * | 8/1998 | Fox et al. | 705/78 |
| 5,796,831 A | 8/1998 | Paradinas et al. | |
| 5,799,087 A | 8/1998 | Rosen | |
| 5,806,045 A | 9/1998 | Biorge et al. | |
| 5,815,252 A | 9/1998 | Price-Francis | |
| 5,815,657 A | 9/1998 | Williams et al. | |
| 5,826,241 A | 10/1998 | Stein et al. | |
| 5,832,212 A | 11/1998 | Cragun et al. | |
| 5,835,894 A | 11/1998 | Adcock et al. | |
| 5,838,812 A | 11/1998 | Pare, Jr. et al. | |
| 5,857,079 A | 1/1999 | Claus et al. | |
| 5,869,822 A | 2/1999 | Meadows et al. | |
| 5,875,432 A | 2/1999 | Sehr | |
| 5,884,271 A | 3/1999 | Pitroda | |
| 5,884,292 A | 3/1999 | Baker et al. | |
| 5,889,941 A | 3/1999 | Tushie et al. | |
| 5,892,211 A | 4/1999 | Davis et al. | |
| 5,898,838 A | 4/1999 | Wagner | |
| 5,901,239 A | 5/1999 | Kamei | |
| 5,905,908 A | 5/1999 | Wagner | |
| 5,907,620 A | 5/1999 | Klemba et al. | |
| 5,912,446 A | 6/1999 | Wong et al. | |
| 5,913,024 A | 6/1999 | Green et al. | |
| 5,915,973 A | 6/1999 | Hoehn-Saric et al. | |
| 5,917,913 A | 6/1999 | Wang | |
| 5,917,925 A | 6/1999 | Moore | |
| 5,920,058 A | 7/1999 | Weber et al. | |
| 5,920,629 A | 7/1999 | Rosen | |
| 5,920,847 A | 7/1999 | Kolling et al. | |
| 5,930,767 A | 7/1999 | Reber et al. | |
| 5,931,917 A | 8/1999 | Nguyen et al. | |
| 5,936,226 A | 8/1999 | Aucsmith | |
| 5,942,761 A | 8/1999 | Tuli | |
| 5,974,409 A * | 10/1999 | Sanu et al. | 1/1 |
| 5,987,155 A | 11/1999 | Dunn et al. | |
| 5,988,497 A | 11/1999 | Wallace | |
| 5,995,014 A | 11/1999 | DiMaria | |
| 6,012,039 A | 1/2000 | Hoffman et al. | |
| 6,012,636 A | 1/2000 | Smith | |
| 6,016,476 A | 1/2000 | Maes et al. | |
| RE36,580 E | 2/2000 | Bogosian et al. | |
| 6,041,410 A | 3/2000 | Hsu et al. | |
| 6,095,413 A | 8/2000 | Tetro et al. | |
| 6,101,477 A | 8/2000 | Hohle et al. | |
| 6,104,922 A | 8/2000 | Baumann | |
| 6,116,736 A | 9/2000 | Stark et al. | |
| 6,120,461 A | 9/2000 | Smyth | |
| 6,148,093 A | 11/2000 | McConnell et al. | |
| 6,154,879 A | 11/2000 | Pare et al. | |
| 6,199,079 B1 | 3/2001 | Gupta et al. | |
| 6,219,639 B1 | 4/2001 | Bakis et al. | |
| 6,223,984 B1 | 5/2001 | Renner et al. | |
| 6,230,288 B1 | 5/2001 | Kuo et al. | |
| 6,233,348 B1 | 5/2001 | Fujii et al. | |
| 6,240,188 B1 | 5/2001 | Dondeti et al. | |
| 6,257,486 B1 | 7/2001 | Teicher et al. | |
| 6,257,620 B1 | 7/2001 | Kenney | |
| 6,263,446 B1 | 7/2001 | Kausik et al. | |
| 6,268,788 B1 | 7/2001 | Gray | |
| 6,269,348 B1 | 7/2001 | Pare, Jr. et al. | |
| 6,272,641 B1 | 8/2001 | Ji | |
| 6,298,444 B1 | 10/2001 | Foss et al. | |
| 6,298,445 B1 | 10/2001 | Shostack et al. | |
| 6,307,956 B1 | 10/2001 | Black | |
| 6,321,337 B1 | 11/2001 | Reshef et al. | |
| 6,325,285 B1 | 12/2001 | Baratelli | |
| 6,327,578 B1 * | 12/2001 | Linehan | 705/65 |
| 6,332,193 B1 | 12/2001 | Glass et al. | |
| 6,360,953 B1 | 3/2002 | Lin et al. | |
| 6,424,249 B1 | 7/2002 | Houvener | |
| 6,446,862 B1 | 9/2002 | Mann | |
| 6,473,794 B1 | 10/2002 | Guheen et al. | |
| 6,480,825 B1 | 11/2002 | Sharma et al. | |
| 6,483,929 B1 | 11/2002 | Murakami et al. | |
| 6,491,639 B1 | 12/2002 | Turcott | |
| 6,496,594 B1 | 12/2002 | Prokoski | |
| 6,519,565 B1 | 2/2003 | Clements et al. | |
| 6,539,101 B1 | 3/2003 | Black | |
| 6,560,581 B1 | 5/2003 | Fox et al. | |
| 6,588,660 B1 | 7/2003 | Buescher et al. | |
| 6,588,673 B1 | 7/2003 | Chan et al. | |
| 6,591,249 B2 | 7/2003 | Zoka | |
| 6,601,759 B2 | 8/2003 | Fife et al. | |
| 6,601,762 B2 | 8/2003 | Piotrowski | |
| 6,609,656 B1 | 8/2003 | Elledge | |
| 6,629,591 B1 | 10/2003 | Griswold et al. | |
| 6,636,620 B1 | 10/2003 | Hoshino | |
| 6,662,166 B2 | 12/2003 | Pare, Jr. et al. | |
| 6,669,086 B2 | 12/2003 | Abdi et al. | |
| 6,681,328 B1 | 1/2004 | Harris et al. | |
| 6,697,947 B1 | 2/2004 | Matyas, Jr. et al. | |
| 6,703,918 B1 | 3/2004 | Kita | |
| 6,765,470 B2 | 7/2004 | Shinzaki | |
| 6,799,270 B1 | 9/2004 | Bull et al. | |
| 6,799,726 B2 | 10/2004 | Stockhammer | |
| 6,816,058 B2 | 11/2004 | McGregor et al. | |
| 6,819,219 B1 | 11/2004 | Bolle et al. | |
| 6,834,795 B1 | 12/2004 | Rasmussen et al. | |
| 6,873,974 B1 | 3/2005 | Schutzer | |
| 6,877,097 B2 | 4/2005 | Hamid et al. | |
| 6,898,299 B1 | 5/2005 | Brooks | |
| H2120 H | 7/2005 | Cudlitz | |
| 6,914,517 B2 | 7/2005 | Kinsella | |
| 6,925,439 B1 | 8/2005 | Pitroda | |
| 6,925,565 B2 | 8/2005 | Black | |
| 6,928,181 B2 | 8/2005 | Brooks | |
| 6,931,538 B1 | 8/2005 | Sawaguchi | |
| 6,934,861 B2 | 8/2005 | Haala | |
| 6,944,768 B2 | 9/2005 | Siegel et al. | |
| 7,010,700 B1 | 3/2006 | Foss et al. | |
| 7,096,494 B1 | 8/2006 | Chen | |
| 7,171,662 B1 | 1/2007 | Misra | |
| 7,287,271 B1 | 10/2007 | Riggins | |
| 7,502,467 B2 | 3/2009 | Brainard et al. | |
| 7,801,827 B2 | 9/2010 | Bishop et al. | |
| 7,844,550 B2 | 11/2010 | Walker et al. | |
| 7,953,671 B2 * | 5/2011 | Bishop et al. | 705/67 |
| 2001/0013546 A1 | 8/2001 | Ross | |
| 2001/0013551 A1 | 8/2001 | Ramachandran | |
| 2001/0017584 A1 | 8/2001 | Shinzaki | |
| 2001/0018660 A1 | 8/2001 | Sehr | |
| 2001/0029493 A1 | 10/2001 | Pare et al. | |
| 2001/0036301 A1 | 11/2001 | Yamaguchi et al. | |

| | | |
|---|---|---|
| 2001/0036835 A1 | 11/2001 | Leedom, Jr. |
| 2001/0053239 A1 | 12/2001 | Takhar |
| 2002/0014952 A1 | 2/2002 | Terranova |
| 2002/0030581 A1 | 3/2002 | Janiak et al. |
| 2002/0043566 A1 | 4/2002 | Goodman et al. |
| 2002/0062249 A1 | 5/2002 | Iannacci |
| 2002/0062284 A1 | 5/2002 | Kawan |
| 2002/0062291 A1 | 5/2002 | Zoka |
| 2002/0066784 A1 | 6/2002 | Segal et al. |
| 2002/0072349 A1 | 6/2002 | Geiselman et al. |
| 2002/0073025 A1 | 6/2002 | Tanner et al. |
| 2002/0083320 A1 | 6/2002 | Vatanen |
| 2002/0087869 A1 | 7/2002 | Kim |
| 2002/0095587 A1 | 7/2002 | Doyle |
| 2002/0095588 A1 | 7/2002 | Shigematsu et al. |
| 2002/0097142 A1 | 7/2002 | Janiak et al. |
| 2002/0108062 A1 | 8/2002 | Nakajima et al. |
| 2002/0128977 A1 | 9/2002 | Nambiar et al. |
| 2002/0133725 A1 | 9/2002 | Roy et al. |
| 2002/0138351 A1 | 9/2002 | Houvener et al. |
| 2002/0140542 A1 | 10/2002 | Prokoski et al. |
| 2002/0147600 A1 | 10/2002 | Waters et al. |
| 2002/0152123 A1 | 10/2002 | Giordano et al. |
| 2002/0153424 A1 | 10/2002 | Li |
| 2002/0163421 A1 | 11/2002 | Wang et al. |
| 2002/0169673 A1 | 11/2002 | Prorock et al. |
| 2002/0178063 A1 | 11/2002 | Gravelle et al. |
| 2002/0178124 A1 | 11/2002 | Lewis |
| 2002/0178369 A1 | 11/2002 | Black |
| 2002/0179704 A1 | 12/2002 | Deaton |
| 2002/0186133 A1 | 12/2002 | Loof |
| 2002/0188855 A1 | 12/2002 | Nakayama et al. |
| 2002/0190124 A1 | 12/2002 | Piotrowski |
| 2002/0191816 A1 | 12/2002 | Maritzen et al. |
| 2003/0001006 A1 | 1/2003 | Lee |
| 2003/0004866 A1 | 1/2003 | Huennekens et al. |
| 2003/0004881 A1 | 1/2003 | Shinzaki et al. |
| 2003/0009382 A1 | 1/2003 | DArbeloff et al. |
| 2003/0037264 A1 | 2/2003 | Ezaki et al. |
| 2003/0046237 A1 | 3/2003 | Uberti |
| 2003/0046540 A1 | 3/2003 | Nakamura et al. |
| 2003/0061172 A1 | 3/2003 | Robinson |
| 2003/0074317 A1 | 4/2003 | Hofi |
| 2003/0086591 A1 | 5/2003 | Simon |
| 2003/0093187 A1 | 5/2003 | Walker |
| 2003/0097344 A1 | 5/2003 | Chaum et al. |
| 2003/0106935 A1 | 6/2003 | Burchette, Jr. |
| 2003/0112120 A1 | 6/2003 | K |
| 2003/0120626 A1 | 6/2003 | Piotroski |
| 2003/0122120 A1 | 7/2003 | Brazis et al. |
| 2003/0123714 A1 | 7/2003 | O'Gorman et al. |
| 2003/0125054 A1 | 7/2003 | Garcia |
| 2003/0132297 A1 | 7/2003 | McCall et al. |
| 2003/0149661 A1 | 8/2003 | Mitchell et al. |
| 2003/0150911 A1 | 8/2003 | Joseph |
| 2003/0152252 A1 | 8/2003 | Kondo et al. |
| 2003/0155416 A1 | 8/2003 | Macklin et al. |
| 2003/0159044 A1 | 8/2003 | Doyle et al. |
| 2003/0173408 A1 | 9/2003 | Mosher, Jr. et al. |
| 2003/0177102 A1 | 9/2003 | Robinson |
| 2003/0191949 A1 | 10/2003 | Odagawa |
| 2003/0208439 A1 | 11/2003 | Rast |
| 2003/0223625 A1 | 12/2003 | Hillhouse et al. |
| 2003/0226041 A1 | 12/2003 | Palmer et al. |
| 2003/0229793 A1 | 12/2003 | McCall et al. |
| 2003/0236704 A1 | 12/2003 | Antonucci |
| 2004/0006497 A1 | 1/2004 | Nestor et al. |
| 2004/0014457 A1 | 1/2004 | Stevens |
| 2004/0017934 A1 | 1/2004 | Kocher |
| 2004/0021552 A1 | 2/2004 | Koo |
| 2004/0024694 A1 | 2/2004 | Lawrence et al. |
| 2004/0031856 A1 | 2/2004 | Atsmon et al. |
| 2004/0041021 A1 | 3/2004 | Nugent, Jr. |
| 2004/0041690 A1 | 3/2004 | Yamagishi |
| 2004/0049687 A1 | 3/2004 | Orsini |
| 2004/0050930 A1 | 3/2004 | Rowe |
| 2004/0052406 A1 | 3/2004 | Brooks |
| 2004/0059923 A1 | 3/2004 | ShamRao |
| 2004/0061593 A1 | 4/2004 | Lane |
| 2004/0062423 A1 | 4/2004 | Doi |
| 2004/0083380 A1 | 4/2004 | Janke |
| 2004/0084524 A1 | 5/2004 | Ramachandran |
| 2004/0084542 A1 | 5/2004 | DeYoe et al. |
| 2004/0098336 A1 | 5/2004 | Flink |
| 2004/0118930 A1 | 6/2004 | Berardi et al. |
| 2004/0129787 A1 | 7/2004 | Saito et al. |
| 2004/0131237 A1 | 7/2004 | Machida |
| 2004/0133787 A1 | 7/2004 | Doughty et al. |
| 2004/0136573 A1 | 7/2004 | Sato |
| 2004/0144841 A1 | 7/2004 | Tsukamoto et al. |
| 2004/0149287 A1 | 8/2004 | Zulli |
| 2004/0155101 A1 | 8/2004 | Royer et al. |
| 2004/0158723 A1 | 8/2004 | Root |
| 2004/0161135 A1 | 8/2004 | Sano et al. |
| 2004/0165753 A1 | 8/2004 | Takhiri et al. |
| 2004/0172541 A1 | 9/2004 | Ando et al. |
| 2004/0178063 A1 | 9/2004 | Mirchi et al. |
| 2004/0188519 A1 | 9/2004 | Cassone |
| 2004/0195314 A1 | 10/2004 | Lee |
| 2004/0199469 A1 | 10/2004 | Barillova et al. |
| 2004/0202354 A1 | 10/2004 | Togino |
| 2004/0208343 A1 | 10/2004 | Golden et al. |
| 2004/0215575 A1 | 10/2004 | Garrity |
| 2004/0222803 A1 | 11/2004 | Tartagni |
| 2004/0230488 A1 | 11/2004 | Beenau et al. |
| 2004/0232220 A1 | 11/2004 | Beenau et al. |
| 2004/0232224 A1 | 11/2004 | Beenau et al. |
| 2004/0233039 A1 | 11/2004 | Beenau et al. |
| 2004/0236699 A1 | 11/2004 | Beenau et al. |
| 2004/0236701 A1 | 11/2004 | Beenau et al. |
| 2004/0239480 A1 | 12/2004 | Beenau et al. |
| 2004/0240711 A1 | 12/2004 | Hamza et al. |
| 2004/0255168 A1 | 12/2004 | Murashita et al. |
| 2004/0257196 A1 | 12/2004 | Kotzin |
| 2005/0001711 A1 | 1/2005 | Doughty et al. |
| 2005/0005172 A1 | 1/2005 | Haala |
| 2005/0018658 A1 | 1/2005 | Ikeda et al. |
| 2005/0020304 A1 | 1/2005 | Shinzaki |
| 2005/0021457 A1 | 1/2005 | Johnson et al. |
| 2005/0033687 A1 | 2/2005 | Beenau et al. |
| 2005/0033688 A1 | 2/2005 | Peart et al. |
| 2005/0033992 A1 | 2/2005 | Inabe |
| 2005/0036665 A1 | 2/2005 | Higuchi |
| 2005/0054438 A1 | 3/2005 | Rothschild et al. |
| 2005/0058262 A1 | 3/2005 | Timmins et al. |
| 2005/0065842 A1 | 3/2005 | Summers |
| 2005/0065872 A1 | 3/2005 | Moebs et al. |
| 2005/0087597 A1 | 4/2005 | Gotfried et al. |
| 2005/0091325 A1 | 4/2005 | Kuwana et al. |
| 2005/0097038 A1 | 5/2005 | Yu et al. |
| 2005/0098621 A1 | 5/2005 | De Sylva |
| 2005/0100199 A1 | 5/2005 | Boshra |
| 2005/0102524 A1 | 5/2005 | Haala |
| 2005/0103839 A1 | 5/2005 | Hewel |
| 2005/0116024 A1 | 6/2005 | Beenau et al. |
| 2005/0122209 A1 | 6/2005 | Black |
| 2005/0125343 A1 | 6/2005 | Mendelovich |
| 2005/0137977 A1 | 6/2005 | Wankmueller |
| 2005/0139669 A1 | 6/2005 | Arnouse |
| 2005/0149926 A1 | 7/2005 | Saltz |
| 2005/0160271 A9 | 7/2005 | Brundage et al. |
| 2005/0160790 A1 | 7/2005 | Tanaka et al. |
| 2005/0165684 A1 | 7/2005 | Jensen et al. |
| 2005/0166062 A1 | 7/2005 | Sanchez-Cifuentes |
| 2005/0169504 A1 | 8/2005 | Black |
| 2005/0171787 A1 | 8/2005 | Zagami |
| 2005/0180618 A1 | 8/2005 | Black |
| 2005/0187883 A1 | 8/2005 | Bishop et al. |
| 2005/0197923 A1 | 9/2005 | Kilner et al. |
| 2005/0211784 A1 | 9/2005 | Justin |
| 2005/0212657 A1 | 9/2005 | Simon |
| 2005/0232471 A1 | 10/2005 | Baer |
| 2005/0240778 A1 | 10/2005 | Saito |
| 2005/0251688 A1 | 11/2005 | Nanavati et al. |
| 2005/0261972 A1 | 11/2005 | Black |
| 2005/0275505 A1 | 12/2005 | Himmelstein |
| 2006/0005022 A1 | 1/2006 | Wakamori et al. |
| 2006/0005042 A1 | 1/2006 | Black |

| | | | |
|---|---|---|---|
| 2006/0034492 | A1 | 2/2006 | Siegel et al. |
| 2006/0080552 | A1 | 4/2006 | Lauper |
| 2006/0104485 | A1 | 5/2006 | Miller et al. |
| 2006/0158434 | A1 | 7/2006 | Zank et al. |
| 2006/0173291 | A1 | 8/2006 | Glossop |
| 2006/0177061 | A1 | 8/2006 | Orsini et al. |
| 2006/0190419 | A1 | 8/2006 | Bunn et al. |

FOREIGN PATENT DOCUMENTS

| | | |
|---|---|---|
| EP | 0917120 | 11/1998 |
| EP | 1017030 | 12/1999 |
| JP | 2004164347 | 6/2004 |
| JP | 2004348478 | 12/2004 |
| WO | 9606409 | 2/1996 |
| WO | 9821683 | 5/1998 |
| WO | 9845778 | 10/1998 |
| WO | 9921321 | 4/1999 |

OTHER PUBLICATIONS

USPTO; Notice of Allowance dated Sep. 15, 2008 in U.S. Appl. No. 10/908,434.
USPTO; Office Action dated Jan. 31, 2003 in U.S. Appl. No. 09/652,899.
USPTO; Final Office Action dated Oct. 15, 2003 in U.S. Appl. No. 09/652,899.
USPTO; Office Action dated Jun. 25, 2005 in U.S. Appl. No. 09/652,899.
USPTO; Final Office Action dated Feb. 17, 2005 in U.S. Appl. No. 09/652,899.
USPTO; Advisory Action dated Jul. 6, 2005 in U.S. Appl. No. 09/652,899.
USPTO; Office Action dated Oct. 12, 2005 in U.S. Appl. No. 09/652,899.
USPTO; Final Office Action dated May 9, 2006 in U.S. Appl. No. 09/652,899.
USPTO; Advisory Action dated Nov. 17, 2006 in U.S. Appl. No. 09/652,899.
USPTO; Office Action dated Feb. 9, 2007 in U.S. Appl. No. 09/652,899.
USPTO; Final Office Action dated Jun. 27, 2007 in U.S. Appl. No. 09/652,899.
USPTO; Notice of Allowance dated Dec. 28, 2007 in U.S. Appl. No. 09/652,899.
USPTO; Office Action dated Jan. 7, 2011 in U.S. Appl. No. 12/275,924.
USPTO; Notice of Allowance dated Jan. 25, 2011 in U.S. Appl. No. 12/275,924.
Transport Layer Security Working Group, "The SSL Protocol, Version 3.0", Nov. 18, 1996 (also available at http://home.netscape.com/eng/ssl3/draft302.txt).
Business Wire (press release), "Master Card E-Wallet", Jul. 11, 2000.
Obongo.com Web Site, "Obongo", Aug. 8, 2000 (Description of wallet toolbar also available at http://www.obongo.com/chabi/webSite/index.htm).
PR Newswire (press release), "Providian Launches Nation's First Clear Chip Card", Sep. 12, 2000. The Press release may be related to the art of the invention, but based upon the information in the press release, it is unclear if the press release is prior are. However, in an abundance of caution the Application desires to put the press release into the file wrapper.
Fancher, C.H., "In Your Pocket Smartcards", IEEE Spectrum, Feb. 1997, pp. 47-53.
Blythe, I., "Smarter, More Secure Smartcards", BYTE, Jun. 1997, pp. 63-64.
Leach, Dr. J., "Dynamic Authentication for Smartcards", Computers and Security, vol. 14, No. 5, 1995, pp. 385-389.
Wu et al., "Authenticating Passwords Over an Insecure Channel", Computers and Security, vol. 15, No. 5, 1996, pp. 431-439.
Manninger et al., "Adapting an Electronic Purse for Internet Payments", ACISP '98 Proceedings, Jul. 13-15, 1998, pp. 205-214.
Yan et al., "Banking on the Internet and Its Applications", Proc. 13th Annual Hawaii Inter. Conf. on System Sciences, vol. 4, 1997, pp. 275-248.
Turban et al., "Using Smartcards in Electronic Commerce", Proc. 31st Annual Hawaii Inter. Conf. on System Sciences, vol. 4, 1998, pp. 62-69.
Dhem et al., "SCALPS: Smart Card for Limited Payment Systems", IEEE Micro, Jun. 1996, pp. 42-51.
Smith, M.T., "Smart Cards: Integrating for Portable Complexity", Computer-Integrated Engineering, Aug. 1998, pp. 110-115.
Greer et al., Token-Mediated Certification and Electronic Commerce, Nov. 18-21, 1996, pp. 13-22.
Gobioff et al., "Smart Cards in Hostile Environments", Proc. 2nd USENIX Workshop in Electronic Commerce, Nov. 18-21, 1996, pp. 23-28.
Goldman, J., "Internet Security, The Next Generation, When Software Encryption is not Enough", Web Techniques, Nov. 1997, pp. 43-46.
Simmons, J., "Smart Cards Hold the Key to Secure Internet Commerce", EC World, Dec. 1998, pp. 36-38.
Wayner, P., "Digital Cash", AP Professional, 1996, pp. 76-83, 85-100.
"ISO Standards", available from http://www.iso.ch/projects/loading.html.
Bakker, B., "Mutual Authentication with Smart Cards", May 1999.
Kulkarni et al,"Biometrics: Speaker Verification", http://biometrics.cse.msu.edu/speaker.html, Mar. 8, 2004, 5 pages.
Evers, "Judge Dismisses FTC Suit Against Rambus", IDG New Service, http://www.infoworld.com/article/04/02/18/HNjudgedismisses_1.html, Feb. 28, 2004, 3 pages.
Krakow, "Credit on Your Key Ring, Buy Gas at Mobil, Exxon and Soon Burgers at McDonald's", MSNBC, http://www.msnbc.msn.com/id/3072638, Feb. 18, 2004, 4 pages.
"International Biometric Group—Voice Recognition Technology: How It Works", http://www.ibgweb.com/reports/public/reports/voice-scan_tech.html, Feb. 18, 2004, 1 page.
"The Henry Classification System", International Biometric Group, 7 pages.
"Individual Biometrics—Hand Geometry", http://ctl.ncsc.dni.us/biomet%20web/BMHand.html, Feb. 18, 2004, 2 pages.
"Individual Biometrics—Retinal Scan", http:ctl.ncsc.dni.us/biomet%20webIBMRetinal.html, Feb. 18, 2004, 2 pages.
"Individual Biometrics—Iris Scan", http:ctl.ncsc.dni.us/biomet%20web/BMIris.html, Feb. 18, 2004, 2 pages.
"Individual Biometrics—Vascular Patterns", http:ctl.ncsc.dni.us/biomet%20webIBMVascular.html, Feb. 18, 2004, I page.
"Individual Biometrics—Fingerprint", http:ctl.ncsc.dni.us/biomet%20web/BMFingerprint.html, Feb. 18, 2004, 3 pages.
"Fingerprint Technology—Indentix Inc.—Empowering Identification™—Understanding Biometrics", http://www.identix.com/newsroom/news_biometrics_finger.html, Feb. 18, 2004, 1 page.
"Individual Biometrics—Facial Recognition", http:ctl.ncsc.dni.us/biomet%20web/BMfacial.html, Feb. 18, 2004, 2 pages.
"Fingerprint Analysis—The Basics", http://www.crimtrac.gov.au/fingerprintanalysis.htm, Feb. 18, 2004, 3 pages.
Luettin, "Visual Speech and Speaker Recognition", Jun. 30, 2000, http://herens.idiap.ch/~luettin/luettin-thesis.bib.abs.html, 1 page.
Hurley et al., "Automatic Ear Recognitionby Force Field Transformations", The Institution of Electrical Engineers, 2000, pp. 7/1-7/5.
Bowman, "Everything You Need to Know About Biometrics", Identix Croproation, Jan. 2000, 8 pages.
Harris, "How Fingerprint Scanners Work", http:computer.howstuffworks.com/fingerprint-scanner.htm/printable, Feb. 18, 2004, 6 pages.
Bonsor, "How Facial Recognition Systems Work", http://computer.howstuffworks.com/facial-recognition.htm/printable, Feb. 18, 2004, 6 pages.
Ross et al, "Biometrics: Hand Geometry", http://biometrics.cse.msu.edu/hand_geometry.html, Feb. 26, 2004, 2 pages.
Korotkaya, "Biometric Person Authentication: Odor", Department of Information Technology, Laboratory of Applied Mathematics, Lappeenranta University of Technology, 18 pages.
"ISO Magnetic Stripe Card Standards", http://www.cyberd.co.uklsupport./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

"Smart Card Technology and Applications"; http://disc.cba.uh.edu/~rhirsch/fall96/lara.htm.

McPherson, "The Evolution of Mobile Payment", Financial Insights, Feb. 2, 2004, http://www.banktech.com.lstory/mews showArticle/jhtml?article ID=17601432, 2 pages.

Docmemory, "RFIO Take Priority With Wal-Mart", http://www.simmtester.com/page/news/shownews.asp?num=6550, Feb. 9, 2004, 2 pages.

Rohde, "Microsoft, IBM and Phillips Test RFID Technology", IDG New Service, http:www.computerweekly.com/ArticleI27889.htm, Feb. 9, 2004, 3 pages.

"Pay by Touch Press Releases", http://www.paybytouch.com/press.html, 02/1012004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

Wilson, "Putting Their Finger on It", http://sanfrancisco.bizjournals.com/sanfrancisco/stories/2003/10/20/story6.html?t=printable, Feb. 9, 2004, 2 pages.

Roberti, "TI Embraces Prox Card Standard", Mar. 6, 2003, http://www.ti.com/tiris/docs/in-the-news/2003/3-6-03.shtml, 2 pages.

"Paying It by Ear", The Guardian, Jan. 18, 2003, http://money.guardian.co.uk/creditanddebt/creditcards/story/0,1456,876908,00.html, 3 pages.

Pay by Touch—Company, http://www.paybytouch.com/company.html.

"Identix Inc.—Empowering Identification™—Understanding Biometrics", http://www.identix.com/newsroom/news_biometrics_face.html, 1 page.

"International Biometric Group—Signature Biometrics: How It Works", http://www.ibgweb.com.lreports/publicreports/signature-scan_tech.html, Feb. 18, 2004, 1 page.

USPTO; Notice of Allowance dated May 20, 2010 in U.S. Appl. No. 10/821,379.

USPTO; Office Action dated Nov. 19, 2009 in U.S. Appl. No. 10/821,379.

USPTO; Advisory Action dated Sep. 1, 2009 in U.S. Appl. No. 10/821,379.

USPTO; Final Office Action dated Jun. 11, 2009 in U.S. Appl. No. 10/821,379.

USPTO; Office Action dated Dec. 5, 2008 in U.S. Appl. No. 10/821,379.

USPTO; Advisory Action dated Oct. 16, 2008 in U.S. Appl. No. 10/821,379.

USPTO; Final Office Action dated Jul. 31, 2008 in U.S. Appl. No. 10/821,379.

USPTO; Office Action dated Jan. 24, 2008 in U.S. Appl. No. 10/821,379.

USPTO; Final Office Action dated Jul. 26, 2007 in U.S. Appl. No. 10/821,379.

USPTO; Office Action dated Jan. 26, 2007 in U.S. Appl. No. 10/821,379.

USPTO; Advisory Action dated May 25, 2006 in U.S. Appl. No. 10/821,379.

USPTO; Final Office Action datedJan. 4, 2006 in U.S. Appl. No. 10/821,379.

USPTO; Office Action dated May 6, 2005 in U.S. Appl. No. 10/821,379.

USPTO; Notice of Allowance dated Mar. 22, 2012 in U.S. Appl. No. 12/859,046.

USPTO; Office Action dated Jan. 4, 2012 in U.S. Appl. No. 12/859,046.

* cited by examiner

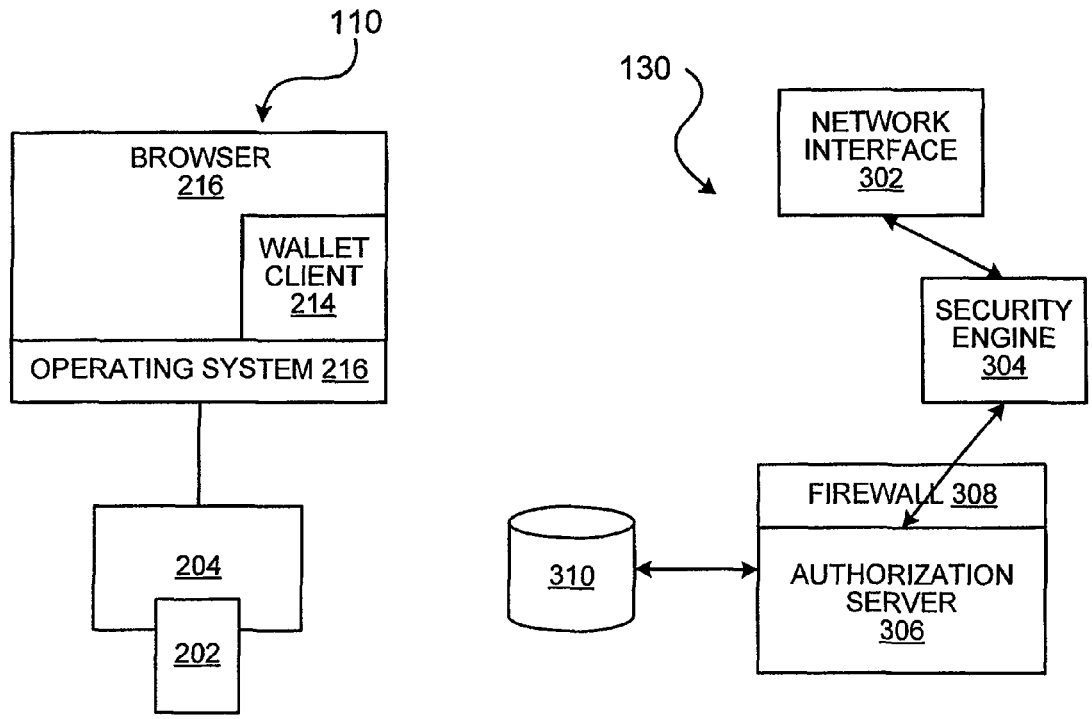
FIG. 2          FIG. 3
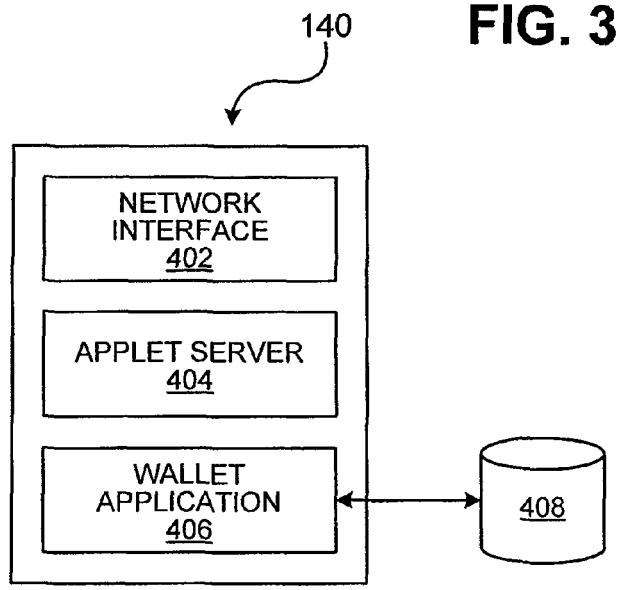
FIG. 4

FIG. 8

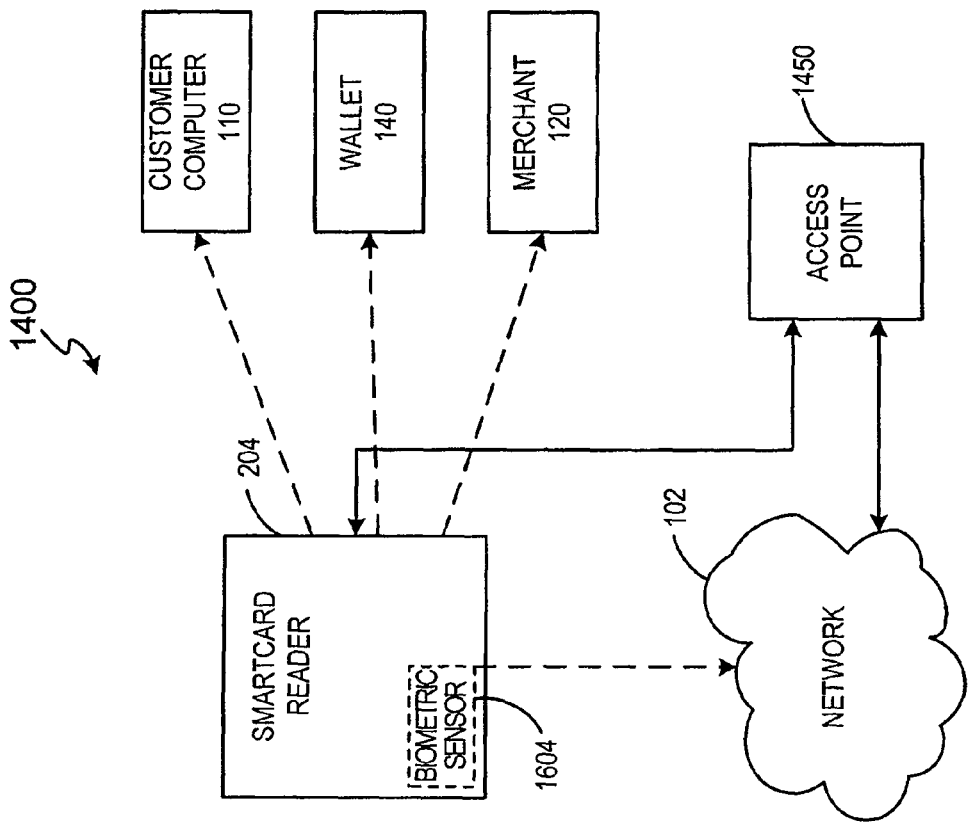
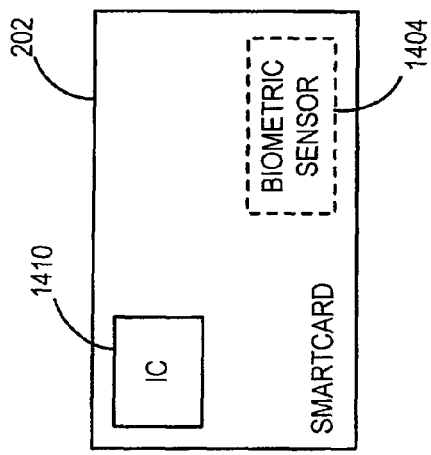
FIG. 14

METHODS AND APPARATUS FOR CONDUCTING ELECTRONIC TRANSACTIONS

CROSS REFERENCE TO RELATED APPLICATIONS

This application is a continuation of, and claims priority to, U.S. application Ser. No. 12/275,924, entitled "Methods and Apparatus for Conducting Electronic Transactions," filed Nov. 21, 2008. The '924 application is a continuation-in-part of, and claims priority to, U.S. Pat. No. 7,505,941 issued on Mar. 17, 2009 (aka U.S. application Ser. No. 10/908,434, entitled "Methods and Apparatus for Conducting Electronic Transactions Using Biometrics," filed May 11, 2005). The '941 patent is a continuation-in-part of, and claims priority to, U.S. Pat. No. 7,343,351 issued on Mar. 11, 2008 (aka U.S. application Ser. No. 09/652,899, entitled "Methods and Apparatus for Conducting Electronic Transactions," filed Aug. 31, 2000). The '351 patent claims the benefit of: U.S. Provisional Application No. 60/151,880, filed Aug. 31, 1999; U.S. Provisional Application No. 60/164,668, filed Nov. 9, 1999; U.S. Provisional Application No. 60/165,577, filed Nov. 15, 1999; and, U.S. Provisional Application No. 60/201,635, filed May 3, 2000. All of the above-listed applications are incorporated herein by reference.

FIELD OF INVENTION

The invention relates generally to methods and apparatus for conducting network transactions. More particularly, the invention relates to systems for authenticating and conducting business over data networks (such as the Internet) using a personal identifier such as a biometric.

BACKGROUND OF THE INVENTION

In recent years, many consumers have discovered the convenience and economy of purchasing goods and services electronically. A number of channels for electronic purchases (commonly called "e-purchases") are available, including shop-at-home television networks, call-in responses to television advertisements, and the like. Most recently, direct purchasing via the Internet has become extremely popular.

In a typical Internet transaction, a consumer generally identifies goods and/or services for purchase by viewing an online advertisement such as a hypertext markup language (HTML) document provided via a World Wide Web (WWW) browser. Payment typically occurs via a charge card number that is provided via a secure channel such as a secure sockets layer (SSL) connection that is established between the consumer and the merchant. A charge card account number is typically a sixteen-digit charge card number. Credit or charge card numbers typically comply with a standardized format having four spaced sets of numbers, as represented by the number "0000 0000 0000 0000". The first five to seven digits are reserved for processing purposes and identify the issuing bank, card type, etc. The last sixteenth digit is used as a sum check for the sixteen-digit number. The intermediary eight-to-ten digits are used to uniquely identify the customer. The merchant then processes the charge card number by, for example, receiving direct authorization from the card issuer, then the merchant completes the transaction. The SSL standard is described by, for example, "The SSL Protocol Version 3.0" dated Nov. 18, 1996, which is available online at http://home.netscape.com/eng/ssl3/draft302.txt, the entire contents of which are incorporated herein by reference.

Although millions of transactions take place every day via the Internet, conventional SSL transactions often exhibit a number of marked disadvantages. Although SSL typically provides a secure end-to-end connection that prevents unscrupulous third parties from eavesdropping (e.g., "sniffing") or otherwise obtaining a purchaser's charge card number, the protocol does not provide any means for ensuring that the charge card number itself is valid, or that the person providing the card number is legally authorized to do so. Because of the high incidence of fraud in Internet transactions, most charge card issuers consider network transactions to be "Card Not Present" transactions subject to a higher discount rate. Stated another way, because of the increased risk from "Card Not Present" transactions, most charge card issuers charge the merchant a higher rate for accepting card numbers via electronic means than would be charged if the card were physically presented to the merchant.

To improve the security deficiencies inherent in transporting charge card numbers over unsecure networks, many have suggested the use of "smart cards." Smart cards typically include an integrated circuit chip having a microprocessor and memory for storing data directly on the card. The data can correspond to a cryptographic key, for example, or to an electronic purse that maintains an electronic value of currency. Many intelligent instrument schemes have been suggested in the prior art, but these typically exhibit a marked disadvantage in that they are non-standard. In other words, merchants typically must obtain new, proprietary software for their Web storefronts to accept intelligent instrument transactions. Moreover, the administration costs involved with assigning and maintaining the cryptographic information associated with smart cards have been excessive to date.

The Secure Electronic Transaction (SET) standard has been suggested to improve the security of Internet transactions through the use of various cryptographic techniques. Although SET does provide improved security over standard SSL transactions, the administration involved with the various public and private keys required to conduct transactions has limited SET's widespread acceptance. SET also requires special software for those merchants wishing to support SET transactions.

Existing digital wallet technology, such as the digital wallet technology provided by, for example, GlobeSet, Inc., 1250 Capital of Texas Highway South, Building One, Suite 300, Austin, Tex. 78746, provides a means for customers to utilize transaction card products (e.g., credit, charge, debit, smart cards, account numbers and the like) to pay for products and services on-line. In general, digital wallets are tools which store personal information (name, address, charge card number, credit card number, etc.) in order to facilitate electronic commerce or other network interactions. The personal information can be stored on a general server or at a client location (PC or Intelligent instrument) or on a hybrid of both a general server and a client server. The digital wallet general server is comprised of a Web server and a database server which centrally houses the customer's personal and credit card information, shopping preferences and profiles of on-line merchants.

In an exemplary embodiment, a digital wallet performs functions such as single sign on/one password, automatic form filling of check out pages, one- or two-click purchasing, personalization of Websites, on-line order and delivery tracking, itemized electronic receipts, and customized offers and promotions based upon spending patterns and opt-ins. More particularly, a one-click purchase activates the wallet and confirms the purchase at the same time. A two-click check out first activates the wallet, then the second click confirms the purchase.

In use, the wallet bookmark is typically clicked by the customer and an SSL session is established with the Wallet server. A browser plug-in is executed and the customer supplies an ID/password or intelligent instrument for authentication in order to gain access to the wallet data. When shopping at an on-line merchant, the appropriate wallet data is transferred from the wallet server to the merchant's Web server.

Further still, even with the use of electronic wallets and intelligent instruments, there is a desire to further safeguard electronic transactions against evolving threats. While existing systems may provide for the limited use of personal identifiers such as PINs, these PINs can easily be duplicated and/or discovered.

Thus, a new system of conducting electronic transactions is therefore desired. Such a system should provide improved security that would require the use of a personal identifier, such as a biometric to safeguard the transactions.

SUMMARY OF THE INVENTION

In exemplary embodiments of the invention, a user is provided with an intelligent instrument such as, for example, a smart card, cellular telephone, Subscriber Identity Module (SIM) card, Personal Digital Assistant (PDA), and the like. The user may use the intelligent instrument to conduct electronic transactions. The instrument contains a digital certificate and suitably authenticates with a server on the network that conducts all or portions of the transaction on behalf of the user. The user may be a purchaser conducting a purchase transaction and the server may be a wallet server that interacts with a security server to provide enhanced reliability and confidence in the transaction.

Electronic transactions, such as purchase transactions, are conducted by forwarding a challenge to an intelligent token of a client, wherein the intelligent token generates a challenge response; receiving the challenge response; assembling credentials for a transaction in response to verifying the challenge response, wherein the assembled credentials includes a key; receiving a second request from the client, wherein the second request includes at least a portion of the assembled credentials provided to the client; validating the portion of the assembled credentials with the key of the assembled credentials; and providing access to a transaction service in response to the validating.

In accordance with one embodiment, the assembled credential comprises a biometric sample. The biometric sample may include, for example, a user's voice, fingerprint, facial features, ear features, sound signature, handwriting signature, vascular patterns, DNA, hand geometry, smell, keystroke/typing features, iris, retina, and brainwaves.

The invention also may include assembling credentials, which include a key for the electronic transaction; providing at least a portion of the credentials to the user; receiving a second request from the user which includes the portion of the credentials; and validating the portion of the credentials with the key to provide access to a transaction service.

Moreover, the present invention protects a network server from an attack by: restricting access to the network server to a portion of the network server for at least a selected protocol and scanning the portion of the network server for particular characters associated with the selected protocol. The particular characters may be removed or replaced with benign characters in order to reduce the security risk posed by the selected protocol. In an exemplary embodiment, the characters can be logged in order to form a security log. The security log can be reviewed to determine whether the particular characters are hostile. Alternatively, a request may be denied.

The present invention also includes a transaction tool, such as a digital wallet used to perform purchase transactions, having an activator and a toolbar. In an exemplary embodiment, the toolbar allows a user to perform a small download of the activator and the toolbar utilizes one or more operating system controls, for example, a system tray icon. The transaction tool also includes a form fill component and an auto remember component for pre-filling forms with information previously provided by the user.

Moreover, the invention incorporates the use of limited use personal identifiers and account codes in order to limit the use of the disclosed transaction instrument. Accordingly, a user of the disclosed transaction instrument may define precise parameters governing how the transaction instrument is to be used (e.g., a single purchase, within a predefined period of time, to store a pool of account codes for the use in partial shipments, and the like.

BRIEF DESCRIPTION OF THE DRAWINGS

The above and other features and advantages of the present invention are hereinafter described in the following detailed description of exemplary embodiments to be read in conjunction with the accompanying drawing figures, wherein like reference numerals are used to identify the same or similar parts in the similar views, and:

FIG. 2 is a block diagram of an exemplary purchaser system;

FIG. 3 is a block diagram of an exemplary security system;

FIG. 4 is a block diagram of an exemplary wallet server;

FIGS. 5-8 are exemplary screen displays for an embodiment of a digital wallet formed in accordance with the present invention;

FIG. 14 illustrates an exemplary intelligent instrument transaction system in accordance with the present invention;

DETAILED DESCRIPTION

Figure 1A:
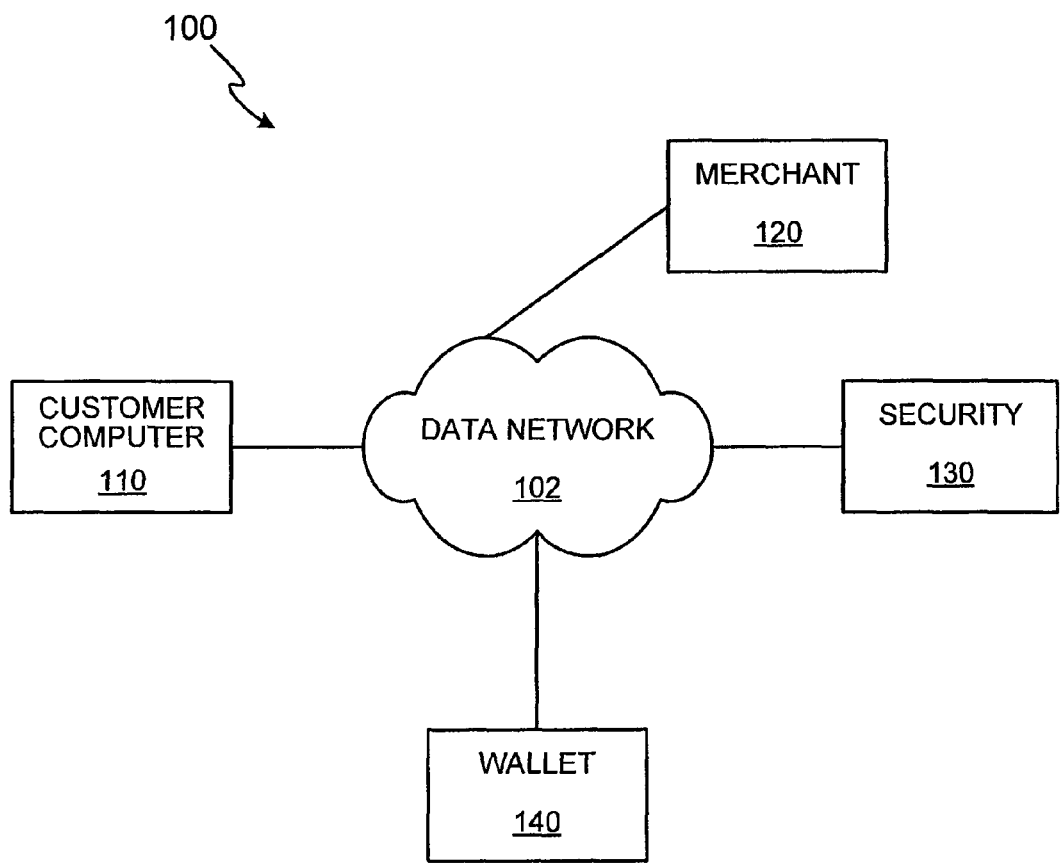
FIGS. 1A-C are block diagrams of various embodiments of an exemplary transaction system.

The present invention may be described herein in terms of functional block components and various processing steps. It should be appreciated that such functional blocks may be realized by any number of hardware and/or software components configured to perform the specified functions. For example, the present invention may employ various integrated circuit (I.C.) components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiments, the invention is frequently described as pertaining to a system of electronic commerce running over the Internet. It will be appreciated, however, that many applications of the present invention could be formulated. For example, the system could be used to authenticate users of a computer system, or to activate a passcode system, or any other purpose. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols.

Furthermore, the customer and merchant may represent individual people, entities, or business while the bank may represent other types of card issuing institutions, such as credit card companies, card sponsoring companies, or third party issuers under contract with financial institutions. The payment network includes existing proprietary networks that presently accommodate transactions for credit cards, debit cards, and other types of financial/banking cards. The payment network is a closed network that is assumed to be secure from eavesdroppers such as the American Express® network, VisaNet® network or Veriphone®.

Additionally, other participants may be involved in some phases of the transaction, such as an intermediary settlement institution, but these participants are not shown. Each participant is equipped with a computing system to facilitate transactions. The customer has a personal computer, the merchant has a computer/server, and the bank has a main frame computer; however, any of the computers may be a mini-computer, a PC server, a network set of computers, laptops, notebooks, hand held computers, set-top boxes, and the like.

Referring now to FIG. 1A, a transaction system 100 suitably includes at least one user computer 110, a transaction authorizer computer 120, a security server 130 and an optional transaction tool server 140. In various embodiments described in detail herein, the transaction system 100 is used in electronic commerce to conduct purchase transactions. Specifically, the user computer 110 is a purchaser or customer computer, the transaction authorizer computer 120 is a merchant computer and the transaction tool server 140 is a digital wallet server. It will be appreciated that although the transaction system described herein is an electronic commerce system, the present invention is equally applicable to various other electronic transaction systems.

Because the transaction system 100, as disclosed herein, helps to ensure a higher probability that a transaction is not fraudulent, transaction account issuers may offer a reduced discount rate to its member merchants. A discount rate is a fee that a merchant pays to process transaction account purchase transactions. It is common for these fees to vary based on the type of transaction. For example, a purchase over the Internet is considered a card not present transaction and caries a higher probability of fraud. The is due to the merchant not being able to physically contact with a transaction device as well as being unable to observe the customer directly. As a result, a transaction account issuer often charges a higher discount rate for card not present transactions due to the higher probability of fraudulent transactions. Therefore, the transaction system 100 may provide the transaction account issuer with a reasonable level of confidence that the likelihood of fraud is reduced through the verification of biometric data as disclosed herein.

The various computer systems and servers are interconnected as appropriate by a data network 102, which is any data network such as the Internet or another public data network. Other suitable networks 102 include the public switched telephone network (PSTN), corporate or university intranets, and the like. In various embodiments, such as the one shown in FIG. 1B, merchant computer 120 is electronically coupled to security server 130 through a data connection 152 separate from network 102. Similarly, various embodiments include a connection 150 separate from network 102 connecting the wallet server 140 and security server 130. Exemplary data connections suitable for use with connections 150 and 152 include telephone connections, ISDN connections, dedicated T1 or other data connections, wireless connections and the like. It will be appreciated that connection 150 and connection 152 may be identical connections, or each may be an entirely different form of connection in various embodiments of the invention.

Figure 1B:
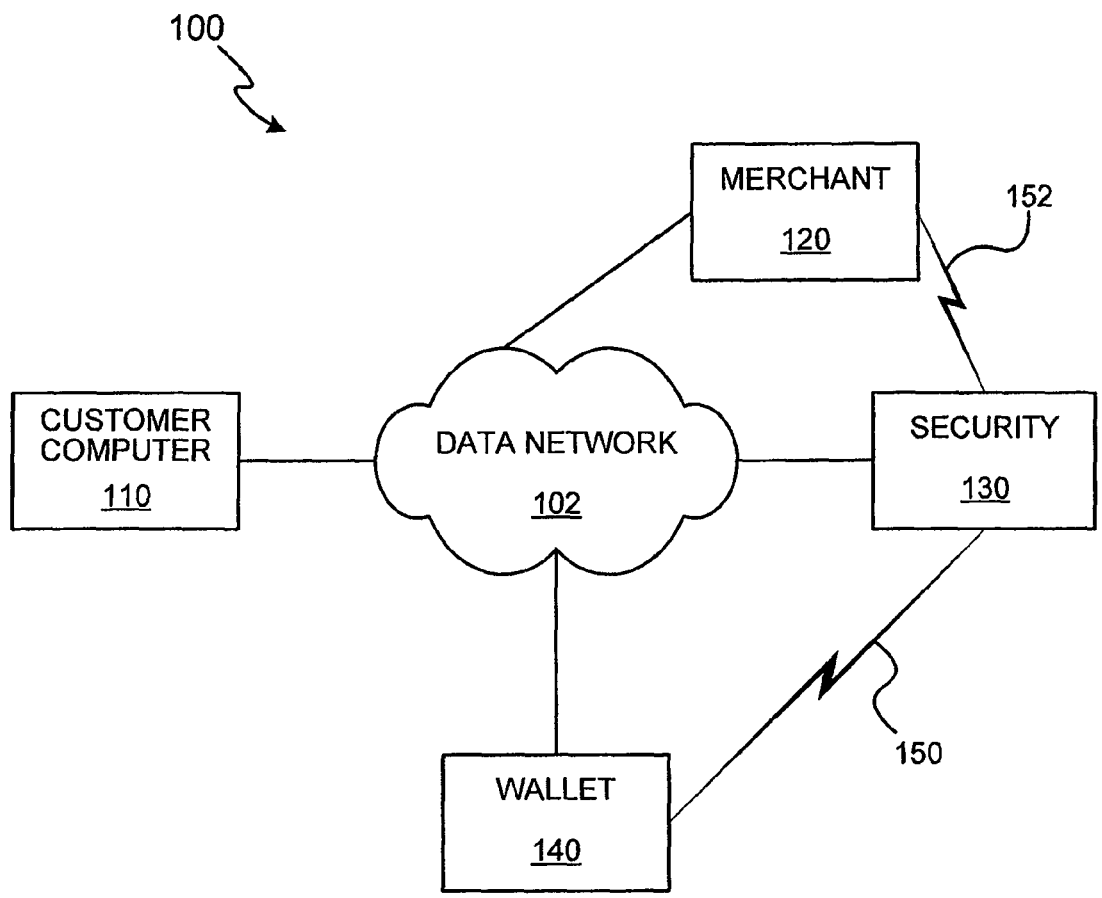
Figure 1C:
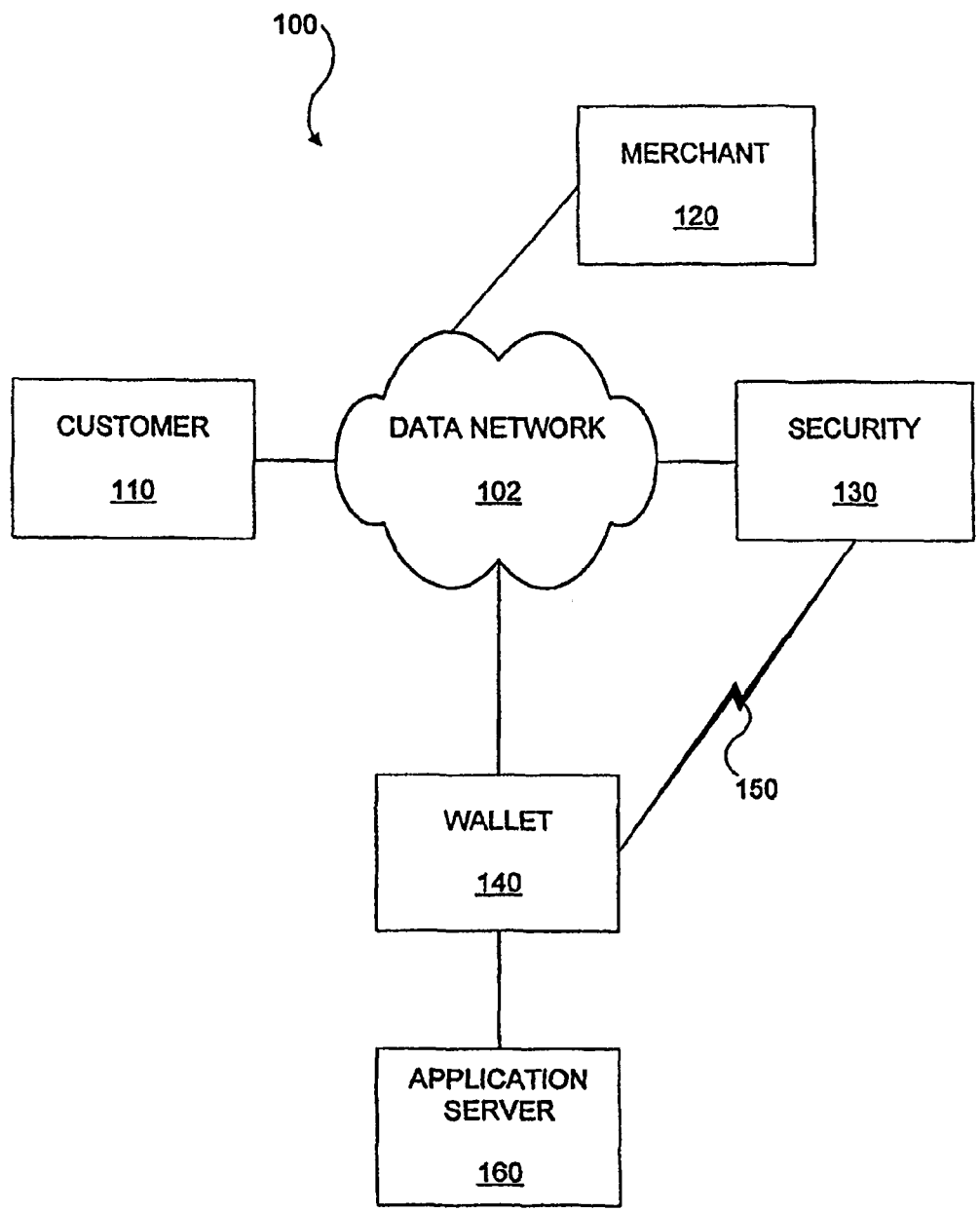

Various embodiments, such as the one shown in FIG. 1C, also include an application server 160. In various embodiments, databases (not shown) and/or profile servers (not shown) may be connected to application server 160 and/or wallet server 140. Application server 160 can be used to balance the workload. Spreading the workload between digital wallet 140 and application server 160 can enhance efficiency and/or security. For example, application server 160 may perform some of the functionality performed by the Wallet server 140, such as database access. Because the application server 160 is not connected to the data network 102, security may be enhanced by having database access be performed by the application server 160 instead of the wallet server 140.

While various exemplary embodiments have been illustrated in FIGS. 1A-C, it will be appreciated that other embodiments are possible. For example, an embodiment may include connection 150 but not connection 152 or vice versa. Furthermore, components (e.g., customer 110, merchant 120, security server 130, wallet server 140 and application server 160) may be individual computers or networked groups of computers acting with similar purpose to fulfill the functions described herein. Functionality attributed to a single component may be distributed among one or more individual computers in order to fulfill the described functionality. For example, the wallet server 140, may in fact be a collection of Web servers, application servers, database servers and other types of servers.

To conduct a transaction, customer 110 suitably establishes a connection through network 102 with a merchant 120. When a purchase is to be consummated, customer 110 accesses wallet server 140. The customer 110 is then redirected to security server 130 to verify that a intelligent instrument is in the customer's possession. The intelligent instrument may include a digital certificate that uniquely identifies the card such that digital credentials relating to the transaction may be created, as described below. In various embodiments, portions of the digital credentials are returned to customer 110 and a portion is provided to wallet server 140 via secure connection 150. Customer 110 may then use the digital credentials to authenticate to a wallet server 140, which may complete the electronic transaction as a proxy for customer 110. Wallet server 140 may include functionality for completing purchase forms affiliated with merchant computer 120, for example. When merchant 120 receives a secure purchase instrument identifier from customer 110 or from wallet server 140, card authorization may take place over connection 152 as with any ordinary charge card authorization. As described above, the communications can be performed using various protocols, for example SSL or VPN and the like. Because the intelligent instrument contains identifying information that is unique to the particular card and which can be made known to the network through electronic means, a purchase transaction conducted with the intelligent instrument is more secure than a transaction conducted with an ordinary charge or credit card. A lower discount rate may be justified for the secure transaction, which may be processed by the card issuer as a "Card Present" transaction. Additionally, if the transaction is a "Card Present" transaction, the risk of fraud may be transferred from the merchant to the card issuer.

With reference now to FIG. 2, an exemplary purchaser computer 110 (also referred to as a client, customer, or user computer) is any computer system that is capable of initiating an electronic purchase transaction on data network 102. In various embodiments, purchaser computer 110 is a personal computer running any operating system 212 such as any version of the Windows operating system available from the Microsoft Corporation (Redmond, Wash.) or any version of the MacOS operating system available from the Apple Corporation (Cupertino, Calif.).

Purchaser computer 110 suitably includes hardware and/or software to allow a intelligent instrument 202 to interface with a Web browser 216 through operating system 212. Web browser 216 is any program compatible with purchaser computer 110 that communicates via network 102 such as Netscape Communicator available from the Netscape Corporation (Mountain View, Calif.), Internet Explorer available from the Microsoft Corporation (Redmond, Wash.), or the AOL Browser available from the America Online Corporation (Dulles, Va.). In various embodiments, purchaser computer 110 includes a wallet client 214, which is any computer program configured to communicate with wallet server 140. An exemplary wallet client 214 is the Microsoft Wallet, or the Globeset Wallet available from the Globeset Corporation (Austin, Tex.), although any wallet program could be used.

Wallet client 214 and browser 216 may interact with intelligent instrument 202 by sending data through operating system 212 to a card reader 204. Card reader 204 is any reader device capable of transferring information between wallet client 214 and intelligent instrument 202. In various embodiments, card reader 204 is an ISO-7816 compatible reader such as the Model GCR410 available from the Gemplus Corporation (Redwood City, Calif.), or any other suitable reader.

Intelligent instrument 202 is any device that is capable of conducting electronic transactions, such as any intelligent instrument that is compatible with the following ISO standards, all incorporated herein by reference in their entirety:

ISO/IEC 7816-1:1998 Identification cards—Integrated circuit(s) cards with contacts—Part 1: Physical characteristics;

ISO/IEC 7816-2:1999 Information technology—Identification cards—Integrated circuit(s) cards with contacts—Part 2: Dimensions and location of the contacts;

ISO/IEC 7816-3:1997 Information technology—Identification cards—Integrated circuit(s) cards with contacts—Part 3: Electronic signals and transmission protocols;

ISO/IEC 7816-4:1995 Information technology—Identification cards—Integrated circuit(s) cards with contacts—Part 4: Interindustry commands for interchange;

ISO/IEC 7816-5:1994 Identification cards—Integrated circuit(s) cards with contacts—Part 5: Numbering system and registration procedure for application identifiers;

ISO/IEC 7816-6:1996 Identification cards—Integrated circuit(s) cards with contacts—Part 6: Interindustry data elements; and ISO/IEC 7816-7:1999 Identification cards—Integrated circuit(s) cards with contacts—Part 7: Interindustry commands for Structured Card Query Language (SCQL).

An exemplary intelligent instrument 202 is a intelligent instrument in accordance with the ISO 7816 specifications including a model SLE66 chip available from the Infineon Corporation (Munich, Germany). The SLE66 chip includes a memory (such as a 16 k memory, although more or less memory could be used) and a processor running, for example, the Multos operating system (such as Multos v.4). In various embodiments intelligent instrument 202 also includes an applet for storing and processing digital certificates or other cryptographic functions. For a basic introduction of cryptography, see "Applied Cryptography: Protocols, Algorithms, And Source Code In C," by Bruce Schneier and published by John Wiley & Sons (second edition, 1996), which is hereby incorporated by reference. For example, an X.509 Java applet could be included on intelligent instrument 202 for processing an X.509 certificate stored thereon. While the embodiments described herein utilize an intelligent instrument, it will be appreciated that other intelligent tokens, for example a global system for mobile communication (GSM) mobile phone can be substituted for the intelligent instrument in various embodiments of the invention.

With reference now to FIG. 3, a security server 130 suitably includes an interface to network 102, a security engine 304 and an authorization server 306 communicating with a database 310. Network interface 302 is any program that facilitates communications on network 102, such as a Web server. In various embodiments, network interface 302 is based upon Netscape Enterprise Server, available from the Netscape Corporation (Mountain View, Calif.). Network interface 302 receives electronic messages on network 102 and routes them to security engine 304 or authorization server 306 as appropriate.

Security engine 304 and authorization server 306 may be separated by a firewall 308. Firewall 308 is any hardware or software control (such as a router access control) capable of restricting data flow between an internal and an external network (not shown). In various embodiments, security engine 304 suitably resides outside the firewall to administer data transfers between the security server 130 and the customer 110 or wallet server 140. Authorization server 306 retains valuable confidential information such as database 310, which may contain a cross-reference of x.509 certificates stored on the various intelligent instruments 202 associated with the system 100, so it may be suitably maintained on an internal network for enhanced security. It will be understood that the functionality of security engine 304 and authorization server 306 may be suitably combined or separated in various ways without departing from the scope of the present invention.

With reference now to FIG. 4, an exemplary wallet server 140 includes a network interface 402, an optional applet server 404 and a wallet application 406. Network interface 402 is any program that facilitates communications on network 102, such as a Web server. In various embodiments, network interface 402 is based upon Netscape Enterprise Server, available from the Netscape Corporation (Mountain View, Calif.). Optional applet server 404 provides server functionality for distributed programs such as Java programs or ActiveX controls. An exemplary applet server is the Java Applet Server available from Sun Microsystems (Mountain View, Calif.). Applet server 404 and network interface 402 provide support functionality for wallet application 406, which may handle login functionality, retrieve wallet data from wallet database 408, and/or administer transactions as described herein. In various embodiments of the invention, wallet server 140 may include the SERVERWALLET (a.k.a. NETWALLET) program available from the Globeset Corporation (Austin, Tex.).

Various embodiments of the invention may include an activator application that suitably helps consumers with the wallet purchase process. The activator application may present status information, for example, or may actively launch the wallet client 214 (FIG. 2) when appropriate. Additionally, the activator may maintain a local cache of sites supported by the wallet.

The activator application program may be implemented as a conventional computer application. In various embodiments, the activator application displays information as a system tray icon, as a "floating bitmap", or in any other suitable manner. The graphical representations (e.g., icons) may indicate status information such as "browsing at a supported site," "browsing at a supported checkout page," "browsing at a supported payment page," "no browser windows open," "browsing at an unsupported page," and/or the like.

A floating bitmap may be implemented with any graphical file or format, for example, a graphics interchange format (GIF) file. Alternate embodiments present information in graphical, audio, visual, audiovisual, multimedia, animated or other formats. Moreover, GIF files may be replaced with LZW files, TIFF files, animated GIF files, JPEG files, MPEG files, or any other sort of graphical, audio or multimedia format or file.

In an exemplary embodiment, the present invention is enhanced by providing a transaction tool with a window which includes controls which allow a user to more easily use the transaction tool. The transaction tool can be used for various electronic transactions. For example, purchase transactions, financial advisory transactions, insurance transactions, consumer-to-consumer transactions, such as barter transactions, transactions relating to offers and rewards, etc. The transaction tool described in detail herein is a digital wallet used for electronic purchase transactions. The digital wallet is enhanced by providing a window with controls for the customer to more easily use the wallet. In an exemplary embodiment, the present invention includes a client-side implementation for accessing digital wallet functionality ("activator") and a server-side toolbar, which allows the user to perform a small download of the activator and utilize one or more control elements of the Operating System User Interface, for example, a Microsoft Windows system tray icon.

The activator is object code that runs on the user's computer and contains routines for accessing the wallet server. The activator can generate events and the activator contains procedural logic which allows for communication with the wallet server in response to specific user and system actions or events. In an exemplary embodiment, the activator presents a single graphical element, for example an icon which in a Microsoft Windows embodiment appears as a Windows system tray icon, and which enables the user to trigger the appearance of the wallet toolbar. In various embodiments, the wallet toolbar is, in effect, a special browser window that accesses the wallet server. The activator communicates with the wallet server to automate the update of the activator object code, via a small download. In an exemplary embodiment, the user is queried for a confirmation prior to performing the activator download. In various embodiments, the activator communicates with applications other than the wallet, for example, offers of rewards.

The system provides the content of relevant options on each of its web pages, namely dynamic and contextual information that is specific to each page viewed by the user. This is accomplished by the activator monitoring URLs and potentially keying on pages so that the user can be made aware of potential opportunities. For example, the activator can check to see if the user is viewing a merchant site and present applicable offers (e.g., discount on merchandise, etc.) to the user. The activator can also monitor versions of software on the user's system and inform the user of possible upgrade versions. In an exemplary embodiment, the system is implemented on any network, such as a WAN, LAN, Internet, or on any personal computer, wireless electronic device or any other similar device. The system can be implemented on an operating system, for example Microsoft Windows, Mac OS, Linux, Windows CE, Palm OS, and others.

Figure 5:
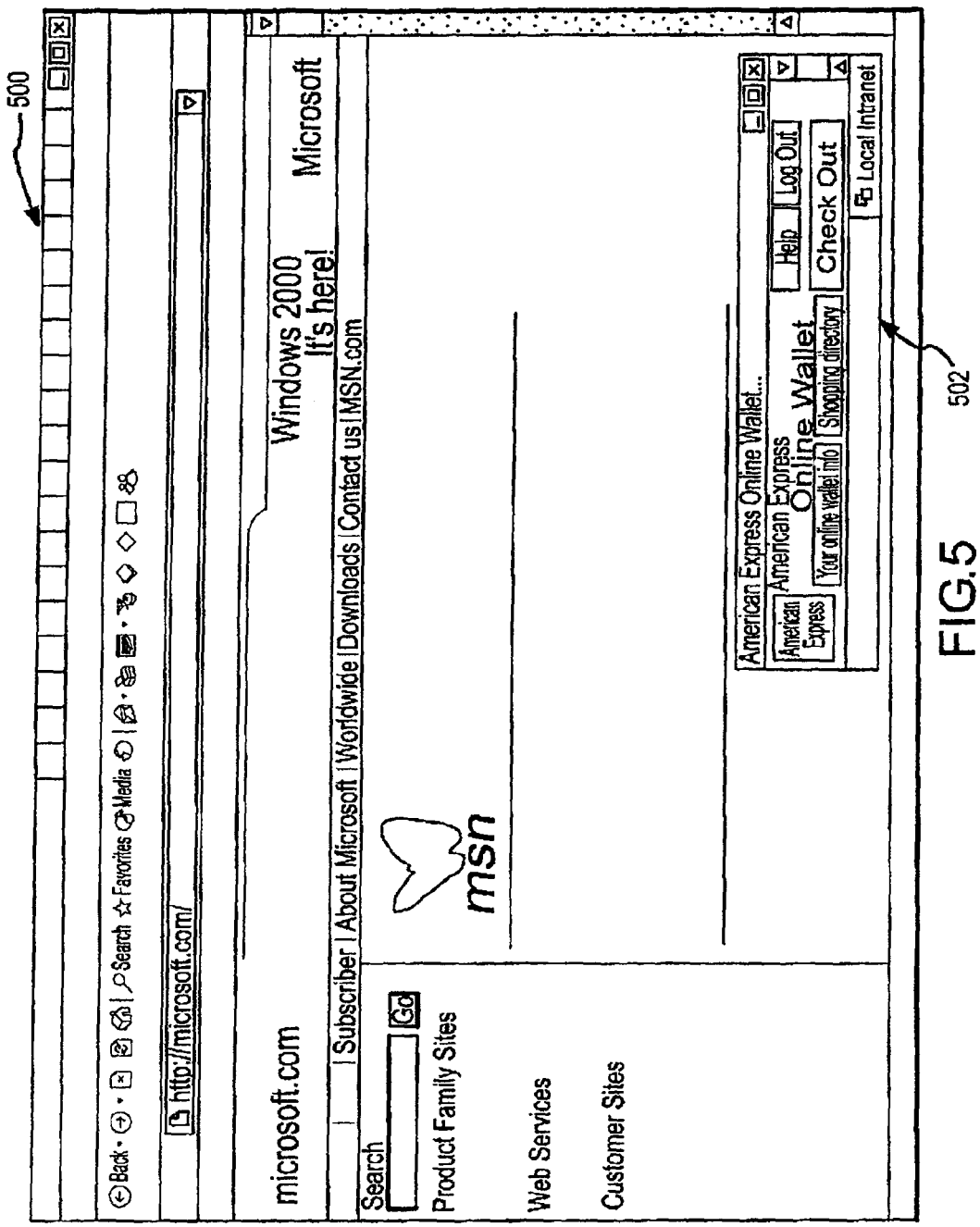

The activator, which may be implemented on the client side, allows the user 110 to be in constant or intermittent communication with the digital wallet 140 issuer, for example, American Express, without having to have intrusive windows taking up space on the user's display. As described above, this allows the wallet issuer to monitor and present possible items of interest to the user at appropriate times. The configurable controls presented in the window allow the customer to quickly navigate to desired Web sites, and to immediately invoke desired functionality such as digital shopping cart checkout. In an exemplary embodiment, the client toolbar may be a discrete window that associates with the user's browser window, and maintains a geometry that effectively renders it a part of the user's browser. Although when the user clicks on its controls, the window remains in its original state, namely the window directs the browser window to visit desired URLs and invoke specific actions (such as, use of the digital wallet). For example, after selecting a digital wallet icon from the system tray, the digital wallet toolbar 502 is displayed as a discrete window that is associated with the user's browser window 500 as shown in FIG. 5. In an alternative embodiment, the client toolbar frames the existing wallet window, providing the additional controls as described above in an extension of the window area which is provided by an existing wallet. In another alternative embodiment, the area is divided in the user's standard browser window to create an area that can be used for wallet and the other controls described above.

The system may be configured to provide a convenient way for customers to not only visit favorite URLs, but also to invoke specific functionality that might otherwise incur many steps, and which might change as the vendors' sites are continually updated. The system also may provide a simpler user experience by making the wallet and e-commerce sites not only easy to use, but by making the wallet and client toolbar easy to find. When a user has many different windows open, finding the wallet window can be difficult and annoying, especially as different browser windows seize GUI focus during the course of normal navigation and interaction with sites. As such, use of the system tray icon and server side functionality provides a superior user experience. In an exemplary embodiment, the present system works with any known in the art browser, such as Netscape Navigator.

While prior art systems may simply provide a customizable portal (e.g., MyAmericanExpress.com) that allows a user to visit the page and then traverse links from that page, an exemplary embodiment of the present invention suitably provides a window with controls that will stay on the users' desktop as they navigate throughout the Web. Additionally, the client toolbar provides a means of automating actions for the user, where these actions take place on third party e-commerce sites. Moreover, prior art systems may utilize a separate browser window to render the wallet controls, but the present invention utilizes a standard browser window which has been divided to provide an area for the wallet to occupy. For example, in an exemplary embodiment, a digital wallet icon is available to the user as a system tray icon (not shown). Upon invocation of the digital wallet icon, the digital wallet toolbar 502 is displayed as shown in FIG. 5. The digital wallet toolbar is unobtrusive while including controls which allow the user to utilize the digital wallet. In an exemplary embodiment, the toolbar 502 is associated with the browser window 500.

Figure 6:
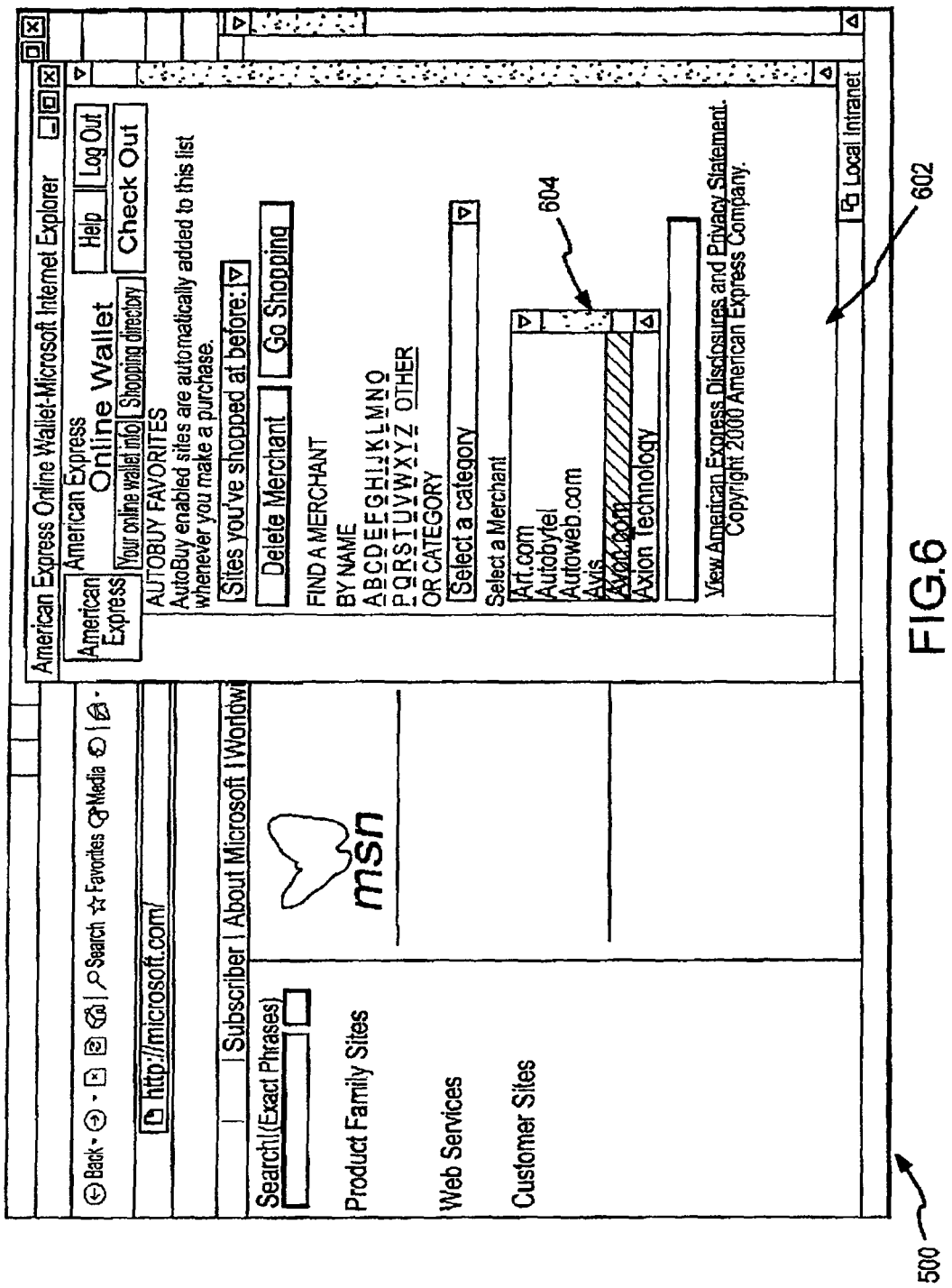
Figure 7:
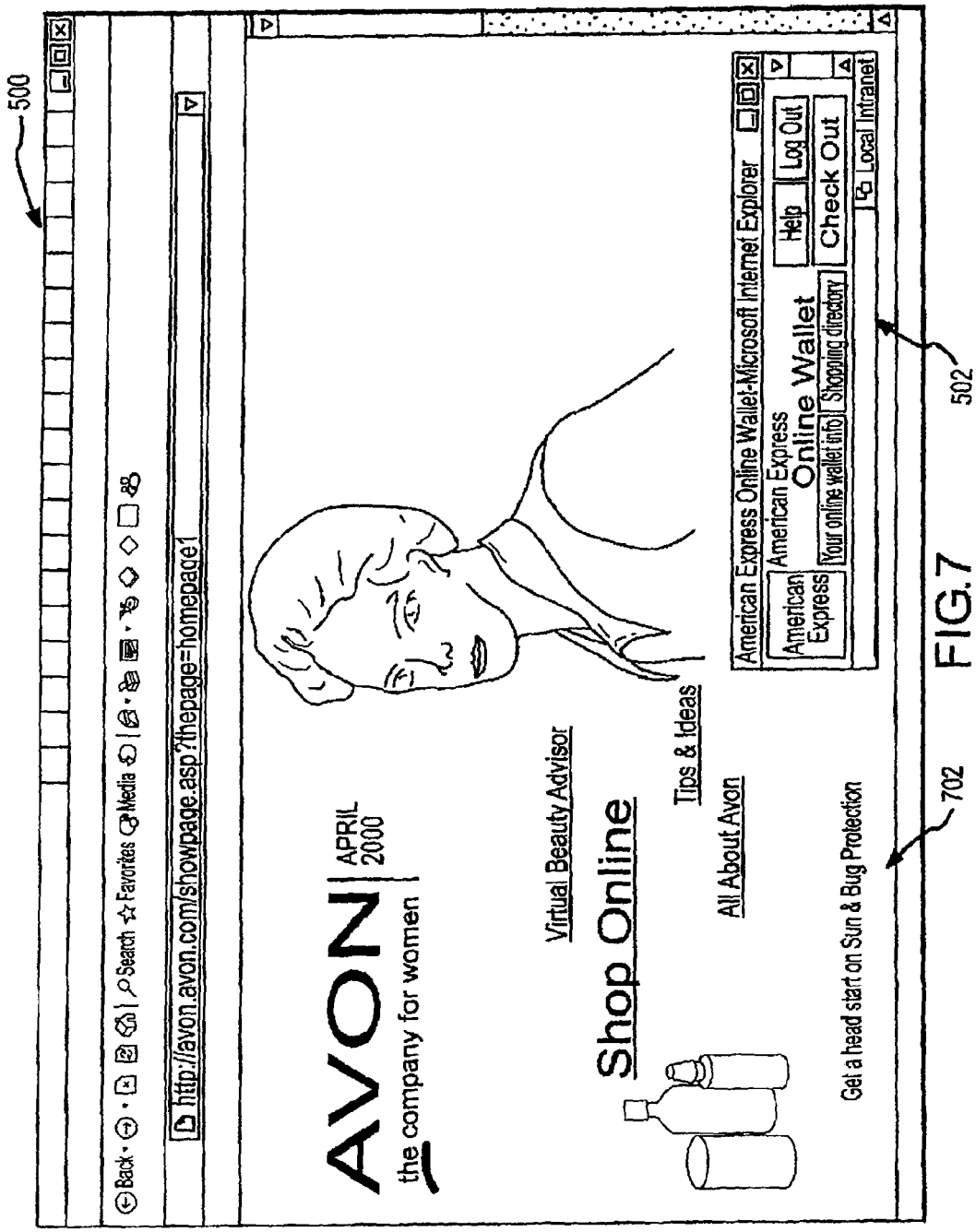

As shown in FIG. 6, if the user selects a shopping directory button from the toolbar 502, the toolbar expands to a shopping directory page 602. The user can select a merchant from the list of merchants 604 displayed in the shopping directory page 602. Upon selecting a merchant from the list of merchants 604, the digital wallet takes the user to the selected merchant site 702, such as is shown in FIG. 7. In an exemplary embodiment, when the digital wallet takes a user to a merchant site 702, the toolbar 502 returns to its normal size.

Figure 8:
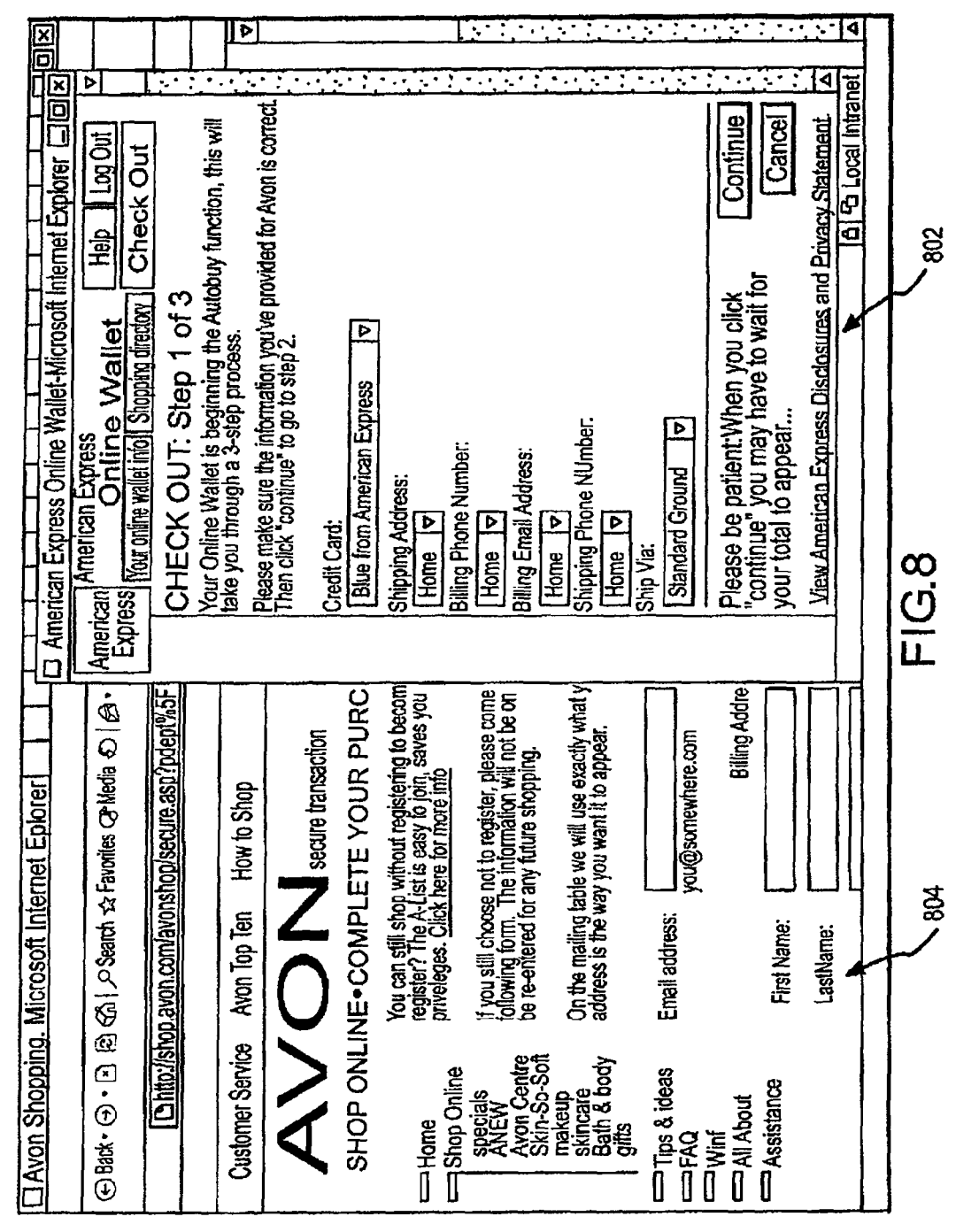

When the user makes a purchase from a merchant, for example by placing items in a shopping cart and proceeding to checkout at the merchant's site, the checkout function is performed, in part, by the digital wallet of the present invention. As shown in FIG. 8, when the user indicates a desired purchase at a merchant site 702, the checkout user interface 802 of the digital wallet is displayed. For example, the checkout display 802 appears in one side of the browser window, while the merchant window 702 is still displayed on the opposite side of the browser window. Much of the information that a user would normally have to enter at the merchant checkout (for example, name, address, e-mail address, credit card information, etc.) is already known by the digital wallet and is pre-filled in the digital wallet checkout window 802. In an exemplary embodiment, the user can edit the pre-filled information.

In an exemplary embodiment, the present system also includes methods and apparatus that facilitate the reliable population of HTML forms on Web sites. The end result is that users can identify information content that they wish to provide to sites in a general manner, independent of the actual appearance, labeling, and behaviors of various e-commerce Web sites. In an exemplary embodiment, the present invention includes an "auto-remember" component that allows a user to capture data that is entered and a "form fill" component which includes a powerful set of processes that results from the combination of several different models of sites and users.

The present invention collects information from users, storing it securely and reliably on a server, and then provides it to appropriate form fields under the user's direction. The system maintains mappings of user information to the various HTML form fields of sites that are of interest to the user. This information can then direct how HTML forms are to be filled (or pre-filled) for users who wish to interact with those sites.

With respect to the "auto-remember" feature, prior art digital wallets may implement a remember function, but it must be initiated by the user. With the present "auto-remember" feature, digital wallet users do not need to click a button to remember the form they just filled out because the present system remembers the fields that the user is submitting on a merchant window. When a form is submitted (for example, by pressing a "Submit" button or a "Buy" button), the online wallet responds by determining if the window that triggered the form submission is a merchant window of interest. If so, the wallet suitably remembers the data; otherwise, the wallet can disregard the occurrence of the form submission and continue to run as normal.

The digital wallet controls may include a button labeled "remember," or may also support an automatic remember feature that is always active. In general, fields other than those that are automatically populated by the wallet can be remembered. In this context, remembering a field means that when a user enters data into a specific field, the value will be stored by the system. The wallet component will detect field values entered in this way, and will securely transmit them to a server via the Internet. When a user next goes to this page, the wallet, in addition to populating the form with fields that are retrieved from the wallet system, will also populate the form with values that had previously been remembered. When processing the form (pre-fill), the wallet will securely retrieve field values from the server.

More particularly, with respect to the Internet Explorer browser, the invention suitably implements an ActiveX control that attaches itself to a Web page such as, for example, the American Express Online Wallet. In an exemplary embodiment, the ActiveX control contains a method that captures the browser events of all Internet Explorer browsers, so that the American Express Online Wallet can respond to these events if necessary by a JavaScript function loaded within the American Express Online Wallet, thereby allowing the system to obtain the completely downloaded document within an Internet Explorer browser. Specifically, this allows the system to capture the "Document Complete" event raised by the Internet Explorer browser which specifies when a document has finished loading. When this event is captured, the ActiveX control notifies the American Express Online Wallet by calling a JavaScript function loaded within the American Express Online Wallet. This function responds to this event by suitably communicating with the ActiveX control to capture the "Form Submit" events for all forms on all Internet Explorer browsers.

When a user fills a form on a Web page and clicks the "Submit" (i.e., any control, such as a button, that submits a form) button for that page, the American Express Online Wallet is notified by the ActiveX control calling a JavaScript function loaded within the American Express Online Wallet. The American Express Online Wallet then suitably determines if the document raising the "Submit" event is of interest by checking the URL of the window that raised the event. If the event is to be handled, the American Express Online Wallet must call a suitable function within the ActiveX control that obtains the document object model (DOM) that raised the event. The DOM can then be traversed and the form values can be saved so that they can be sent to the server for storage in memory. In an exemplary embodiment, the ActiveX control must properly detach itself from capturing the browser events and form "Submit" events so that runtime errors are minimized.

With respect to the Netscape browser, because of Netscape's implementation of events, the system captures the event from within JavaScript alone. If the system successfully obtains the "Universal Browser Write" privilege (i.e. granted by the user), the system can then successfully call a function that allows an external window to capture events of another window. The system then can traverse the document object model for all frames of that window. When doing so, the system notifies each form of the window that the system wants to capture the "Submit" event. As such, when a user fills a form on the window that the system notified and clicks the "Submit" button (i.e., any control, such as a button, that submits a form) for that page, the online wallet is notified and suitably responds. One skilled in the art will appreciate that the present invention may be implemented in any suitable transaction system, including, but not limited to any suitable digital wallet system.

With respect to the form fill function, the digital wallet, such as, for example, the American Express Online Wallet, provides a form fill functionality to aid users in populating forms. Prior art systems, such as the system provided by GlobeSet, Inc., typically use a Browser Helper Object (BHO). The BHO approach often includes disadvantages such as, for example, the Internet Explorer 5.0 browser has a bug where it will only load the first BHO specified in the registry. This is a problem for any application since it cannot be sure whether its BHO is loaded or not. Moreover, a BHO is loaded for each instance of Internet Explorer such that multiple instances of a BHO could be running at any given time—therefore eating up memory and slowing down navigation for all browsers versus only the one of interest.

The present invention may be configured to replace the BHO solution by using the same ActiveX control as specified in the "auto remember" feature. By attaching an ActiveX control to the Online Wallet Web page, the system suitably obtains the document object model for any document loaded within any given Internet Explorer browser by using, for example, the Shell Windows API. When a user clicks a "Fill Form" button on the Online Wallet, the wallet can respond by first obtaining the document object model through the ActiveX control. Next, the wallet can save the names of the fields that make up forms and send them to a heuristic engine on the server. The server will respond to this request by returning the values that should be used to fill these fields. The fields can then be filled using the same document object model obtained earlier. As such, the present invention reduces the problem of having to enter repetitive data in forms at Web sites. In addition to saving effort on part of customers, it increases accuracy of the entered data.

More particularly, the architecture of the present invention combines a server-side model of each site (e.g., fields, pages, links, etc.), server-side model of user (e.g., profile), user generated model of site (e.g., macro recording, tagging, drag and drop) model of site manually generated by system (e.g., to augment and validate the user generated models), and heuristically generated model of site (e.g., inference of semantic information about fields, actions, etc.). The present system creates and stores several distinct types of models. The first characterizes the site, for example, how do you check out, how do you add something to a shopping cart, how do you search for a type of product, how do you enter preferences (e.g., travel), etc. The second model characterizes the user, for example, what are the things that a user can do and what are the profile attributes of a user. By combining these two models, the present system creates special processes that add great flexibility and power. The system maps from the model of what a user can do, to the model of the site, wherein the site models are generated by any known method. As such, the site model can be created by the user, by the host, by the transaction card company (issuer) or even by the site provider. In an exemplary embodiment, ECML/XML can be used to represent models for the site. In various embodiments site models can be exchanged with other systems.

For example, a user may routinely visit sites of different airlines and travel services in order to purchase airline tickets. Each site typically has fields on different screens for collecting information that are relatively similar between the various sites. However, each site will use different HTML form fields that are placed on different URLs, and which may also change over time. Even though the information is very similar in nature across the different sites, there is presently no common mechanism to automate the process of populating fields for user travel preferences (e.g., seating, meals, travel times, affinity rewards, etc.). Each site may have its own profile of the user which stores much of this information. However, the user would still need to create such a profile for each site independently, given the current practice.

The present invention includes heuristics based field recognition. In this approach, field labels are identified by their spatial proximity to form fields of interest. A combination of field labels and form field HTML attributes (most notably the "name" attribute of the HTML "input," "select," and "action" elements) will be used as input to a heuristic engine that contains a dictionary to aid the identification of desired fields.

In another embodiment, the present invention includes user mediated field recognition. In this approach, the user willfully captures input via a "Remember" button or similar control that allows servers to capture information about the sequence of actions the user executes. When the user does this, he or she can effectively "play back" the actions (similar to macro scripting employed in other software systems). As such, the user's actions can be fed into the heuristic engine and also be fed directly into field mapping tables that are used by the processes of this engine.

In an exemplary embodiment, the above two approaches may need some manual interaction in order to completely create process maps and form field maps that accurately depict the navigation and form field completion possibilities that enable this invention. When necessary, human analysts will operate in a fashion similar to what occurs during user mediated field recognition, although they will provide far more information about their navigation and form filling processes than would the typical user. In all cases, the information that is gathered is used to create a process map (or detailed site map) that depicts the sequence of actions (form fill, HTTP Post, HTTP Get, etc.) by which various activities can occur. A field map will also be generated for each of the Web pages in the process map, wherein the field map defines the precise names of fields that can be used to automate form submission. State maps may also be required to track the states of users as they interact with the Web site (the state of the user, such as logged on versus not logged on, will modify the results of specific actions on the site).

In an exemplary embodiment, the process by which the user interacts can either be fully automated (in which case the user merely conveys the desire to perform a scripted action) or can be user mediated (in which case the invention can pre-fill form fields for the user, thereby affording the user the opportunity to correct, change, or complete any fields that require further data entry). In addition to the products and services described above, the enabling technology in the form of the process and field maps can be leveraged for new products and services, such as enabling companies to automate the entry of form data for their site visitors. For example, if a company compiled process and field maps for the benefit of their own customers (by any of the means described above), then the company can also license this information, services, and products to third-party customers. The sites for which these maps exist may also use the present invention such that the sites benefit by delivering a similar service to their customers who are not benefiting from the system. The underlying processes themselves will also rely on a system which acquires this information and reformats it, for example, as XML and ECML. These standard representations would form the basis of information exchange for the latter two products or services.

Figure 9:
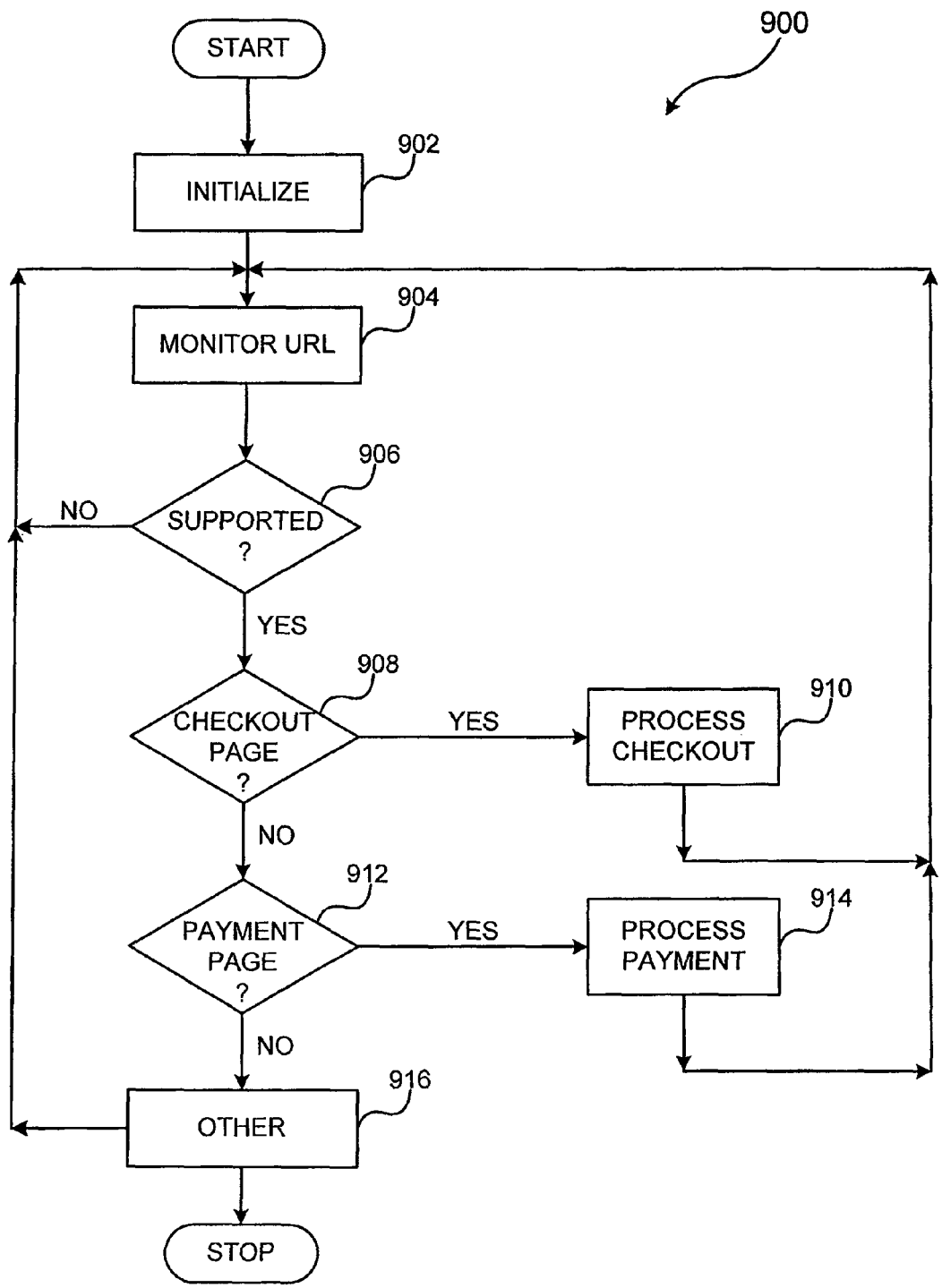
FIG. 9 is a flow diagram of an exemplary process executed by an exemplary activator application.

With reference now to FIG. 9, a process 900 implemented by an exemplary activator program suitably includes initializing the application (step 902), monitoring the uniform resource locator (URL) as the user browses or shops online (step 904), determining whether the user is browsing at a supported site (step 906), determining the type of supported site (steps 908 and 912) and responding appropriately at processing steps 910 and 914 (respectively). Other features (such as coupons, special offers, monitoring, security and the like) may be implemented at step 916.

Initialization step 902 suitably involves opening the activator application and initializing the application as appropriate. The activator application may be initialized in response to system startup, connection to a network (such as the internet or a LAN), or initialization of a browser (such as Internet Explorer, available from the Microsoft Corporation (Redmond, Wash.) or Netscape Explorer, available from the Netscape Corporation (Mountain View, Calif.). In various embodiments, the activator application may contact the wallet server 140 (FIG. 1), wallet application 406 (FIG. 4) or another server on network 102. The activator application suitably contacts the remote server to obtain information such as a list of Web sites, domain names, or URLs that are supported by the wallet. This information may be obtained on a regular basis (e.g. daily, weekly, monthly, or at each initialization of the agent application) or when polled by the activator application or the server. In various embodiments, the activator application stores the list of supported URLs in a cache or file on a local drive, or in memory on the client computer.

As the user browses the Internet or other data network 102, the activator application suitably monitors the location of the user on the network. One method of monitoring the user's browsing is to monitor the URL used by the user's browser. In such embodiments, the activator application obtains the present URL from the user's browser (or from the system network interface, as appropriate) and compares (step 906) the present URL against the list of supported URLs obtained from the remote server in initialization (step 902). These comparisons are shown in logically separate steps 906, 908, 912 and 916 in FIG. 9, although these steps could be combined or separated in any fashion without departing from the ambit of the invention. For example, although FIG. 9 shows multiple comparisons being executed, a single comparison of each present URL against the list of supported URLs may be sufficient in certain embodiments.

If the present URL corresponds to a supported URL, the activator application responds appropriately. For example, if the present URL is a supported checkout page (yes in step 908), the activator application executes a checkout process (step 910). The checkout process may include notifying the user that the checkout page is supported through a pop-up message, or by displaying a particular icon in the system tray or in the floating window. If the wallet client application 214 is not already open, the activator application may present a dialog box or other prompt to the user indicating that the page is supported by the wallet application 214. The prompt may also provide a button or other mechanism by which the user may open the wallet application 214.

If the present URL corresponds to a supported payment page (yes in step 912), the activator application may provide payment instructions to the wallet application, or otherwise pass control to the wallet application (step 914). Messages sent between the activator application, the wallet application, the browser, and the like may be sent by Open Desktop messages, Object Linking and Embedding (OLE) messages, object routine calls, OS calls, or the like.

In various embodiments, the functionality described above is accomplished using cookies as described next. Cookies are used to detect a valid user context. If a valid user context is detected, the activator will either: launch a server application or launch a server toolbar that enables the user to launch other applications. For example, a user's browser might have several cookies that signify the ability to purchase via either a private payment or a specific card product. The activator may launch a toolbar that allows the user to select a desired payment instrument (e.g., from private payments or a card in the user's digital wallet). It will be appreciated that the available applications are not all necessarily related to a purchase transaction. In various embodiments, the context information is stored both on a server and in cookies associated with the browser. For example, the cookies might act as a key by which the context information can be retrieved from the server.

Other functionality (step 916) may also be incorporated into the activator application. For example, security mechanisms (such as those described above and below), customer monitoring functions, coupons, special offers and the like could be implemented. In the case of coupons or special offers, the activator could sense the present URL as corresponding to a particular product or Web page. When the user "surfs" or browses to the particular supported URL, the activator application notices the match and presents the user (via a dialog window, or via the browser, or the like) with a special offer, such as an opportunity to purchase a particular product or to receive a special discount on a purchase. It will be appreciated that other functionality could be incorporated into the activator application without departing from the ambit of the present application.

In various embodiments of the invention, wallet client 214 (FIG. 2) is pre-filled with information that is specific to the particular user/customer. With reference to FIG. 1, a user may apply for a digital wallet by contacting a Web server such as wallet server 140 on network 102. The user completes a registration form (which may be generated with CGI scripts, for example) to apply for the wallet. Wallet server 140 suitably receives demographic, account and other information (e.g. address, shipping address, name, credit card number, and the like) from authentication server 306 (FIG. 3) or another server on a private network. This information may be used to configure a wallet client 214 (FIG. 2) that is unique to the particular user. One method of configuring the wallet client 214 is to create a configuration file that is associated with client 214 and that is read by client 214 to obtain wallet information as described above.

In one embodiment, authentication server 306 is managed by a trusted third-party that is independent of a merchant, issuer, and/or acquirer. For example, a trusted third-party may include, for example, a bank, a financial institution, an escrow agent, an acquirer, a payment processor and the like. A transaction account issuer may contract with a supplier of authentication server 306 in order to decrease the probabilities that received authorization requests are fraudulent. Accordingly, the third party managed authentication server 306 receives a biometric sample along with a transaction authorization request, authenticates the biometric sample, and transmits the transaction authorization request to the issuer or Card Authorization System (CAS) to perform the steps of determining, for example, whether an adequate credit limit exists to satisfy the transaction, prior to sending an authorization message to the merchant.

In another embodiment, the issuer and/or CAS transmits a verification request to a third-party authentication server 306 in response to receiving a transaction authorization request. The third-party authentication server 306 transmits a request to a merchant device and/or user intelligent instrument, prompting the user to provide a biometric sample. The biometric sample is transmitted to the third-party authentication server 306, where the authentication processes disclosed herein are performed.

In yet another embodiment, the user provides a biometric sample to the intelligent instrument in response to initiating a purchase transaction with a merchant. The intelligent instrument creates a biometric sample based on a biometric read, and transmits the biometric sample to the third-party authentication server 306. The merchant system also transmits a transaction authorization request to a CAS. The transaction authorization request may include a code or flag indicative of the biometric sample being transmitted to the third-party authentication server 306. Accordingly, the CAS may perform the transaction authorization processes while waiting for a verification signal from the third-party authentication server 306. Upon authorizing the transaction authorization request and receiving a verification signal from the third-party authentication server 306, the CAS may transmit an authorization message to the merchant.

In one embodiment, the authentication server 306 may reside at a bank, CAS, transaction account issuer, a third-party, or any other designated entity. Moreover, authorization of a purchase transaction may occur through any number of communications channels between any numbers of entities. For example, authorization of a purchase transaction may be performed by a CAS, while verification of biometric data may occur at a third-party. However, the authorization and verification steps may also be performed by the same entity.

In an exemplary embodiment, the registration information also includes card reader information which includes whether the card reader port should be serial or USB port. If the wallet application is approved, a card reader may be shipped or otherwise provided to the user, and a special code (such as a cryptographic key, or a password, or any other sort of electronic or printed code) is also provided to the user. The user then registers for online wallet service by electronically contacting wallet server 140 and authenticating to the server with the card and/or with the special code. After providing the special code, the user receives a specially configured copy of the wallet software, which may be installed on customer computer 110, as appropriate. The wallet pre-fill procedure may be used with any credit card or charge card by simply associating a version of the wallet program with a special code. Configuration information for a particular user is associated with a code that is provided to the user, who may later present the special code to authenticate him/herself with wallet server 140 to obtain a copy of the wallet that has already been pre-configured with data specific to the particular user.

Figure 10:
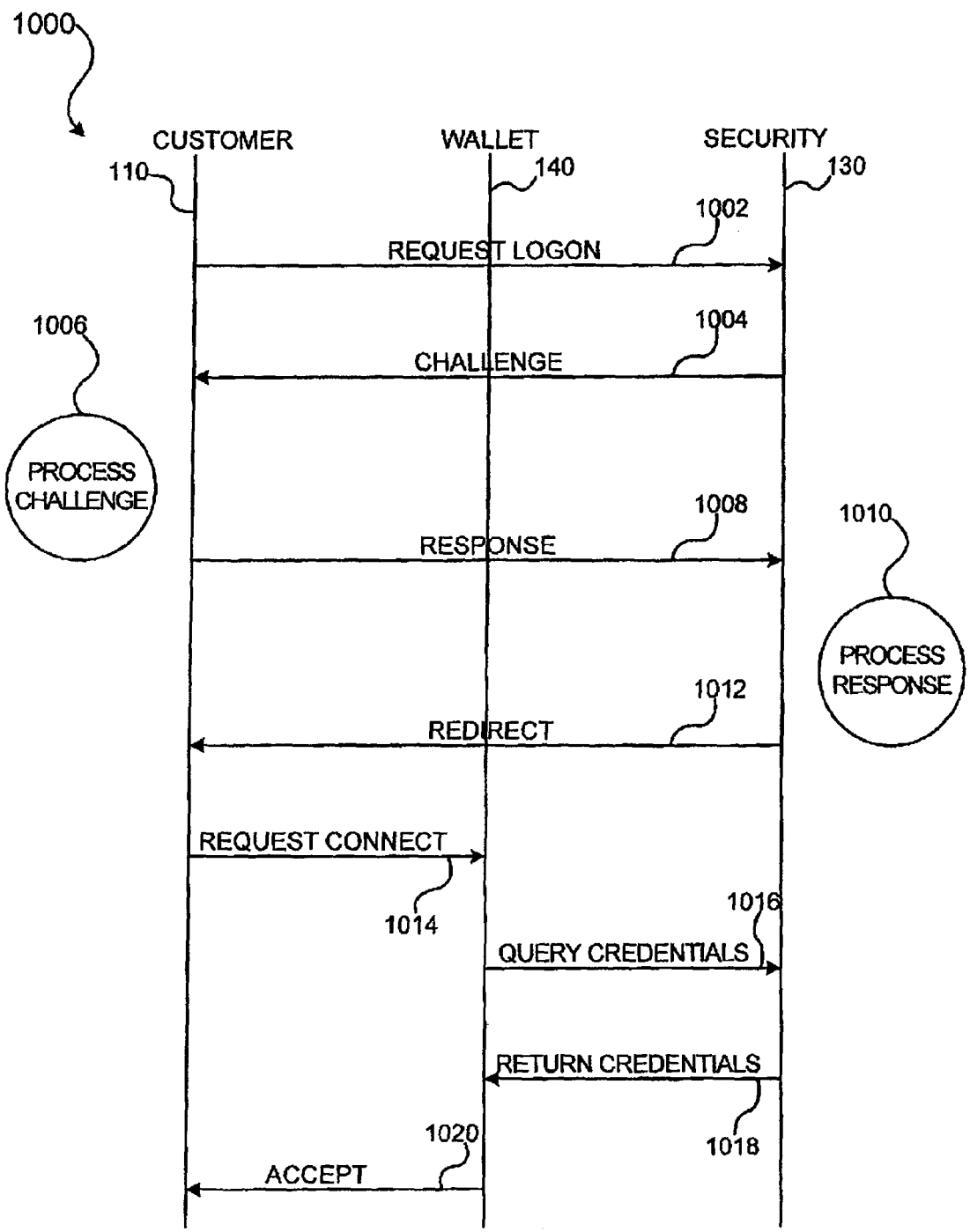
FIG. 10 is a message sequence chart of an exemplary login sequence.

With primary reference now to FIGS. 1 and 10, customer 110 suitably initiates a transaction by logging in to wallet server 140 using intelligent instrument 202. To log in to the wallet server 140, customer 110 first may connect to the security server 130 via browser 216. The user selects a particular uniform resource locator (URL) for the login page through a bookmark, an interne shortcut, a hyperlink, or any other suitable technique. Security server 130 may then return a login page via network interface 302. In various embodiments, a form entry and submission button for user/password login and a hypertext link for intelligent instrument login are provided as part of the login page. The user selects intelligent instrument login, and browser 216 suitably responds by forwarding log on request message 1002 (FIG. 10). Security server 130 receives logon request 1002 and initiates the intelligent instrument logon process as appropriate. In various embodiments, security server 130 formats a cryptographic challenge by authorization server 306 or security engine 304 in response to logon request message 1002. Cryptographic challenge 1004 is any sort of challenge message that prevents replay attacks (e.g., fraudulent messages created by re-sending previously sent authentication packets), such as a challenge that is based upon random data and is designed to solicit a response from the X.509 application stored on intelligent instrument 202. The challenge is then suitably provided to customer 110 via network 102 as challenge message 1004.

Upon receipt of challenge message 1004, browser 216 suitably passes message 1004 to wallet client 214 for processing with intelligent instrument 202. If wallet client 214 is not running, browser 216 may automatically open the program. Wallet client 214 then prepares the signature response, as appropriate. For example, wallet client 214 may extract the server challenge information, format a new client challenge (i.e., a second cryptographic challenge for intelligent instrument 202), combine both challenges into a dual challenge, and compute a hash of the dual challenge for later use, for example, in a Public-Key Cryptography System 1 (PKCS1) cryptographic block. The hash may be computed according to any algorithm such as MD3 or MD4, for example, and is suitably used to guarantee the completeness and accuracy of the data in the dual challenge block. It will be understood that PKCS1 is a public key cryptography standard defining mechanisms for encrypting and signing data using RSA public-key cryptosystems. The PKCS standard is fully defined in PKCS #1: RSA Cryptography Specifications Version 2.0 dated September 1998 (available online from http://www.rsa.com/rsalabs/pubs/PKCS/html/pkcs-1.html) and incorporated herein by referenced in its entirety.

The PKCS1 block is suitably provided to intelligent instrument 202 via reader 204 for processing (step 1006 in FIG. 10). In various embodiments, card reader 204 interacts with customer computer 110 to prompt the user for a personal identifier, for example a personal identification number (PIN) or other unique identifier, to access the card. In an exemplary embodiment, a PIN is stored on intelligent instrument 202. Alternatively, a PIN or other personal identifier may be stored elsewhere on the system, for example, on the reader 204 or the customer computer 110. The user suitably enters the personal identifier as appropriate to unlock intelligent instrument 202, which receives the dual challenge block from wallet client 214 and digitally signs the block as appropriate. In various embodiments, intelligent instrument 202 contains a private key that is used to compute a digital signature of the block. The signed block is then returned to wallet client 214, as appropriate. In various embodiments, intelligent instrument 202 also provides a certificate (such as an X.509 certificate) that corresponds to the private key used to compute the digital signature.

After receiving the signature and certificate from intelligent instrument 202, wallet client 214 suitably creates an appropriate response message 1008 to be sent to security server 130. Although response message 1008 may be in any format, various embodiments format response message 1008 as a PKCS7 message as defined in PKCS #7: Cryptographic Message Syntax Standard, An RSA Laboratories Technical Note, Version 1.5, Revised Nov. 1, 1993, available online from ftp://ftp.rsa.com/pub/pkcs/doc/pkcs-7.doc and incorporated herein by reference in its entirety.

After receiving response message 1008, security server 130 processes the message as appropriate (step 1010 in FIG. 10). In various embodiments, response message 1008 is routed to authorization server 306, which verifies the certificate and signature provided by intelligent instrument 202. Upon successful verification of the certification and validation of the signature, in various embodiments a security token may be generated and returned to the customer 110 or intelligent instrument 202.

In this manner, subsequent presentation of the Security token provides a means for the user to establish identity and securely interact with the wallet server. In various embodiments, authorization server 306 may also create an additional security token that identifies the user. In various embodiments this token may consist of multiple portions which can then map to an appropriate digital certificate, smart card, or other data, possibly utilizing data in database 310. In various embodiments, the additional security token and/or portions therein may be provided to customer 110 in conjunction with redirect message 1012. In various embodiments, the additional security token may be provided to the customer or maintained on authorization server 306.

Upon receipt of redirect message 1012, customer 110 suitably contacts wallet server 140 to request a connection. In various embodiments "Request connect" message 1014 suitably includes the security token and possibly the additional security token in entirety or part as part of redirect message 1012. Wallet server 140 queries the security server 130 using some combination of security tokens in whole or part to obtain identification of customer 110. The query 1016 and response 1018 are suitably transmitted across network 150, which in some embodiments is maintained separate from network 102 to enhance the security of the system 100. An alternative embodiment employs network 102 that in some embodiments affords enhanced security by Virtual Private Network, SSL protocol, use of shared secrets, and/or other cryptographic means. If the return credentials 1018 are in order, wallet server 140 retrieves the attributes corresponding to customer 110 from wallet database 408 and notifies customer 110 of a successful login via message 1020. It will be appreciated that alternate embodiments of a logon sequence are possible. It will also be appreciated that any sort of encryption schemes, message formats and the like could be used to implement a login sequence 1000.

Figure 11:
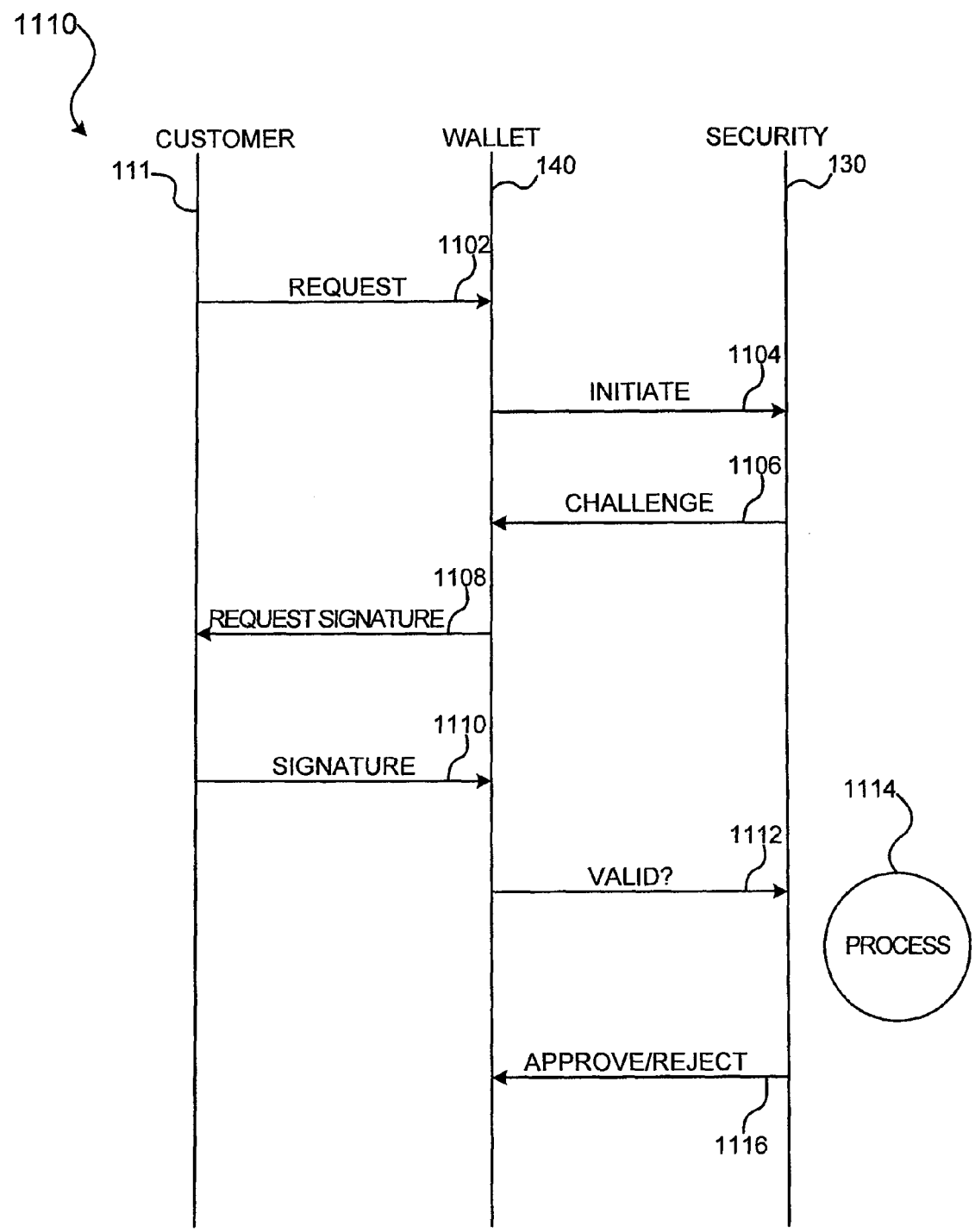
FIG. 11 is a message sequence chart of an exemplary purchase sequence.

Referring now to FIG. 11, an exemplary authentication flow 1100 suitable for use during a purchase transaction begins with a customer 110 placing a request 1102 with wallet server 140 for an event (such as a purchase) for which authentication is required. Wallet server 140 suitably recognizes the event and submits a request message 1104 to the security server 130, for example, via communication channel 150, to format a challenge message. Authentication server 306 (or some other component of security server 130, as appropriate) then formats a challenge message 1106 (which may include random data) and provides the challenge message 1106 to wallet server 140, for example, via connection 150. Wallet server 140 receives the challenge message 1106 and forwards the challenge data to browser 216 as signature request message 1108. Browser 216 opens wallet client 214, if necessary, and forwards signature request message 1108. As described above, wallet client 214 formats a signature request block such as a PKCS1 block including a server challenge, a client challenge and a hash. The resultant signature request block is provided to intelligent instrument 202 via reader 204. Intelligent instrument 202 suitably signs the block and provides a copy of its X.509 certificate, as appropriate.

The signed block may then be returned to wallet client 214, which suitably formats an appropriate signature response message 1110 (such as a PKCS7 message) and sends it to wallet server 140. Wallet server 140 then formulates validity check message 1112, which includes data from signature response message 1110 and the security token associated with customer 110 during the logon process (such as the exemplary logon process shown in FIG. 10). In alternate embodiments, the security token provided is received from customer 110 as part of signature response message 1110. Validity check message 1112 is sent to security server 130 via connection 150, as appropriate. Security server 130 may then route validity check message to authorization server 306, as appropriate, which may check the signature and retrieve the appropriate security token from database 310 (step 1114 in FIG. 11). The security token and/or optional unique identification code retrieved from the database is then compared to the security token or ID received from the wallet server 140. If the two objects (e.g., security tokens or IDs) match, it can be deduced that the card presently used by customer 110 is the same card used by customer 110 at the time of log on. An appropriate approve or reject message 1116 is then sent from security server 130 to wallet server 140, and the transaction is allowed to proceed.

In various embodiments, wallet server 140 acts as a proxy for customer 110 during transactions. For example, wallet server 140 may complete purchase forms including shipping address, card number, and the like on behalf of purchaser 110. Merchant 120 may then authorize the purchase transaction as a standard charge card transaction using conventional hardware and software. It will be realized, however, that the added security provided by the systems disclosed herein will allow added confidence in the identity of the purchaser, thus justifying a lower discount rate for the transaction.

Various embodiments of the invention incorporate an added protection against security breaches. Because many server-side functions incorporated into security server 130 or wallet server 140, for example, may incorporate various scripting components written in scripting languages such as JavaScript (as defined by Sun Microsystems, Mountain View, Calif.) or VBscript (as defined by the Microsoft Corporation, Redmond, Wash.), servers coupled to network 102 may provide various functionality to the multiple clients 110 through such server languages by providing scripts (or code) from the server to the client. The code is interpreted, compiled or otherwise executed by client computer 110. In embodiments incorporating JavaScript, for example, scripts are interpreted and executed by a browser program (e.g. Internet Explorer, Netscape Communicator or the like) running on client computer 110. Other embodiments include other non-PC browsers, for example Wireless Application Protocol (WAP) phones that support Wireless Markup Language (WML) scripts. The various scripting languages may contain instructions, objects or other data mechanisms for accessing files on the user's hard drive, for example, or for otherwise manipulating data on the user's computer. To prevent unauthorized sources from providing executable code to the user, the scripting languages may include a mechanism for allowing the user to approve scripts provided only from trusted sources. For example, a user conducting an electronic transaction as described above may allow scripts provided from the wallet server to execute, but may prevent other scripts provided by other sources from executing on the user's computer.

Figure 12A:
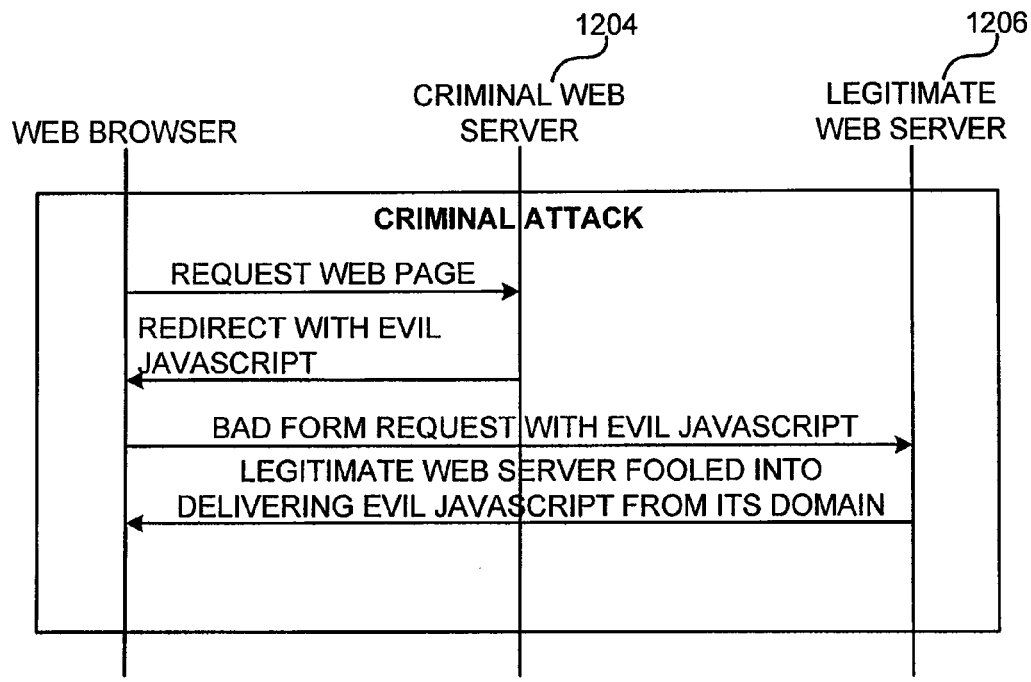
FIG. 12A is a message sequence chart illustrating a potential security problem encountered with many scripting languages.
Figure 12B:
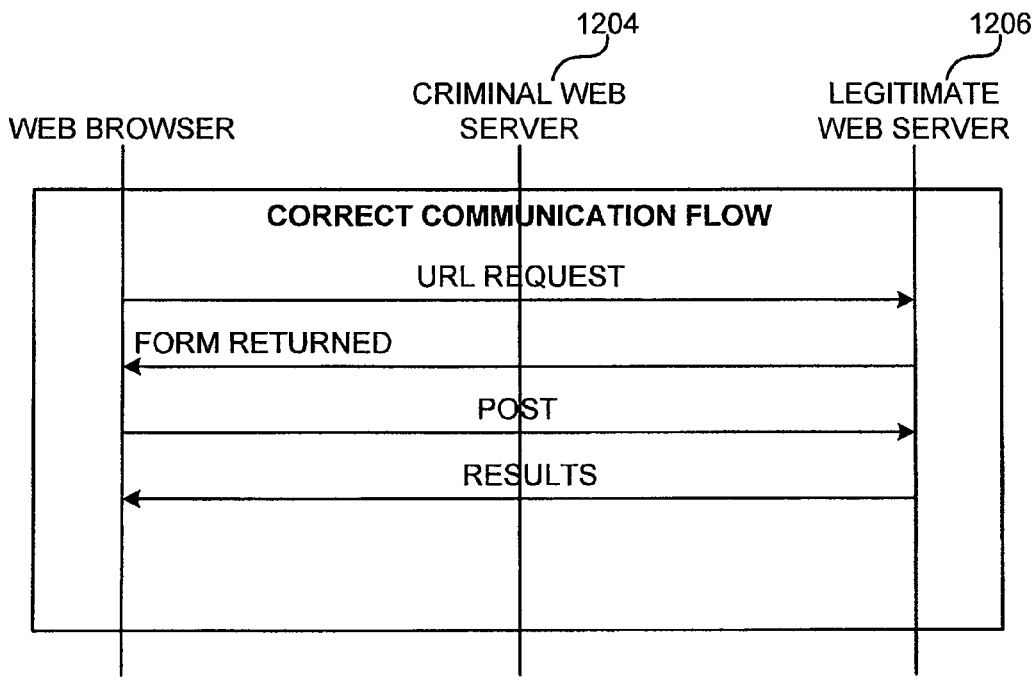
FIG. 12B is a message sequence chart of a correct communications flow without the security problems shown in FIG. 12A.

A potential security problem encountered with many scripting languages is shown in FIG. 12A. An unscrupulous "cracker" may create a Web site 1204 that is designed to perform malicious activities against users of a legitimate Web server 1206. The cracker site 1204 (shown as the "criminal site" in the figure) may, for example, provide a portion of code, such as a script, to the user. The criminal site 1204 may also induce the user's Web browser 216 to request a particular uniform resource locator (URL) at the legitimate server 1206 (such as the wallet server 140, or any other server on network 102). The referenced URL may be deliberately crafted such that the legitimate server 1206, returns, for example, an error message or other response to the client browser 216. In various embodiments, the response from the legitimate server 1206 may automatically include a portion or variation of the request from the user's Web browser 216. If that response includes JavaScript, VBscript or other code generated as a result of the malicious intent of the criminal site 1204, then the code may be executed on the user's computer. This example illustrates one of many techniques in which a "cracker" may induce a legitimate Web server 1206 to send malicious instructions to a user's Web browser 216. Because the various coding and scripting languages contain instructions for accessing the host computer's file system, registry, or the like, it will be understood that the unauthorized execution of such code is highly undesirable. Nevertheless, the technique shown in FIG. 12A may allow scripting or other code from a criminal site 1204 to be provided to a user's computer. Because the user's computer thinks that the scripting came from a trusted source (i.e. the wallet server), the client's computer may execute the code from the criminal site, thus creating the potential for damage, unauthorized data dissemination or destruction, or the like. FIG. 12B illustrates the correct communication flow that should occur (as opposed to the criminal attack flow shown in FIG. 12A).

Figure 13:
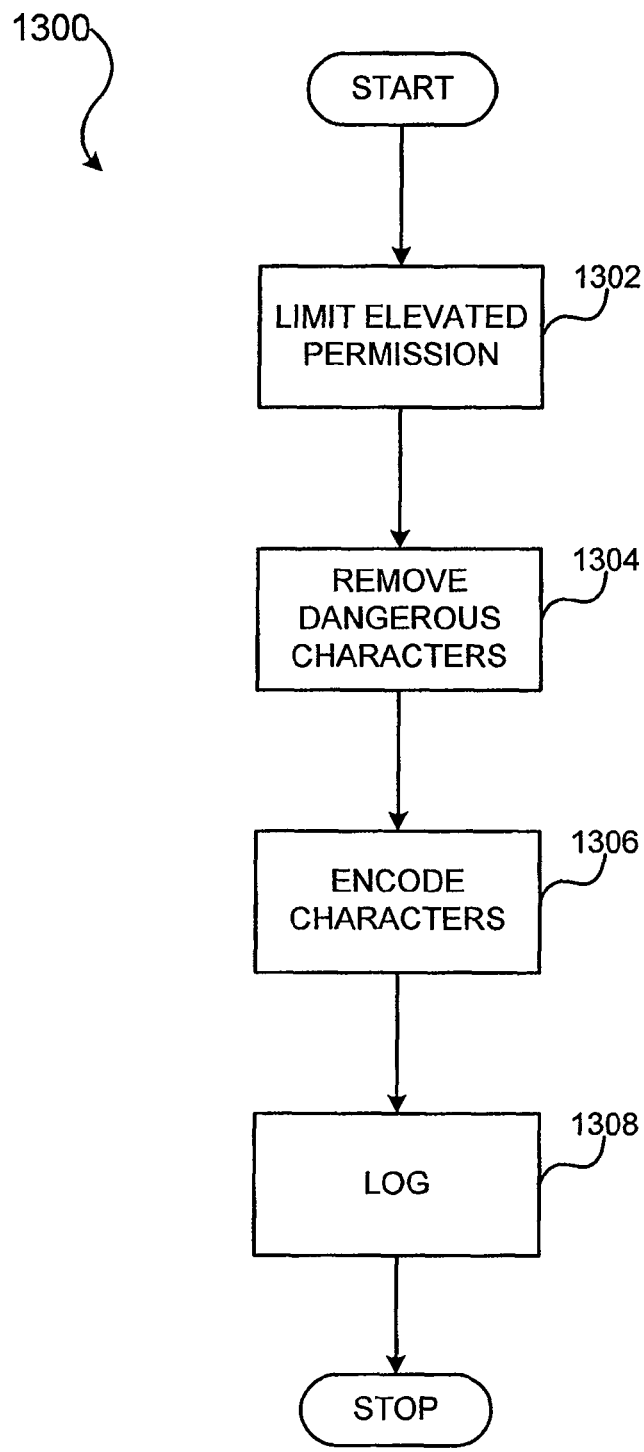
FIG. 13 is a flow diagram of an exemplary process for reducing or eliminating undesired executable code.

To prevent this potential security problem, various embodiments of the invention suitably include techniques for reducing or eliminating undesired executable code. With reference to FIG. 13, a process 1300 for reducing the likelihood of script attacks suitably includes the steps of limiting the portions of the server having elevated permission (step 1302), removing dangerous characters within that portion of the site (step 1304), encoding certain characters where necessary (step 1306), and optionally logging data that is provided to users from the relevant portion of the Web site (step 1308).

With regard to step 1302, a Web site typically includes various pages, each page having a unique URL. Users of the site may place elevated trust in certain servers (such as those corresponding to financial institutions or merchants who are reputable). By restricting the elevated trust to only a portion of the Web site (e.g., a limited subset of URLs corresponding to the trusted Web site), the level of trust afforded to the rest of the site is suitably reduced and security is enhanced. Trust may be restricted to a limited portion of the site by configuring the user's Web browser to trust only a portion of the site, for example. The user's Web browser may be configured manually or by a configuration script provided by a wallet server, for example. When only certain pages (e.g. a portion) of the Web site are enabled with heightened trust, any scripts included in references to other pages will either not be executed or will not be executed with heightened trust.

In addition to (or as an alternative to) configuring the client such that the client only "trusts" a certain portion of the server, the server may be configured to improve the security of the client-server interaction. For example, scripting with heightened trust may be disallowed on most of the server to improve security. Moreover, data provided to the trusted portion of the Web site may be monitored and/or modified before being returned to the user (steps 1304 and 1306). Most scripting languages require certain characters for formatting commands. For example, the JavaScript language is frequently encoded with script instructions placed between angle brackets ("<" and ">"). Hence, the angle brackets may be removed from any content that will be returned by a trusted portion of the Web site. If a Web page provided from a trusted portion of the Web site were to include a "criminal" JavaScript program attempting to use angle brackets, for example, the script instructions would not execute on the user's computer because the script instructions would not be properly formatted after removing the angle brackets. Alternatively, certain "dangerous" characters (such as the angle brackets in JavaScript) may be returned in an alternate format, for example, in "ampersand notation" with an ampersand ("&") and an American Standard Code for Information Interchange (ASCII) value for the particular character, or by replacing the "dangerous" character with a safe character, such as the "space" character (step 1306). It will be appreciated that any characters could be eliminated or encoded in various embodiments of the invention depending upon the particular languages, scripting environments, and the like that may be utilized.

In various embodiments, an optional step 1308 suitably includes maintaining a data log of information provided by the various portions of the Web site. All content in which characters have been encoded or removed can be logged so that the log can be reviewed to determine if the Web site is being used to compromise a network client. For example, all content provided from the Web page, all content provided from within the trusted portion, all content having scripting/programming content, all content from outside the trusted portion, or any other part of the Web site content could be logged into one or more data files. The data files may be suitably searched or otherwise consulted to determine whether there have been attempts to provide unauthorized content to users by the server.

In some cases internal machines can be attacked by a "criminal" site sending content that contains script to a network server that can log the content in audit trail (e.g., log) files. Given that a browser may have been configured a heightened trust for files residing on the server, in various embodiments, when a user reviews the audit trail files of Web and other e-commerce servers by using the browser, a script may be executed on the network client with the trust level of the network server that delivered the audit trail records (e.g., with a heightened trust level). Execution of this script may cause an attack which may occur long after the script was sent to the network server. This attack is preventable using the same methods and procedures described above to prevent cross site scripting, such as the "criminal" attacks described above. A filter, such as the one described in FIG. 13, running on a network server, such as a Web server, or running on a network client, such as a PC browser, can filter for script control characters and encode the characters, reject the characters or reject the entire record.

In another exemplary embodiment of the present invention, transaction system 100 may be configured with one or more biometric scanners, processors and/or systems. FIG. 14 illustrates an exemplary transaction system 1400 in accordance with the present invention, wherein exemplary components for use in completing an electronic transaction are depicted. While the invention may be described with the use of an intelligent instrument, an intelligent instrument is not required and the invention contemplates similar embodiments using only an account code or number.

System 1400 may include intelligent instrument 202 having an integrated circuit (IC) 1410. Intelligent instrument 202 may also be configured with a biometric sensor 1404, described in further detail herein. System 1400 may also comprise intelligent instrument reader 204 configured to communicate with intelligent instrument 202, computer 110, wallet 140, merchant 120 and/or an access point 1450.

Access point 1450 may be configured as any point of interaction between an intelligent instrument user and transaction system 1400. For example, access point 1450 may include a merchant POS device, a kiosk, a terminal, a computer interface, and/or any other device for facilitating user access to transaction system 1400. Intelligent instrument reader 204 may be configured with a biometric sensor 1604, described in further detail herein. Intelligent instrument 202 may communicate with network 102 through intelligent instrument reader 204.

A biometric system may include one or more technologies, or any portion thereof, to facilitate recognition of a personal identifier, such as, for example a biometric. As used herein, a personal identifier may include a user's voice, fingerprint, facial, ear, signature, vascular patterns, DNA sampling, hand geometry, sound, olfactory, keystroke/typing, iris, retinal, brainwaves, or any other biometric relating to recognition based upon any body part, function, system, attribute and/or other characteristic, or any portion thereof. As used herein, the terms "personal identifier" and "biometric" may be used interchangeably. Certain of these technologies will be described in greater detail herein. Moreover, while some of the examples discussed herein may include a particular biometric system or sample, the invention contemplates any of the biometrics discussed herein in any of the embodiments.

The biometric system may be configured as a security system and may include a registration procedure in which a user of a transaction instrument proffers a sample of his fingerprints, DNA, retinal scan, voice, and/or other biometric sample to an authorized sample receiver (ASR). As used herein, a transaction instrument may refer to a physical intelligent instrument, debit card, charge card, loyalty card, radio-frequency enabled card, or the like. Further, a transaction instrument may also refer to the electronic information stored and/or associated with a physical card. As used herein, all transaction instruments will be referred to herein as "intelligent instrument 202." An ASR may include a local database, a remote database, a portable storage device, a host system, an issuer system, a merchant system, a intelligent instrument issuer system, an employer, a financial institution, a non-financial institution, a loyalty point provider, a company, the military, the government, a school, a travel entity, a transportation authority, a security company, and/or any other system or entity that may be authorized to receive and store biometric samples and associate the samples with specific biometric databases and/or transaction instruments (e.g., intelligent instruments 202). As used herein, a user of an intelligent instrument, cardmember, or any similar phrase may include the person or device holding or in possession of the intelligent instrument, or it may include any person or device that accompanies or authorizes the intelligent instrument owner to use the intelligent instrument.

As used herein, a biometric may be processed in any number of ways in order to create a biometric sample. For example, a biometric read of an iris results in a biometric, wherein when the biometric read is processed to create a digital representation of the iris, a biometric sample is created. In various embodiments of the invention, either data relating to a biometric sample or a biometric sample itself may be used in the process of verification of an identity. For example, biometric data may be created from a biometric sample by applying a specific mathematical equation to the biometric sample. In other embodiments, the biometric sample itself (e.g., a digitized photo of an iris) is processed directly to verify an identity.

Figure 15:
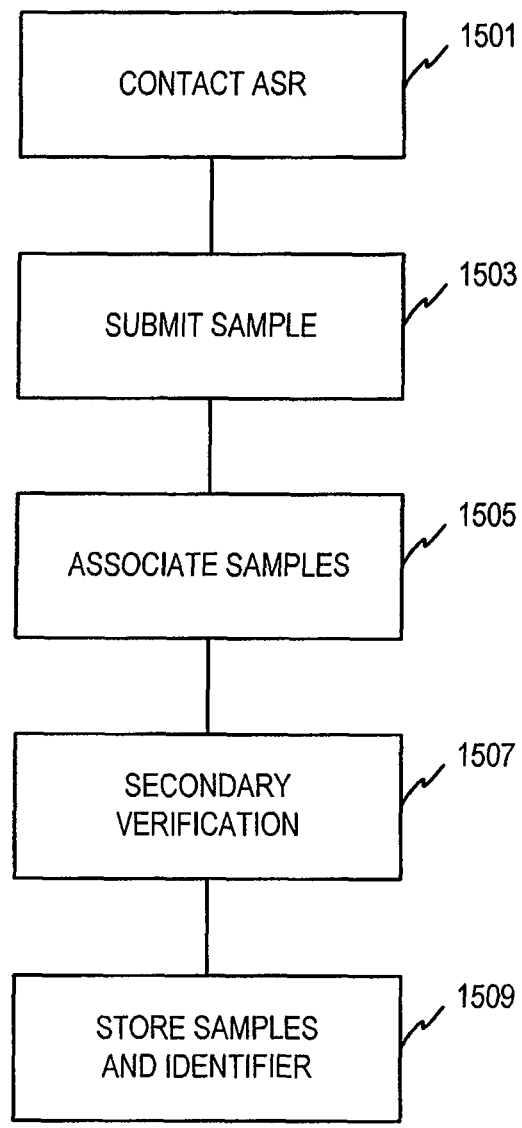
FIG. 15 illustrates an exemplary registration procedure in accordance with the present invention.

FIG. 15 illustrates an exemplary registration procedure in accordance with the present invention. In one embodiment, a cardmember may contact an ASR to submit one or more biometric samples to an ASR (Step 1501). The cardmember may contact the ASR and submit a sample in person, through a computer and/or Internet, through software and/or hardware, through a third-party biometric authorization entity, through a kiosk and/or biometric registration terminal, and/or by any other direct or indirect means, communication device or interface for a person to contact an ASR.

A cardmember may then proffer a biometric sample to the ASR (step 1503). As used herein, a biometric sample may be any one or more of the biometric samples or technologies, or portion thereof, described herein or known in the art. By proffering one or more biometric samples, a biometric may be scanned by at least one of a retinal scan, iris scan, fingerprint scan, hand print scan, hand geometry scan, voice print scan, vascular scan, facial and/or ear scan, signature scan, keystroke scan, olfactory scan, auditory emissions scan, DNA scan, and/or any other type of scan to obtain a biometric sample. Upon scanning the sample, the system may submit the scanned sample to the ASR in portions during the scan, upon completing the scan or in batch mode after a certain time period. The scanned sample may include a hardcopy (e.g., photograph), digital representation, an analog version or any other configuration for transmitting the sample. The ASR receives the sample and the ASR may also receive copies of a cardmember's biometric data along with the sample or at a different time (or within a different data packet) from receiving the sample.

The ASR and/or cardmember may correlate and/or register the sample with cardmember information to create a data packet for the sample and store the data packet in digital and/or any storage medium known in the art. As used herein, a data packet may include the digitized information relating to at least one of a biometric sample, a registered biometric sample, a stored biometric sample, a proffered biometric, a proffered biometric sample, cardmember information, intelligent instrument information and/or any other information. The terms "data packet," "biometric sample," and "sample"

may be used interchangeably. As used herein, registered samples may include samples that have been proffered, stored and associated with cardmember information. By storing the data packet in digital format, the ASR may digitize any information contained in one of the biometric scans described herein. By storing the data packet in any storage medium, the ASR may print and/or store any biometric sample. Hardcopy storage may be desirable for back-up and archival purposes.

The biometric sample may also be associated with user information to create a data packet (step 1505). The sample may be associated with user information at any step in the process such as, for example, prior to submission, during submission and/or after submission. In one embodiment, the user may input a PIN number or zip code into access point 1450, and then scan the biometric to create the biometric sample. The local access point may associate the biometric sample data with the PIN and zip code, and then transmit the entire packet of information to the ASR. In another embodiment, the access point may facilitate transmitting the sample to an ASR, and during the transmission, the sample may be transmitted through a third system which adds personal information to the sample.

The information associated with the biometric sample may include any information such as, for example, cardmember information, intelligent instrument 202 information, intelligent instrument 202 identifier information, intelligent instrument 202 issuer information, intelligent instrument 202 operability information, and/or intelligent instrument 202 manufacturing information. Intelligent instrument 202 information may be not limited to intelligent instrument chip information and may include information related to any transaction instrument such as transponders, credit cards, debit cards, merchant-specific cards, loyalty point cards, cash accounts and any other transaction instruments and/or accounts. The cardmember information may also contain information about the user including personal information—such as name, address, and contact details; financial information—such as one or more financial accounts associated with the cardmember; loyalty point information—such as one or more loyalty point accounts (e.g., airline miles, charge card loyalty points, frequent diner points) associated with the cardmember; and/or non-financial information—such as employee information, employer information, medical information, family information, and/or other information that may be used in accordance with a cardmember.

For example, a cardmember may have previously associated a credit card account (or charge card account), a debit card account, and a frequent flier account with his biometric sample which may be stored at an ASR. Later, when cardmember desires to purchase groceries, cardmember may submit his biometric sample while using intelligent instrument 202 for the purchase at access point 1450. Access point 1450 may facilitate sending the biometric sample to the ASR such that the ASR authorizes the biometric sample and checks a look-up table in the ASR database to determine if any information may be associated with the sample. If information (e.g., financial accounts) may be associated with the sample, the ASR may transmit the information to the access point. The access point may then present cardmember with a list of the three accounts associated with the biometric sample. Cardmember and/or a merchant may then chose one of the accounts in order to continue and finalize the transaction.

In another embodiment, cardmember may associate each account with a different biometric sample. For example, during registration, cardmember may submit a sample of his right index fingerprint, and request that the system primarily associate this sample with a particular credit card account. Cardmember may additionally submit a sample of his left index fingerprint and request that the system primarily associate the sample with a particular debit account. Additionally, cardmember may submit his right thumbprint and request that the system primarily associate that sample with a particular frequent flier account. By "primarily" associating a sample with an account, the system initially associates the sample with that account. For example, cardmember submitting his right index fingerprint for a financial transaction may have money for the transaction taken from his credit card account. Cardmember may additionally specify which accounts should be secondarily associated with a sample. For example, cardmember may have a debit card account secondarily associated with his right index fingerprint. As a result, if cardmember submits his right index fingerprint for a transaction, and the primary account associated with the sample is overdrawn or unavailable, the secondary account may be accessed in order to further the transaction.

While primary and secondary account associations are described herein, any number of accounts may be associated with a sample. Moreover, any hierarchy or rules may be implemented with respect to the association. For example, the cardmember may instruct the system to access a debit card account when it receives a right index fingerprint sample, the purchase qualifies for loyalty points with a certain airline and the purchase amount is less than $50. The cardmember may additionally instruct the system to access a credit card account if it receives a right index fingerprint sample, the purchase does not qualify for airline miles and the purchase amount is greater than $50. Further, while fingerprint samples are discussed herein, any biometric sample may have one or more accounts associated with it and may be used to facilitate a transaction using any of the routines discussed herein.

The ASR and/or cardmember may associate a specific intelligent instrument 202 identifier with the biometric sample by any method known in the art for associating an identifier (e.g., through the use of software, hardware and/or manual entry.) The ASR may additionally verify the cardmember and/or intelligent instrument 202 by using one or more forms of the user's secondary identification (step 1507). For example, the ASR may verify the cardmember by matching the intelligent instrument information to information retrieved from scanning information from a cardmember's driver's license. The ASR may verify intelligent instrument 202 by contacting the vendor of intelligent instrument 202 to confirm that intelligent instrument 202 was issued to a specific cardmember. In another embodiment, the ASR may activate intelligent instrument 202 during the registration procedure to confirm that the intelligent instrument 202 intelligent instrument chip identifier and other information may be properly associated with the cardmember and the cardmember's specific biometric samples. The ASR may additionally employ one or more verification methods to confirm that the biometric sample belongs to the user, such as, for example, the ASR may request from the user demographic information, further biometric samples and/or any other information. As used herein, "confirm," "confirmation" or any similar term includes verifying or substantially verifying the accuracy, existence, non-existence, corroboration, and/or the like of the information, component, or any portion thereof. The ASR may additionally employ one or more additional processing methods in order to facilitate association of a biometric sample. As used herein, the term processing may include scanning, detecting, associating, digitizing, printing, comparing, storing, encrypting, decrypting, and/or verifying a biometric and/or a biometric sample, or any portion thereof.

Upon association, authentication and/or verification of the biometric sample and intelligent instrument 202, the system may create a data packet store the data packet and intelligent instrument 202 identifier (step 1509) in one or more databases on and/or in communication with system 1400 via a network, server, computer, or any other means of communicating as described herein. The database(s) may be any type of database described herein. For example, a biometric sample stored on intelligent instrument 202 may be stored in the memory and/or other database of a transaction instrument. The database(s) may be located at or operated by any of the entities discussed herein such as, for example, the ASR and/or by a third-party biometric database operator.

The information stored in the database may be sorted or stored according to one or more characteristics associated with the sample in order to facilitate faster access to the stored sample. For example, fingerprint samples may be stored in a separate database than voice prints. As another example, all fingerprints with certain whirl patterns may be stored in a separate sub-database and/or database from fingerprints with arch patterns.

The biometric samples may also be stored and/or associated with a personal identification number (PIN) and/or other identifier to facilitate access to the sample. The PIN may be cardmember selected or randomly assigned to the biometric sample. The PIN may consist of any characters such as, for example, alphanumeric characters and/or foreign language characters.

The system may further protect the samples by providing additional security with the sample. The security may include, for example, encryption, decryption, security keys, digital certificates, firewalls and/or any other security methods known in the art and discussed herein. One or more security vendors may utilize the security methods to store and/or access the biometric samples. The present invention anticipates that storage of the biometric samples may be such that a sample may be first encrypted and/or stored under a security procedure, such that the sample may only be accessed by a vendor with the proper level of access or security which corresponds to or provides access to the stored sample. The samples may be accessible by certain vendors such as, for example, intelligent instrument 202 transaction account provider system, an issuer system, a merchant system, a intelligent instrument issuer system, an employer, a financial institution, a non-financial institution, a loyalty-point provider, a company, the military, the government, a school, a travel entity, a transportation authority, and/or a security company.

The intelligent instrument of the invention may include a particular security system wherein the security system incorporates a particular biometric system. As shown in FIG. 14, intelligent instrument 202 may include a biometric security system 1402 configured for facilitating biometric security using, for example, fingerprint samples. As used herein, fingerprint samples may include samples of one or more fingerprints, thumbprints, palmprints, footprints, and/or any portion thereof. Biometric security system 1402 may include a biometric sensor 1404 which may be configured with a sensor and/or other hardware and/or software for acquiring and/or processing the biometric data from the person such as, for example, optical scanning, capacitance scanning, or otherwise sensing the portion of cardmember. In one embodiment, biometric sensor 1404 of the security system 1402 may scan a finger of a cardmember in order to acquire his fingerprint characteristics into intelligent instrument 202. Biometric sensor 1404 may be in communication with integrated circuit 110 such that IC 110 receives the fingerprint information and transmits a signal to intelligent instrument 202 to facilitate activating the operation of intelligent instrument 202. A power source may be in communication with biometric sensor 1404 and IC 110 to provide the desired power for operation of the biometric security system components.

In one exemplary application of intelligent instrument 202 incorporating biometric security system 1402, the user may place his finger on the biometric sensor to initiate the mutual authentication process between intelligent instrument 202 and intelligent instrument reader 204, and/or to provide verification of the user's identity. Intelligent instrument 202 may digitize the fingerprint and compare it against a digitized fingerprint stored in a database included on intelligent instrument 202. The fingerprint information may additionally be compared with information from one or more third-party databases communicating with intelligent instrument 202 through any communication software and/or hardware, including for example, intelligent instrument reader 204, a Universal Serial Bus (USB) connection, a wireless connection, a computer, a network and/or any other means for communicating. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. As used herein, compare comparison and similar terms may include determining similarities, differences, existence of elements, non-existence of elements and/or the like.

A CPU such as, for example, customer computer 110, and/or merchant 130 may be configured to facilitate the local comparison to authenticate the biometric and validate the information. Any of the embodiments may alternatively or additionally include remote comparisons performed or controlled by one or more third-party security vendors. One or more comparison techniques and/or technologies may be used for comparisons. For example, for fingerprint comparisons, the CPU may utilize an existing database to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons.

Intelligent instrument 202 may additionally be configured with secondary security procedures to confirm that fake biometric samples may be not being used. For example, to detect the use of fake fingers, intelligent instrument 202 may be further configured to measure blood flow, to check for correctly aligned ridges at the edges of the fingers, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors, eyeball pressure sensors and/or any other procedures known in the art for authenticating the authenticity of biometric samples.

After verifying the biometric information, intelligent instrument 202 and intelligent instrument reader 204 may begin authentication, and the transaction may proceed accordingly. However, the invention contemplates that the verification of biometric information may occur at any point in the transaction such as, for example, after the mutual authentication. At any point in the transaction, the system may additionally request cardmember to enter a PIN and/or other identifier associated with the transaction account and/or biometric sample to provide further verification of cardmember's identification. As part of the transaction, cardmember payer may be requested to select from one of the financial accounts, loyalty accounts, credit accounts, debit account, and/or other accounts associated with the biometric sample. The user may be presented with a list of account options on a display associated with intelligent instrument reader 204, intelligent instrument 202, a third-party security device and/or any other financial or transaction device association with a transaction. In another embodiment, a payee may select one of the accounts. For example, a department store payee may manually and/or automatically select a department store issued account, if available, for a transaction.

In another exemplary embodiment, biometric security system 1402 may be configured for facilitating biometric security using facial recognition or recognition of any other body part or object. As discussed herein, facial recognition may include recognition of any facial features obtained through a facial scan such as, for example, the eyes, nose, cheeks, jaw line, forehead, chin, ear features, head shape, hairline, neck features, shoulder height, forehead slope, lip shape, distance between the ears and/or any portion thereof. Biometric security system 1402 may include a biometric sensor 1404 which may be configured with a video camera, optical scanner, imaging radar, ultraviolet imaging and/or other hardware and/or software for acquiring the biometric data from the person such as, for example video scanning, optical scanning or otherwise sensing any portion of cardmember. In one embodiment, biometric sensor 1404 of the security system 1402 may scan the face of a cardmember in order to acquire his facial characteristics into intelligent instrument 202. Biometric sensor 1404 may be in communication with IC 110 such that sensor 1404 receives the facial information and transmits a signal to the CPU to facilitate activating the operation of intelligent instrument 202. A power source may be in communication with biometric sensor 1404 and IC 110 to provide the desired power for operation of the biometric security system components.

In an embodiment, biometric sensor 1404 and/or IC 110 may comprise a portion of a mobile communication device, such as a smart phone, cell phone, personal digital assistant (PDA), and the like. Biometric sensor 1404 and/or IC 110 may further comprise a portion of a personal computer (e.g., a personal computer equipped with a web-cam), a kiosk, or any other device capable of receiving a biometric sample. Where biometric sensor 1404 and/or IC 110 comprise a portion of a mobile communication device, the device may acquire a biometric sample (e.g., a sample of an individual's facial or other identifying features) by photographing (e.g., digitally) the individual's identifying features, and/or acquiring a series of photographs in sequence (i.e., a video recording) associated with the individual's identifying features.

In one exemplary application of intelligent instrument 202 incorporating biometric security system 1402, system 1402 may scan the facial features of the cardmember to initiate the mutual authentication process between intelligent instrument 202 and intelligent instrument reader 204, and/or to provide verification of the user's identity. Security system 1402 may be configured such that cardmember may stand at least two-feet away from sensor 1404. Additionally, sensor 1404 may be configured to detect facial features of a user turned at least 30 degrees toward the camera.

Intelligent instrument 202 may digitize the facial scan and compare it against a digitized facial scan stored in a database included on intelligent instrument 202. The facial scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples.

The CPU may facilitate the local comparison to authenticate the biometric and may validate the information. Any of the embodiments may alternatively or additionally include remote comparisons performed or controlled by one or more third-party security vendors. One or more comparison techniques and/or technologies may be used for comparisons. For example, for facial recognition, the CPU may utilize an existing database to compare nodal points such as the distance between the eyes, the width of the nose, the jaw line, and the depth of the user's eye sockets. While only some types of nodal points are listed, the present invention recognizes that it is known that there are over 80 different nodal points on a human face that may be used for comparison in the present invention. Additionally, third-party devices such as facial recognition software and/or hardware systems may be used to facilitate facial recognition, such as the systems developed by Viisage, Imagis, and Identix which employ complex algorithms that facilitate both searching facial and/or ear scans and adjusting stored data based on eyewear, facial hair, and other changes in outward facial and/or ear appearance.

Intelligent instrument 202 may additionally be configured with secondary security procedures to confirm that fake biometric samples may be not being used. For example, to detect the use of fake facial features, intelligent instrument 202 may be further configured to measure blood flow, to detect a thermal pattern associated with facial features, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples. After verifying the biometric information, intelligent instrument 202 and intelligent instrument reader 204 may begin authentication by any of the methods described herein.

In another exemplary embodiment, biometric security system 1402 may be configured for facilitating biometric security using voice recognition. As discussed herein, voice recognition may include recognition of voice and/or speaker features such as, phonated excitation, whispered excitation, frication excitation, compression, vibration, parametric waveforms, tone, pitch, dialect, annunciation, and/or any portion thereof. As discussed herein, these voice recognition features may be collectively referred to as a "voice print." Biometric security system 1402 may include a biometric sensor 1404 which may be configured with an audio capture device such as a microphone, telephone, cellular phone, computer, speaker and/or other hardware and/or software for acquiring the biometric data from the person such as, for example auditory scanning, recording or otherwise sensing the portion of cardmember.

In accordance with one embodiment, the intelligent instrument 202 is obtained from an unrelated third party and does not require any specialized functions in order to facilitate the collection of a biometric sample for processing as disclosed herein. For example, a user who is participating in the disclosed system may use his existing Blackberry cellular telephone without modification. In other embodiments, the intelligent instrument 202 includes specialized functionality outside of the normal functionality of any of the devices disclosed herein. Accordingly, third-party companies may build the required functionality into their devices to offer their customers with the added benefit of participating in the disclosed verification system.

In one exemplary application of intelligent instrument 202 incorporating biometric security system 1402, system 1402 may capture the voice print of the cardmember to initiate the mutual authentication process between intelligent instrument 202 and intelligent instrument reader 204, and/or to provide verification of the user's identity. In one embodiment, biometric sensor 1404 of the security system 1402 may capture a voice print, when a user recites, for example, a pass phrase or audible PIN. Biometric sensor 1404 may be in communication with IC 110 such that sensor 1404 receives the voice print and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the voice print and compare it against a digitized voice print stored in a database included on intelligent instrument 202. The voice print information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

One or more comparison techniques and/or technologies may be used for comparisons. For example, for voice recognition, the CPU may utilize an existing database to compare the voice print by comparing voice print waveforms in the time domain, by comparing energy content in the voice prints across the frequency domain, by the use of stochastic models and/or template models, and/or by any other voice recognition method known in the art. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as voice recognition software and/or hardware systems to facilitate voice print comparisons, such as, for example SAFLINK and Voice Security Systems.

Intelligent instrument 202 and/or any other third-party security vendor system used in connection with intelligent instrument 202 may additionally be configured with secondary security procedures to confirm that fake biometric samples are not being used. For example, to detect the use of a recorded voice, system 1402 may be further configured to detect audio noise associated with an electronic device and/or any other secondary procedure to thwart biometric security fraud. After verifying the biometric information, intelligent instrument 202 and intelligent instrument reader 204 may begin authentication by the methods described herein.

In another exemplary embodiment of the present invention, biometric security system 1402 may be configured for facilitating biometric security using signature recognition. As discussed herein, signature recognition may include recognition of the shape, speed, stroke, stylus pressure, timing information, character height and width and/or other signature information and/or any portion thereof during the act of signing. As discussed herein, these signature recognition features may be collectively referred to as a "signature scan." Biometric security system 1402 may include a biometric sensor 1404 which may be configured with an LCD screen, digitizing tablet and/or other hardware and/or software that facilitates digitization of biometric data from the person such as, for example signature scanning, recording or otherwise sensing the signature of cardmember.

In one exemplary application of intelligent instrument 202 incorporating biometric security system 1402, system 1402 may capture the signature scan of the cardmember to initiate the mutual authentication process between intelligent instrument 202 and intelligent instrument reader 204, and/or to provide verification of the user's identity. In one embodiment, biometric sensor 1404 of the security system 1402 may capture a signature scan, when a user signs, for example, his name or a specified word or phrase. Biometric sensor 1404 may be in communication with IC 110 such that sensor 1404 receives the signature scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the signature scan and compare it against a digitized signature scan stored in a database included on intelligent instrument 202. The signature scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for voice recognition, the CPU may utilize an existing database to compare the features of a signature scan by comparing graphs, charts, and or other data relating to shape, speed, stroke, stylus pressure, timing information, character height and width and/or by any other signature recognition data. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as signature recognition software and/or hardware systems to facilitate signature scan comparisons, such as, for example CyberSIGN, LCI Computer Group, and Xenetek.

Intelligent instrument 202 and/or any other third-party security vendor system used in connection with intelligent instrument 202 may additionally be configured with secondary security procedures to confirm that fake biometric samples are not being used. For example, to detect the use of a false signature device, system 1402 may be further configured to detect a thermal pattern associated with a human hand and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using vascular pattern recognition. As discussed herein, vascular pattern may include recognition of structures, depths, and other biometric reference points of arterial tissues, vein tissues, capillary tissues, epithelial tissues, connective tissues, muscle tissues, nervous and/or other inner tissues and/or any portion thereof. As discussed herein, these vascular pattern features may be collectively referred to as a "vascular scan." Biometric security system 1402 may include a biometric sensor 1404 which may be configured with an optical scanner, x-ray, ultrasound, computed tomography, thermal scanner and/or other hardware and/or software that facilitates capture of biometric data from the person such as, for example scanning, detecting or otherwise sensing a vascular pattern of cardmember.

In one exemplary application of intelligent instrument 202 incorporating biometric security system 1402, system 1402 may capture the vascular scan of the cardmember to initiate the mutual authentication process between intelligent instrument 202 and intelligent instrument reader 204, and/or to provide verification of the user's identity. In one embodiment, biometric sensor 1404 of the security system 1402 may capture a vascular scan, when a user places his hand in front of an optical scanner. Biometric sensor 1404 may be in communication with IC 110 such that sensor 1404 receives the vascular scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the vascular scan based on biometric reference points and compare it against a digitized vascular scan stored in a database included on intelligent instrument 202. The vascular scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for vascular pattern recognition, the CPU may utilize an existing database to compare the vascular scan by comparing biometric reference points, vascular coordinates, vascular and/or tissue lengths, widths and depths; blood pressure including waveforms, dicrotic notches, diastolic pressure, systolic pressure, anacrotic notches and pulse pressure, and/or any other characteristic of vascular and/or tissue patterns. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as vascular pattern recognition software and/or hardware systems to facilitate vascular scan comparisons, such as, for example VEID International, Identica and ABT Advanced Biometric Technologies.

Intelligent instrument 202 and/or any other third-party security vendor system used in connection with intelligent instrument 202 may additionally be configured with secondary security procedures to confirm that fake biometric samples are not being used. For example, to detect the use of a false vascular pattern, system 1402 may be further configured to detect a thermal pattern associated with vascular patterns and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using DNA biometrics. As discussed herein, DNA biometrics may include recognition of structures, gene sequences, and other genetic characteristics of skin tissue, hair tissue, and/or any other human tissue and/or any portion thereof containing genetic information. As discussed herein, these genetic features may be collectively referred to as a "DNA scan." Biometric security system 1402 may include a biometric sensor 1404 which may be configured with an infrared optical sensor, a chemical sensor and/or other hardware and/or software that facilitates capture of biometric data from the person such as, for example scanning, detecting or otherwise sensing a DNA scan of cardmember.

In one exemplary application of intelligent instrument 202 incorporating biometric security system 1402, system 1402 may capture the DNA scan of the cardmember to initiate the mutual authentication process between intelligent instrument 202 and intelligent instrument reader 204, and/or to provide verification of the user's identity. In one embodiment, biometric sensor 1404 of the security system 1402 may capture a DNA scan, when a user submits genetic material to sensor 1404. Biometric sensor 1404 may be in communication with IC 110 such that sensor 1404 receives the DNA scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the DNA scan based on genetic information reference points and compare it against a digitized DNA scan stored in a database included on intelligent instrument 202. The DNA scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for DNA recognition, the CPU may utilize an existing database to compare the DNA scan by comparing nucleotides, code sequences, regulatory regions, initiation and stop codons, exon/intron borders, and/or any other characteristics of DNA. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as DNA recognition software and/or hardware systems to facilitate DNA scan comparisons, such as, for example Applied DNA Sciences.

Intelligent instrument 202 and/or any other third-party security vendor system used in connection with intelligent instrument 202 may additionally be configured with secondary security procedures to confirm that fake biometric samples are not being used. For example, to detect the use false DNA, system 1402 may be further configured to take a DNA sample directly off a user and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using hand geometry biometrics. As discussed herein, hand geometry biometrics may include recognition of hand geometry parameters, such as, for example, hand shape, finger length, finger thickness, finger curvature and/or any portion thereof. As discussed herein, these hand geometry features may be collectively referred to as a "hand geometry scan." Biometric security system 1402 may include a biometric sensor 1404 which may be configured with an infrared optical sensor, a three-dimensional imaging system and/or other hardware and/or software that facilitates capture of biometric data from the person such as, for example scanning, detecting or otherwise sensing a hand geometry scan of cardmember.

In one exemplary application of intelligent instrument 202 incorporating biometric security system 1402, system 1402 may capture the hand geometry scan of the cardmember to initiate the mutual authentication process between intelligent instrument 202 and intelligent instrument reader 204, and/or to provide verification of the user's identity. In one embodiment, biometric sensor 1404 of the security system 1402 may capture a hand geometry scan, when a user places his hand in front of an optical scanner. Biometric sensor 1404 may be in communication with IC 110 such that sensor 1404 receives the hand geometry scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the hand geometry scan based on hand geometry parameters and compare it against a digitized hand geometry scan stored in a database included on intelligent instrument 202. The hand geometry scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for hand geometry recognition, the CPU may utilize an existing database to compare hand shape, finger length, finger thickness, finger curvature and/or any other of the 90 different hand geometry parameters known in the art. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as hand geometry recognition software and/or hardware systems to facilitate hand geometry scan comparisons, such as, for example IR Recognition Services and Human Recognition Services.

Intelligent instrument 202 and/or any other third-party security vendor system used in connection with intelligent instrument 202 may additionally be configured with secondary security procedures to confirm that fake biometric samples are not being used. For example, to detect the use of false hands, system 1402 may be further configured to measure blood flow, to detect body heat and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using auditory emissions biometrics. As discussed herein, auditory emissions biometrics may include emissions that an ear generates when stimulated by sound, such as vibrations and reverberated sound waves and/or any portion thereof. As discussed herein, these auditory emissions features may be collectively referred to as an "auditory emissions scan." Biometric security system 1402 may include a biometric sensor 1404 which may be configured with an infrared optical sensor, an auditory sensor, an auditory generator and/or other hardware and/or software that facilitates the capture of biometric data from the person such as, for example sound generating, scanning, detecting or otherwise sensing an auditory emissions scan of cardmember.

In one exemplary application of intelligent instrument 202 incorporating biometric security system 1402, system 1402 may capture the auditory emissions scan of the cardmember to initiate the mutual authentication process between intelligent instrument 202 and intelligent instrument reader 204, and/or to provide verification of the user's identity. In one embodiment, biometric sensor 1404 of the security system 1402 may capture an auditory emissions scan, when a user hears an auditory stimulant and the user's auditory emissions may be detected by biometric sensor 1404. Biometric sensor 1404 may be in communication with IC 110 such that sensor 1404 receives the auditory emissions scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the auditory emissions scan based on emissions waveforms and compare it against a digitized auditory emissions scan stored in a database included on intelligent instrument 202. The auditory emissions scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for auditory emissions recognition, the CPU may utilize an existing database to compare emissions difference in frequency, wavelength, and/or other characteristics between the transmitted and reverberated sound waves. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as auditory emissions recognition software and/or hardware systems to facilitate auditory emissions scan comparisons, such as, for example those developed by the University of Southampton.

Intelligent instrument 202 and/or any other third-party security vendor system used in connection with intelligent instrument 202 may additionally be configured with secondary security procedures to confirm that fake biometric samples are not being used. For example, to detect the use of false auditory emissions scans, system 1402 may be further configured to detect electronic noise associated with a device producing electronic auditory emissions and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using olfactory biometrics. As discussed herein, olfactory biometrics may include odorants that a body generates when odor evaporates from and/or any portion thereof. As discussed herein, these odorants may be collectively referred to as a "smellprint." Biometric security system 1402 may include a biometric sensor 1404 which may be configured with an electronic sensor, a chemical sensor, and/or an electronic or chemical sensor configured as an array of chemical sensors, wherein each chemical sensor may detect a specific odorants, or smell. In another embodiment, biometric sensor 1404 may be configured as a gas chromatograph, spectrometer, conductivity sensor, piezoelectric sensor and/or other hardware and/or software that facilitates the capture of biometric data from the person such as, for example, scanning, detecting or otherwise sensing a smellprint of cardmember.

In one exemplary application of intelligent instrument 202 incorporating biometric security system 1402, system 1402 may capture the smellprint of the cardmember to initiate the mutual authentication process between intelligent instrument 202 and intelligent instrument reader 204, and/or to provide verification of the user's identity. In one embodiment, biometric sensor 1404 of the security system 1402 may capture a smellprint, when a user stands within at least two feet of sensor 1404. Biometric sensor 1404 may be in communication with IC 110 such that sensor 1404 receives the smellprint and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the smellprint and compare it against a digitized smellprint stored in a database included on intelligent instrument 202. The smellprint information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for smellprints, the CPU may utilize an existing database to compare the difference in molecular structures, chemical compounds, temperature, mass differences, pressure, force, and odorants by using statistical, ANN and neuromorphic techniques. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as smellprint recognition software and/or hardware systems to facilitate smellprint comparisons, such as, for example those developed by Company Mastiff Electronic Systems.

Intelligent instrument 202 and/or any other third-party security vendor system used in connection with intelligent instrument 202 may additionally be configured with secondary security procedures to confirm that fake biometric samples are not being used. For example, to detect the use of a false odorant, system 1402 may be further configured to detect man-made smells, abnormal odorants, body heat and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using keystroke/typing recognition biometrics. As discussed herein, keystroke/typing recognition biometrics may include recognition of the duration of keystrokes, latencies between keystrokes, inter-keystroke times, typing error frequency, force keystrokes and/or any portion thereof. As discussed herein, these features may be collectively referred to as a "keystroke scan." Biometric security system 1402 may include a biometric sensor 1404 which may be configured with an electronic sensor, an optical sensor, a keyboard, and/or other hardware and/or software that facilitates the capture of biometric data from the person such as, for example, scanning, detecting or otherwise sensing a keystroke scan of cardmember. A keyboard may include any type of input device, such as, for example, flat electronic pads with labels as keys, touch screens, and/or any other types of input devices.

In one exemplary application of intelligent instrument 202 incorporating biometric security system 1402, system 1402 may capture the keystroke scan of the cardmember to initiate the mutual authentication process between intelligent instrument 202 and intelligent instrument reader 204, and/or to provide verification of the user's identity. In one embodiment, biometric sensor 1404 of the security system 1402 may capture a keystroke scan, when a user types, for example, a PIN or pass phrase into a keyboard configured with sensor 1404. Biometric sensor 1404 may be in communication with IC 110 such that sensor 1404 receives the keystroke scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the keystroke scan based on keystroke characteristics and compare the scan against a digitized keystroke scan stored in a database included on intelligent instrument 202. The keystroke scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for keystroke scans, the CPU may utilize an existing database to compare the behavioral, temporal and physical characteristics associated with keystrokes. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as keystroke scan recognition software and/or hardware systems to facilitate keystroke scan comparisons, such as, for example those developed by BioPassword® by BioNet Systems, LLC.

Intelligent instrument 202 and/or any other third-party security vendor system used in connection with intelligent instrument 202 may additionally be configured with secondary security procedures to confirm that fake biometric samples are not being used. For example, to detect the use of a false keystroke, system 1402 may be further configured to detect body heat and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using iris scan biometrics. As discussed herein, iris scan biometrics may include recognition of characteristics of the colored tissues surrounding the pupil, such as the rings, furrows and freckles and/or any portion thereof. As discussed herein, these characteristics may be collectively referred to as an "iris scan." Biometric security system 1402 may include a biometric sensor 1404 which may be configured with a video camera, an optical scanner, a digital camera, a charge coupled device and/or other hardware and/or software that facilitates the capture of biometric data from the person such as, for example, scanning, detecting or otherwise sensing an iris scan of cardmember.

In one exemplary application of intelligent instrument 202 incorporating biometric security system 1402, system 1402 may capture the iris scan of the cardmember to initiate the mutual authentication process between intelligent instrument 202 and intelligent instrument reader 204, and/or to provide verification of the user's identity. In one embodiment, biometric sensor 1404 of the security system 1402 may capture an iris scan, when a user uses sensor 1404 to scan his iris while he may be up to five feet away from sensor 1404. Sensor 1404 may scan the user's iris through contacts, sunglasses, and/or any other type of eye glasses. Biometric sensor 1404 may be in communication with IC 110 such that sensor 1404 receives the iris scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the iris scan based on iris characteristics and compare the scan against a digitized iris scan stored in a database included on intelligent instrument 202. The iris scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for iris scans, the CPU may utilize an existing database to compare the surface patterns of the iris by localizing the boundaries and the eyelid contours of the iris and creating a phase code for the texture sequence in the iris. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as iris scan recognition software and/or hardware systems to facilitate iris scan comparisons, such as, for example those developed by Iridian, LG Electronics and BioCom.

Intelligent instrument 202 and/or any other third-party security vendor system used in connection with intelligent instrument 202 may additionally be configured with secondary security procedures to confirm that fake biometric samples are not being used. For example, to detect the use of a false iris, system 1402 may be further configured to vary the light shone into the eye to watch for pupil dilation, to detect body heat and/or any other secondary procedure to thwart biometric security fraud. After verifying the biometric information, intelligent instrument 202 and intelligent instrument reader 204 may begin authentication by the methods described herein.

In another exemplary embodiment, biometric security system 1402 may be configured for facilitating biometric security using retinal scanning biometrics. As discussed herein, retinal scanning biometrics may include recognition of characteristics of the reflected retinal pattern of the eye, such as the location, structure, size, and shape of blood vessels and/or any portion thereof. As discussed herein, these characteristics may be collectively referred to as a "retinal scan." Biometric security system 1402 may include a biometric sensor 1404 which may be configured with low-intensity light source, such as an infrared source, an optical coupler and/or other hardware and/or software that facilitates the capture of biometric data from the person such as, for example, scanning, detecting or otherwise sensing a retinal scan of cardmember.

In one exemplary application of intelligent instrument 202 incorporating biometric security system 1402, system 1402 may capture the iris scan of the cardmember to initiate the mutual authentication process between intelligent instrument 202 and intelligent instrument reader 204, and/or to provide verification of the user's identity. In one embodiment, biometric sensor 1404 of the security system 1402 may capture a retinal scan, when a sensor 1404 shines a light source into the user's retina and detects the reflected retina pattern. Sensor 1404 may detect a user's retinal pattern when the user may be up to five feet away from sensor 1404. Biometric sensor 1404 may be in communication with IC 110 such that sensor 1404 receives the retinal scan and transmits a signal to the CPU to facilitate activating the operation of intelligent instrument 202. A power source may be in communication with biometric sensor 1404 and IC 110 to provide the desired power for operation of the biometric security system components.

Intelligent instrument 202 may digitize the retinal scan based on retinal characteristics and compare the scan against a digitized iris scan stored in a database included on intelligent instrument 202. The retinal scan information may additionally be compared with information from one or more third-party databases communicating with intelligent instrument 202 through any communication software and/or hardware, including for example, intelligent instrument reader 204, a USB connection, a wireless connection, a computer, a network and/or any other means for communicating. The CPU may facilitate the local comparison to authenticate the biometric and validate the information. Any of the embodiments may alternatively or additionally include remote comparisons performed or controlled by one or more third-party security vendors.

For example, for retinal scans, the CPU may utilize an existing database to compare the blood vessel patterns of the retina by comparing stored and detected retinal patterns. This transfer of information may include use of encryption, decryption, security keys, digital certificates and/or other security devices to confirm the security of the sample. Intelligent instrument 202 may additionally communicate with third-party databases to facilitate a comparison between intelligent instrument 202 identifier and other intelligent instrument identifiers stored with the biometric samples. Further, the present invention anticipates use of one or more third-party devices such as retinal scan recognition software and/or hardware systems to facilitate keystroke scan comparisons, such as, for example those developed by EyeKey and Retinal Technologies.

Intelligent instrument 202 and/or any other third-party security vendor system used in connection with intelligent instrument 202 may additionally be configured with secondary security procedures to confirm that fake biometric samples are not being used. For example, to detect the use of a false retina, system 1402 may be further configured to vary the light shone into the eye to watch for pupil dilation, to detect body heat and/or any other secondary procedure to thwart biometric security fraud. After verifying the biometric information, intelligent instrument 202 and intelligent instrument reader 204 may begin authentication by the methods described herein.

Additionally, intelligent instrument 202 may be configured with a security verification mechanism to verify whether the sampled biometric and/or related information is staying on intelligent instrument 202 and/or reader 204. The security verification mechanism may be used to safeguard biometric information from getting lost and/or compromised on the host system.

In one embodiment, the sampled biometric data may be stored directly within intelligent instrument 202. For example, a digitized fingerprint scan is stored with intelligent instrument 202 such that a biometric reading may be obtained from the intelligent instrument 202, rather than from the subject. To further enhance the integrity of the biometric sample, practitioners will appreciate that, various known and future encryption techniques may be utilized. Moreover, the intelligent instrument 202 may store a modified credential.

In yet another embodiment, biometric validation is performed by the intelligent instrument 202 without requiring biometric data to be shared over a network. The Intelligent instrument 202 transmits a message indicating that a biometric was measured and that the read is valid. In accordance with this embodiment, the intelligent instrument 202 may replace the authorization server 306 by maintaining a local template of a biometric and validating the locally read biometric against it. Practitioners will appreciate that this may be favorable, as it does not require sensitive biometric data to be transmitted over a network, where it may become compromised.

Figure 16:
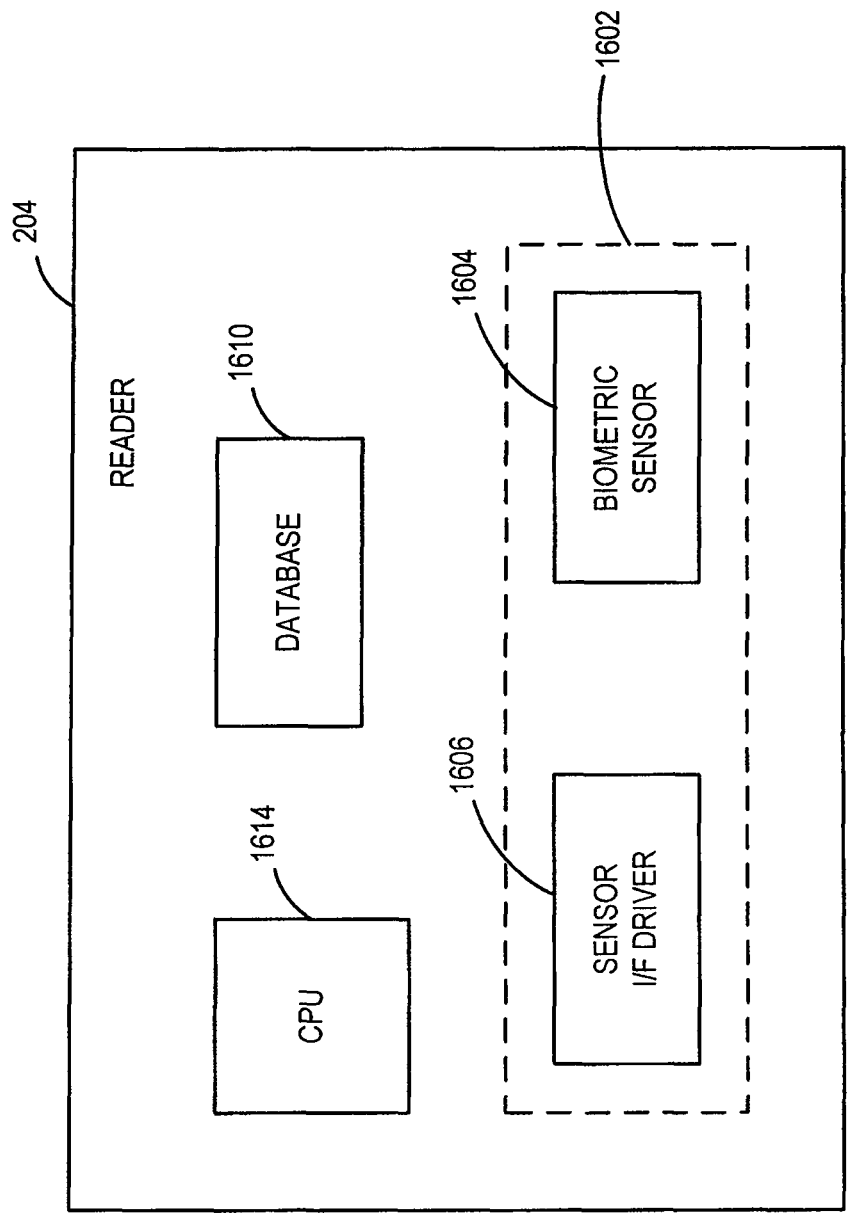
FIG. 16 illustrates an exemplary intelligent instrument reader configured with a security system, wherein the security system incorporates one or more biometric system.

In an additional or alternate embodiment, intelligent instrument reader 204 may include one or more security system, wherein the security system incorporates one or more biometric system. As shown in FIG. 16, intelligent instrument reader 204 includes a biometric security system 1602 configured for facilitating biometric security using a biometric sample. Biometric security system 1602 may include a biometric sensor 1604 which may be configured with a sensor, video camera, digital camera, optical scanner, light source and/or other hardware and/or software for acquiring biometric data form the person such as, for example, optical scanning, chemical sensing, or otherwise detecting the portion of cardmember. Biometric sensor 1604 may be in communication with a sensor interface/driver 1606 such that sensor interface 1606 receives biometric information and transmits a signal to the CPU to facilitate activating the operation of intelligent instrument 202.

In one exemplary application of intelligent instrument reader 204 including biometric security system 1602, the user may submit a biometric sample to the biometric sensor to initiate the mutual authentication process between intelligent instrument 202 and intelligent instrument reader 204, and/or to provide verification of the user's identity. Intelligent instrument reader 204 may digitize the sample and compare it against a digitized biometric sample stored in a database (e.g., database 1610) included on intelligent instrument reader 204. The biometric sample information may additionally be compared with information from one or more third-party databases communicating with intelligent instrument 202 through any communication software and/or hardware, including for example, intelligent instrument 202, a USB connection, a wireless connection, a computer, a network and/or any other means for communicating. The transfer of information may include use of encryption decryption, security keys, digital certificates and/or other security devices to confirm the security of the sample. Intelligent instrument reader 204 may additionally communicate with third-party databases to facilitate a comparison between intelligent instrument 202 identifier and other intelligent instrument identifiers stored with the biometric samples.

In accordance with another embodiment, when a user engages the biometric sensor, authorization server 306 facilitates creation of modified presented credentials via a one-way or cryptographic algorithm. A set of previously-created modified stored credentials (which, in one embodiment, are stored within database 130) are created by a one-way or cryptographic algorithm which may be the same or different as the one used for modification of the presented credentials. A credential validation procedure is used to test the consistency of the modified stored credentials vis-à-vis the modified received credentials. That is, a set of modified received credentials are received by authorization server 306, which then facilitates retrieving the corresponding set of modified stored credentials. Authorization server 306 facilitates a credential validation procedure as described in detail below. This algorithmic procedure tests for consistency by some means other than equality, e.g., performing pattern matching with some similarity threshold, operating with the modified credentials (stored and received) as input. Initial feature extraction may be applied in creation of the modified credentials from the raw biometric input. A variety of one-way functions and consistency tests may be employed in connection with this process.

In an embodiment of the invention, the one-way function is computed from the credential sets. Additionally, the formulation of the credential set itself from raw biometric or other input optionally involves feature extraction and/or other computation, depending on the nature of the input. Inputs may vary considerably across the embodiments and applications of the invention, and could simply be a sequence of responses to questions on a web form, and/or a set of extracted features such as handwriting features, retinal scan features, voice stress analysis features, fingerprint features, and any combination of these or other features. This feature extraction and other computation is referred to as preprocessing. For more information relating to credential validation procedures based on modified credentials, see U.S. patent application Ser. No. 10/331,459, entitled "METHODS AND APPARATUS FOR CREDENTIAL VERIFICATION", the entire contents of which are incorporated herein by reference.

An intelligent instrument reader CPU 1614 may facilitate the local comparison to authenticate the biometric sample and may validate the information. Reader CPU 1614 may be configured in a manner similar to that of the CPU. Any of the embodiments may alternatively or additionally include remote comparisons performed or controlled by third-party security vendors in any way known in the art for comparing biometric data.

Intelligent instrument reader 204 may also be configured with secondary security procedures biometric to confirm that fake biometric samples are not being used. For example, intelligent instrument reader 204 may be further configured to measure blood flow, body heat and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, and/or any other procedures known in the art for authenticating the authenticity of biometric samples. After verifying the biometric information, intelligent instrument 202 and intelligent instrument reader 204 may begin authentication, and the transaction may proceed accordingly.

Additionally, CPU 1614 may be configured with a security verification mechanism to verify whether the sampled biometric and/or related information is staying on intelligent instrument 202 and/or reader 204. The security verification mechanism may be used to safeguard biometric information from getting lost and/or compromised on the host system.

While the biometric safeguard mechanisms describe intelligent instrument 202 and/or intelligent instrument reader 204 configured with a biometric safeguard mechanism, any part of system 1400 may be equipped with a biometric safeguard system. For example, the invention contemplates receiving a biometric sample only at the reader, only at the intelligent instrument, at both the intelligent instrument and the reader, or at any other combination of location or device. As such, any scanner or database discussed herein may be located within or associated with another device. For example, the intelligent instrument may scan a user biometric, but the database used for comparison may be located within the reader or merchant server. In other embodiments, the biometric security device may be located away from the point of sale device and/or provide other functions. For example, the biometric security device may be located near the item to be purchased or located in any other location within or outside of the merchant. In one embodiment, the biometric security device may be located outside of a jewelry display to allow a user to not only start the authentication process before check-out, but also to allow access to the product within the display case. In this regard, the biometric security device may communicate the information to the point of sale device so access point 1450 may verify that the person that entered the jewelry box is the same person that is now buying the jewelry. In another embodiment, any portion of system 1400 may be configured with a biometric security device. The biometric security device may be attached and/or free-standing. Biometric security devices may be configured for local and/or third-party operation. For example, the present invention contemplates the use of third-party fingerprint scanning and security devices such as those made by Interlink Electronics, Keytronic, Identix Biotouch, BIOmetricID, onClick, and/or other third-party vendors.

In yet another embodiment, the database used for comparison may contain terrorist and/or criminal information. As used herein, terrorists and/or criminals may include terrorists, felons, criminals, convicts, indicted persons, insurgents, revolutionaries and/or other offenders. The information may include biometric information, personal information as described herein, arrest records, aliases used, country of residence, affiliations with gangs and terrorist groups, and/or any other terrorist and/or criminal information.

As an example of a secondary security procedure in accordance with the present invention, the biometric sensor 1404, 1604 may be configured to allow a finite number of scans. For example, biometric sensor 1404, 1604 may be configured to only accept data from a single scan. As a result, biometric sensor 1404, 1604 may turn off or deactivate intelligent instrument 202 and/or intelligent instrument reader 204 if more than one scan may be needed to obtain a biometric sample. Biometric sensor 1404, 1604 may also be configured to accept a preset limit of scans. For example, biometric sensor 1404, 1604 may receive three invalid biometric samples before it turns off and/or deactivates intelligent instrument 202 and/or intelligent instrument reader 204.

The sensor or any other part of system 1400 may also activate upon sensing a particular type or group of biometric samples. The activation may include sending a signal, blinking, audible sound, visual display, beeping, providing an olfactory signal, providing a physical touch signal, and providing a temperature signal to said user and/or the like. For example, if the sensor detects information from a gold card member, the system may display a special offer on access point 1450. If the sensor detects a repeat customer, the sensor may signal or notify a manager to approach the customer and thank them for their repeat business. In another embodiment, the system may send a signal to a primary account holder or any other person or device to notify them that the intelligent instrument is being used or that a condition or rule is being violated (e.g., charge above $1000).

Any of the biometric security systems described herein may additionally be configured with a fraud protection log. That is, a biometric security system, such as biometric security system 1402, 1602 may be configured to log all biometric samples submitted on intelligent instrument 202 and/or intelligent instrument reader 204 and store the log information on databases on and/or communicating with system 1402, 1602. If a new and/or different biometric sample is submitted that differs from the log data, biometric security system 1402, 1602 may employ a security procedure such as deactivation, warning authorities, requesting a secondary scan, and/or any other security procedure.

Biometric security system 1402, 1602 and/or the biometric security system configured with system 1400 may also be configured to obtain a plurality of biometric samples for verification and/or other security purposes. For example, after biometric security system 1402, receives a first biometric sample (e.g., scans one finger,) it may be configured to receive a second biometric sample (e.g., scans a second finger). The first and second biometric samples may be compared with stored biometric samples by any of the methods disclosed herein. The second biometric sample may be the only sample compared with stored biometric samples if the first sample may be unreadable or inadequate.

In yet another exemplary embodiment of the present invention, intelligent instrument 202 may be equipped with a biometric safeguard mechanism. For example, in one exemplary application of intelligent instrument 202, intelligent instrument 202 may use biometric security system 1402 to authorize a transaction that violates an established rule, such as, for example, a purchase exceeding an established per purchase spending limit, a purchase exceeding a preset number of transactions, any portion of a purchase and/or transaction involving non-monetary funds (e.g., paying a portion of the transaction with loyalty points, coupons, airline miles, etc.) and/or any other purchase and/or transaction exceeding a preset or established limit. Cardmember, a third-party issuer system a third-party financial system, a company and/or any other entity or system may establish the preset limits. The limits may be used to prevent fraud, theft, overdrafts, and/or other non-desirable situations associated with financial and non-financial accounts. For example, if intelligent instrument 202 is stolen and the thief tries to make a large purchase with the card, the biometric safeguard mechanism may prevent the purchase until cardmember's identity is verified by biometric means.

For example, intelligent instrument 202 may activate biometric security system 1402 to notify a user a user who is attempting to make a large purchase that the user must provide a biometric sample to verify the user's identity. By notifying, intelligent instrument 202 may be configured to provide an audible signal, visual signal, optical signal, mechanical signal, vibration, blinking, signaling, beeping, providing an olfactory signal, providing a physical touch signal, and providing a temperature signal to said user and/or provide any other notification to a cardmember. Accordingly, cardmember may provide such verification by submitting a biometric sample, for example placing his finger over biometric sensor 1404 and/or any other biometric security devices used in association with intelligent instrument 202. Biometric sensor 1404 may then digitize the biometric sample (e.g., fingerprint) and use the digitized sample for verification by any of the methods described herein. Once cardmember's identity and/or intelligent instrument 202 intelligent instrument chip identifier may be verified, intelligent instrument 202 may provide a transaction authorized signal to the CPU (and/or to IC 110) for forwarding to intelligent instrument reader 204. Intelligent instrument reader 204 may then provide the transaction authorized signal to access point 1450 in a similar manner as is done with conventional PIN driven systems and access point 1450 may process the transaction under the merchant's business as usual standard. If intelligent instrument 202 has been stolen, then cardmember's identity may not be verified and the transaction may be cancelled. Additionally, one or more further security procedures may be triggered, such as, for example, intelligent instrument 202 may deactivate, intelligent instrument 202 may send a notification to a security vendor, intelligent instrument 202 may be confiscated by the merchant and/or any other security procedures may be used.

In another exemplary embodiment, intelligent instrument reader 204 may be equipped with a biometric safeguard mechanism. For example, in one exemplary application of intelligent instrument reader 204, intelligent instrument reader 204 may use biometric security system 1602 to authorize a transaction that violates an established rule, such as, for example, a purchase exceeding an established per purchase spending limit, a purchase exceeding a preset number of transactions and/or any other purchase exceeding a preset or established limit. Cardmember, a third-party issuer system a third-party financial system, a company and/or any other entity or system may establish the preset limits. The limits may be used to prevent fraud, theft, overdrafts, and/or other non-desirable situations associated with financial and non-financial accounts. For example, if intelligent instrument 202 is stolen and the thief tries to make a large purchase with the card, the biometric safeguard mechanism may prevent the purchase until cardmember's identity is verified by biometric means.

In one example, where cardmember is using a company-issued intelligent instrument 202, intelligent instrument 202 may the have a pre-set limit of transactions that may be completed before biometric verification is required. If the user exceeds the transaction limit, intelligent instrument reader 204 may be configured to scan a biometric sample in order to verify the user's identity. Accordingly, the user may provide such verification by submitting a biometric sample, for example, by submitting a retinal scan to biometric sensor 1604. Intelligent instrument reader 204 may then digitize the biometric sample (e.g., retinal pattern) and use the digitized sample for verification by any of the methods described herein. Once cardmember's identity and/or intelligent instrument 202 intelligent instrument chip identifier may be verified, intelligent instrument reader 204 may receive a transaction authorized signal from a security vendor authorized to give such a signal. Intelligent instrument reader 204 may then provide the transaction authorized signal to access point 1450 in a similar manner as with conventional PIN driven systems and access point 1450 may process the transaction under the merchant's business as usual standard.

In accordance with one embodiment, intelligent instrument 202 may be associated with limited use parameters, which govern the use intelligent instrument 202. An exemplary online transaction process begins with the user desiring to purchase products and/or services from a merchant's website. The user selects products from a merchant's online website, is routed to and/or clicks to access the merchant's payment page. The user is hyperlinked (manually and/or automatically) to an account provider's web site to log in, which resides on and is managed by the account provider's user interface system (e.g., web server). Upon logging in, the user obtains a limited use PIN that may then be "cut and pasted," "dragged and dropped" (or alternatively, automatically filled by the issuer and/or downloaded from wallet application 406) into the payment on the payment web page. In alternative embodiments, the system includes one and/or more of the following: issuer sends the limited use PIN directly to the merchant, the limited use PIN is encrypted and/or encoded, the user enters additional security numbers and/or other indicia and/or a biometric sample is required from the issuer. In an exemplary embodiment, the limited use PIN is generated by authorization server 306 and database 310.

In response to authenticating the user during the log-in process, and receiving a request for the limited use PIN, a limited use PIN is generated. A user interface system prompts the initiation of the number generation process. The number generation process may be performed by an issuer of a transaction account, or any other designated third-party. In an exemplary random number generation process, the limited use PIN is generated (e.g., almost immediately) and provided to the user (almost contemporaneous with the user's request). As previously noted, this allows the number to be usable immediately upon receipt by the user without the need for separate activation (although separate activation features are contemplated by the present invention), while minimizing any increased risk of theft and/or fraud.

In this embodiment, an issuer is generally identified by a range of numbers stored on intelligent instrument 202, typically called the bank identification number (BIN). Each intelligent instrument 202 possesses a product identifier (e.g., first 2 digits of BIN, etc.) that is not part of the random number generation process, but in order to initiate the process, this number must first be selected The issuer may set aside a set of product identification numbers relating to limited use PINs for specific use with authorization server 306. Alternatively, however, some account providers may find it desirable to use a relationship to the same BIN number designation for both limited use PINs and regular PINs so that one cannot distinguish between the two types of numbers. A random number is generated by the transaction account provider using an algorithmic process. The transaction account provider verifies that the randomly generated number is available (i.e., it is not in use nor has it been used by a user within a certain period of time). If the limited use PIN is free (i.e., not in use), a check digit and the selected product identification number are appended to the number. This newly created limited use PIN is then associated with the user's intelligent instrument 202 and is provided to the user, whereupon a limited use PIN database is updated to reflect that this particular limited use PIN is in use and associated with intelligent instrument 202. If it is determined that the number is in use, the number generation process is repeated up to a preset number of times (e.g., 3). After attempting and failing to generate a non-used random number for a preset number of times, a non-used random number is physically selected from the limited use PIN database.

After a limited use PIN is generated, conditions of use parameters may be applied and associated with the limited use PIN. The limited use PIN is then distributed (i.e., issued) to the user for use in facilitating a transaction. Communication of limited use PIN may occur via a number of user interface systems. For example, an account provider interface may overlay a merchant's online payment page. The user selects the appropriate charge account (e.g., American Express®) from the credit type field and is then able to "cut and paste" and/or "drag and drop" the limited use PIN (present in the limited use PIN field) into the PIN field on the merchant's webpage. Finally, the user may select the appropriate expiration date and complete the transaction by selecting a "purchase now" button. Although this embodiment describes linking to a account provider's web site to receive the limited use PIN, an additional embodiment configures a user interface (e.g., web server) and limited use PIN transaction system to seamlessly interact with the merchant's website to eliminate the need to separately link to the issuer. In this instance, the generation and issuance of the limited use PIN would use the merchant as a gateway to the issuer.

Practitioners will appreciate that any number of interface systems may be used to facilitate the processes described above. For example, as just described, distribution of the limited use PIN may occur via a "server to desktop" arrangement where a connection is established between the account provider's web-server and the cardholder's desktop computer, using SSL 3.0. Accordingly, the number is generated by the application server (according to an algorithmic processing feature) utilizing a random number generation process and delivered to the web server. The number is then displayed on the user's desktop. While pre-registration is not required, in an exemplary embodiment, the user will have previously registered at the account provider's online web site, providing all required personal information, primary charge account numbers, and establishing user credentials (if not already established). The user credentials are then used for verification of the user's identity when logging into the account provider's web server.

Distribution of limited use PINs may also occur via a "server to IVR" arrangement, where the user calls the issuer in order to obtain the limited use PIN. In this embodiment, a voice response menu enables the user to select the transaction option, and allows the user to enter a main account number. Once identity is verified, a link to an application server is established, prompting generation and delivery of the limited use PIN over the phone. In this embodiment, the user provides authenticating information by providing date of birth (DOB), a biometric, etc. Once this verification number is matched to customer's records, the limited use PIN is distributed. Of course, this process would also work with a live operator arrangement.

Additional distribution embodiments include a number of different delivery vehicles to intelligent instrument 202. For example, a "server to wireless device" is used where a wireless phone with Internet browser is able to access the account provider's transaction site via the account provider's online service web site. A limited use PIN can be delivered via text and/or voice. Additionally, with the use of encryption keys, the wireless device can be used as payment vehicles (e.g., the limited use PIN is delivered from a user to a merchant and/or other customer with Blue Tooth and/or other beaming technology). Again, verification of identity can be accomplished by a variety of means, including a biometric read, cardholder ID and password, DOB, PIN number, SIM cards in phones, etc.

Another exemplary embodiment of the transaction system, utilizing one and/or more of the distribution arrangements above, includes situations where a Point-of-Sale (POS) terminal is not present (e.g., submitting the limited use PIN to a merchant such as, for example, a plumber at home). In this embodiment, the user may not have cash and/or may not want to provide her credit account code and/or PIN to the vendor due to concerns about unauthorized re-use. As such, the user calls the issuer seeking to obtain a limited use PIN with either pre-defined conditions of use and/or cardholder determined conditions of use. A voice recognition system asks for credit account code, the amount she wants to authorize, a merchant ID (e.g., SE number), and/or any other conditions of use. The voice recognition system communicates with the application server and, alternatively a Card Authorization System (CAS), to generate the limited use PIN. The limited use PIN is then transmitted to the user who in turn provides the limited use PIN to the merchant. Additionally, the merchant can also receive, if desired, an immediate call from the voice response unit to provide an approval code. One skilled in the art will appreciate that this system can be used in association with landline phones, cellular phones, pagers, handheld computers and/or any other PDA devices.

Another exemplary embodiment of the present invention where intelligent instrument 202 comprises a smart card system, RFID transponder ("fob") system and/or similar portable data device, intelligent instrument 202 operates to generate and/or distribute a limited use PIN to the account provider and/or the merchant. The intelligent instrument 202 may facilitate the generation of the limited use PIN in a number of different ways. In one embodiment, intelligent instrument 202 generates the limited use PIN from a self-contained processing chip. In another embodiment, intelligent instrument 202 interfaces with an account provider's user interface system to cause the issuer to generate a number. In another embodiment, intelligent instrument 202 supports interaction with a merchant's transaction processing system.

In an online embodiment, the user installs a intelligent instrument reader and/or transponder reader and associated software to be used with the user's computer system that is capable of connecting to the Internet. When desiring to make an online purchase, the user interfaces intelligent instrument 202 with an intelligent instrument reader and enters an appropriate PIN. Once properly authenticated, an account provider transaction system generates and issues a limited use PIN to the user. In another embodiment, the merchant may have a intelligent instrument reader capable of interfacing with the user's intelligent instrument 202. In this embodiment, the interfaces the intelligent instrument 202 with the merchant's reader and the limited use PIN is displayed to the merchant. Additional information relating to limited use PIN payment technology is disclosed in Ser. No. 10/711,827, filed on Oct. 7, 2004. Additional information relating to smart card and smart card reader payment technology is disclosed in U.S. Patent Application No. 60/232,040, filed on Sep. 12, 2000, and U.S. Pat. Nos. 5,742,845; 5,898,838 and 5,905,908, owned by Datascape; which are hereby incorporated by reference. Additional information relating to fobs and transponder reader payment technology is disclosed in U.S. patent application Ser. No. 10/340,352 filed on Jan. 10, 2003; U.S. patent application Ser. No. 10/192,488, filed on Jul. 9, 2002; U.S. patent application Ser. No. 10/318,432, filed Dec. 13, 2002; U.S. patent application Ser. No. 10/318,480, entitled filed Dec. 13, 2002; and, U.S. Provisional Patent Application No. 60/396,577 filed Jul. 16, 2002. All of the above applications are hereby incorporated by reference.

In yet another embodiment, an issuer of a transaction account, or any other designated third-party, assigns a pool of limited use account identifiers (e.g., PIN and/or transaction account code) to a user. In this example, the process may be performed when a company initially registers to participate in a purchasing program pursuant to embodiments of the present invention. The process commences when a user requests to open a master account having access to a pool of limited use account identifiers to be associated with intelligent instrument 202 for use with individual transactions.

In some embodiments, in order to determine an appropriate number of limited use account identifiers to assign to the pool, an account issuer, issuer processor and/or account management system may analyze a transaction history of the user. From the transaction history, the issuer may determine the user's average number of purchase transactions within a particular time period, such as day, month or year. The issuer may also determine the highest peak number of transactions within such time period. The number of limited use account identifiers to be assigned may then be set to exceed the determined peak and/or average usage. In other embodiments, the number of limited use transaction identifiers may be assigned based on an expected or projected transaction volume.

A pool of individual limited use account identifiers is assigned to or associated with the user's master account. The limited use account identifiers selected, in some embodiments, may each be a unique code. In certain embodiments, the first few digits of the limited use account identifier may serve as a BIN or the like for identifying the account issuer. During this assigning step, the account issuer may confirm that each limited use account identifier is not assigned to another user.

In one embodiment, the limited use account identifiers are each formatted as payment card numbers, allowing them to be processed and routed using existing payment networks. Any or all of the master account numbers and the limited use account numbers may be formatted pursuant to card association or financial institution rules. For example, the account numbers may be a sixteen-digit number (as used by Master-Card) or a fifteen-digit number (as used by American Express). For example, the first five to seven digits may be reserved for processing purposes and identify the issuing bank and card type. The last digit may be used as a check sum, while the intermediary digits are used to uniquely identify a particular account. Those skilled in the art will recognize that other conventions and formats may also be used.

An account management system (e.g., operating in conjunction with an issuer or issuer processor) may be operated to periodically review data files received from the user to determine the need for further limited use account identifiers and to reissue cleared identifiers. This may be performed by setting a threshold number or percentage of used identifiers for a user. By referencing an account management system database, a determination may be made whether the percentage of used cards exceeds the established threshold.

Further limited use account identifiers may be associated with a master account if a threshold usage of limited use account identifiers has been exceeded. In such case, the list of available limited use account identifiers will be updated for the client. The management system database may then be updated to reflect the new number of limited use account identifiers available. The usage of limited use account identifiers by the user may be periodically monitored and limited use account identifiers may be added as necessary. For more information regarding limited use account identifiers, see U.S. Pat. No. 6,901,387, filed on Jun. 14, 2002, the entire contents of which are incorporated herein by reference.

In another embodiment, the disclosed limited use account identifiers that are associated with intelligent instrument further enables the user to purchase multiple items from a merchant, where partial shipments are required. For example, for a purchase order submitted to a merchant including ten items; the merchant may only have six of the ten items in stock. The use of the limited use identifiers enables a merchant to charge the user's payment account for each of a series of partial shipments.

Specifically, this embodiment includes the receipt, by a merchant, of a purchase request for a purchase involving multiple items having a total purchase price and having an associated account identifier provided to allow the merchant to charge the purchase price to a payment account associated with the account identifier. For example, a merchant receives details of a purchase order for 10 computer systems for $10,000. The merchant also receives information identifying the account identifier associated with the purchase order (which is associated with a pre-authorization record specifying the pre-authorization criteria associated with the transaction).

The merchant determines that it wishes to perform a partial shipment and generates an authorization request for a portion of the total. In this example, the merchant 108 may determine that it only has two computer systems currently available, and that other systems will become available in the near future. To begin satisfying the purchase order, the merchant may determine that it desires to ship the first two systems. This includes generating an authorization request for $2,000 and submitting the authorization request, via the appropriate payment processing networks, to a transaction account issuer (or issuer processor) associated with the account identifier.

Different transaction account issuers may have different rules regarding the information to be included in an authorization request, and different information may, accordingly, be transmitted in an authorization request. In general, however, a typical authorization request includes an identification of the merchant, an identification of the account identifier, and an identification of the transaction amount to be authorized.

This information is received by an authorizing entity. The authorizing entity uses the information to identify the transaction as involving a pre-authorized account identifier (e.g., by performing a table look-up, by identifying a BIN or other information associated with the account identifier, etc.). The authorizing entity retrieves the pre-authorization record (or information) associated with the account identifier received in the authorization request. The transaction is authorized if the transaction information received in the authorization request is in compliance with the pre-authorization criteria in the pre-authorization record. In the example above, the authorization request for $2,000 will be authorized if the authorization request is from the correct merchant and is received prior to the expiration date of the account identifier (and prior to the expiration date of the pre-authorization record associated with the account identifier). The authorization approval is then transmitted to the merchant.

The merchant receives an authorization approval and performs the partial shipment (e.g., in the example, by delivering the two computer systems to the customer). The merchant then posts settlement information based on the authorized amount. The authorization entity applies partial ship logic to determine if the transaction authorized was a partial shipment. In some embodiments, this may include first determining the difference between the original pre-authorized amount and the authorized amount. In the example, the authorizing entity may determine that out of a total pre-authorized amount of $10,000, only $2,000 was authorized, leaving an unused amount of $8,000. In some embodiments, the process may also include identifying the unused amount as a percentage of the total (in the example, 80% remains unused).

In one embodiment, the process may also include identifying a particular set of client rules associated with the account identifier. For example, each user may establish or otherwise specify one or more sets of rules defining how some (or all) partial shipments should be handled. This may include identifying the user (e.g., based on the BIN and/or other information contained in the account identifier) and then identifying the user's partial shipment rules. The user may specify rules that apply in certain situations and adopt generic rules in other situations. As a specific example, one user may establish a rule which specifies that a transaction involving one of its account identifiers is to be considered a "partial shipment" if the unused amount of a pre-authorized amount is greater than or equal to 10% of the pre-authorized amount. For example, if a pre-authorization is set up for $100 and a transaction for $89 is authorized, the remaining unused amount of $11 will be considered sufficient to treat the transaction as involving a partial shipment.

A second user may establish a rule specifying that a transaction involving one of its account identifiers is to be considered a "partial shipment" if the unused amount of a pre-authorized amount is greater than or equal to 20% of the pre-authorized amount. Using the same example as above, a transaction for $89 (associated with a $100 pre-authorization) will not be considered to involve a "partial shipment" (because the unused amount is less than 20% of the pre-authorized amount).

Those skilled in the art will appreciate that other partial shipment logic may also be used to identify and process authorizations involving partial shipments. For example, a party (such as the user) may specify that a partial shipment is one having an authorized amount which is less than or equal to a percentage of the total pre-authorized amount. As another example, a party may specify that a partial shipment is one having an authorized amount which is less than or equal to a percentage of the total pre-authorized amount, but which must be greater than a threshold amount. For example, the party may specify that if the difference between the authorized amount(s) and the pre-authorized amount is less than $x, that the account identifier will be closed and that no further transactions may be authorized against the account identifier. As yet another example, a party may specify that in no event will more than a pre-established number of partial shipments be associated with a single account identifier (e.g., a maximum of 10 partial shipments may be specified). Those skilled in the art will appreciate that other techniques and rules may be established to identify transactions as involving partials. For example, while some illustrative rules have been described which identify partials based on the unused amount, other rules may be established which identify partials based on the portion of the pre-authorized amount which has been used.

A determination is made whether the transaction authorized was a partial shipment. This determination may be made based on the percentage amount, the unused amount, or other criteria. In one embodiment, the shipment is a partial shipment if the percentage amount unused is greater than a threshold amount specified by an issuer of the account identifier (which may be specified by the issuer in conjunction with one or more merchants and/or one or more customers). For example, the issuer (or the user associated with the account identifier) may have specified that any unused percentage that is greater than 15% is deemed to be a partial shipment. Thus, the shipment will be deemed to be a partial shipment, and processing will continue. Those skilled in the art will appreciate that the threshold may be selected to accommodate variations in price, shipping, etc. If processing indicates that the shipment was not a partial shipment, the transaction is complete and no further transactions associated with the account identifier and the pre-authorization will be authorized. In one embodiment, the account identifier may need to be recycled to make it available for further use (e.g., in embodiments using techniques as described in co-pending patent application Ser. No. 10/391,689, the entire contents of which are incorporated herein by reference.

Where the shipment is a partial shipment, the authorization entity acts to cause a new pre-authorization record to be created for the account identifier. This may be performed in a number of ways. For example, the authorization entity is the account issuer or an issuer processor or other agent acting on behalf of the issuer and the entity has responsibility for managing pre-authorization records as described herein. In such an embodiment, the issuer (or the issuer processor) is able to cause the creation of a new pre-authorization record and does so. The new pre-authorization record may be created using some of the same information as the original pre-authorization record (e.g., such as the same expiration date, the same merchant identifier, etc.), and some new information (e.g., such as a new start date equal to the current date, and a new pre-authorized amount which is equal to the unused amount). The user (or an issuer or other entity) may specify that the expiration date of the new pre-authorization record is different than the expiration date of the original pre-authorization record. For example, a user may specify that a new pre-authorization record which is created based on a partial shipment will have an expiration date that expires a period of time after the original expiration date or a period of time after a partial authorization is received. As a specific example, a user may specify that all new pre-authorization records created based on partial shipments have an expiration date which is five (5) days later than the original expiration date. In this manner, user's can ensure that all partial shipments are fully completed prior to the expiration date of a pre-authorization record.

Once this new pre-authorization record is established, the merchant can submit an additional authorization request for a further partial shipment associated with the purchase order and the account identifier (or for a final shipment to complete the purchase order).

In some embodiments, processing partial shipments may involve interaction between several entities such as an issuer (or issuer processor) and an entity operating an account management system or other systems used to manage pre-authorizations and/or the use of account identifiers. For example, responsibility for authorizing the creation of a new pre-authorization record may be vested in an entity other than the issuer or issuer processor. That is, a separate entity may operate some or all of the functions associated with a pre-authorization system. This may include the generation and transmission of a request message from the issuer (or issuer processor) to the entity responsible for authorizing the creation of a new record. If appropriate, the entity will authorize the creation and the new pre-authorization record will be created as described above. For more information regarding the creation of preauthorization records for partial shipments, see U.S. patent application Ser. No. 10/724,940, filed on Dec. 1, 2003, the entire contents of which are incorporated herein by reference.

In another embodiment, a user may interact with intelligent instrument 202 in advance of facilitating a purchase transaction. Accordingly, the user provides intelligent instrument 202 with a biometric sample, which is converted to biometric data by intelligent instrument 202 and transmitted to authorization server 306. Authorization server 306 verifies the biometric data as disclosed herein, and transmits a secure token to user's intelligent instrument 202. The secure token then allows the user to facilitate a purchase transaction based on the secure token, without requiring communication between the merchant and the authorization server 306. In accordance with this embodiment, the user may define limited use terms, as described above, for the use of the token in facilitating purchase transactions. For example, upon providing the biometric sample, the user my define use parameters to indicate that the secure token should only be valid for a single purchase, a purchase within a predefined amount, a purchase made before a defined date, and the like. When authorization server 306 receives and verifies the biometric data, the secure token is configured in accordance with the use parameters and transmitted to the intelligent instrument 202.

In another embodiment, the secure token is configured to enable authorization of a purchase transaction without "calling home" for authorization. In other words, the secure token may be configured to authorize a purchase of less than $1,000. When the secure token is requested, the authorization server 306 confirms that the transaction account has at least $1,000 of available credit. Based on this confirmation, there is no need to require a merchant to process the purchase transaction request through a CAS. As such, the secure token may reduce payment network traffic and increase transaction speed and efficiency.

Similar to the use of the secure token as described above, a user may interact with intelligent instrument 202 in advance of facilitating a purchase transaction to obtain a program which is used to facilitate purchase transactions. Accordingly, the user provides intelligent instrument 202 with a biometric sample, which is converted to biometric data by intelligent instrument 202 and transmitted to authorization server 306. Authorization server 306 verifies the biometric data as disclosed herein, and transmits the program to intelligent instrument 202. The program then allows the user to facilitate a purchase transaction based on the rules associated with the program, without necessarily requiring communication between the merchant and the authorization server 306.

While the biometric safeguard mechanisms described herein use fingerprint scanning and retinal scanning for biometric sample verification for exemplification, any biometric sample may be submitted for verification, authorization and/or any other safeguard purpose. For example the present invention contemplates the use of voice recognition, facial and/or ear recognition, signature recognition, vascular patterns, DNA sampling, hand geometry, auditory emissions recognition, olfactory recognition, keystroke/typing recognition, iris scans, and/or any other biometric known in the art.

In another exemplary embodiment of the present invention, one or more biometric samples may be used to sign and/or encrypt information. For example, intelligent instrument 202 and/or reader 2500 may be configured to receive a biometric sample from a user. The sample may then be digitized and used, for example, as a variable in an encryption calculation to secure data. If the user wants to retrieve the encrypted data, the user must submit the relevant biometric sample and have it authenticated by any of the methods described herein. Once the biometric sample is authenticated, the data will be decrypted for access.

Similarly, a biometric may be used as both a private key and a public key for encryption purposes. In one exemplary embodiment, an entity may use stored biometric sample information to encrypt data in a manner similar to a public key. The data may then be configured such that it is only accessible by a real biometric sample, for example, by a user proffering a fingerprint sample at a reader. Upon verification of the real biometric sample, the data may be decrypted and/or retrieved.

In an embodiment, and as described in additional detail above, a biometric sample may be used as a basis for generating a public/private key pair. For example, a challenge response may be encrypted with a private key based on a biometric sample, and decrypted with the corresponding public key. In other words, a challenge response may be digitally signed with an encryption key that is generated based on, or seeded with, biometric sample data. In addition, a public key may be used to encrypt the data associated with a challenge response. That is, rather than encrypting a challenge response with a private key based on a biometric sample to form a digital signature, the data comprising the challenge response may be encrypted with a public key based on the biometric sample. In this case, the data may, of course, be decrypted at the server using the corresponding private key. Thus, a biometric sample may be used at a client both as a private key as well as a public key, depending upon whether it is used as the basis for a digital signature or as the basis for encrypting the data so that it remains safe from all but the intended recipient.

While the exemplary embodiments describe herein make reference to identification, authentication and authorization processes, it should be understood that the biometric security systems and methods described herein may be used for identification purposes only, authentication purposes only, and/or authorization purposes only. Similarly, any combination of identification, authentication and/or authorization systems and methods may be used in conjunction with the present invention.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, when a phrase similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method comprising:
   transmitting, by a computer-based system for conducting a transaction, a challenge to a client device having an intelligent token, wherein said intelligent token generates a challenge response that is encrypted with a public key and digitally signed with a private key that is based on biometric data representing a biometric sample;
   receiving, by said computer-based system, said challenge response;
   verifying, by said computer-based system, said digital signature associated with said challenge response;
   decrypting, by said computer-based system, said challenge response;
   verifying, by said computer-based system, said biometric data;
   assembling, by said computer-based system and based on features of said biometric data, credentials in response to verifying said challenge response, wherein said assembling includes encrypting said credentials;
   storing, by said computer-based system, said assembled credentials;
   transmitting, by said computer-based system, said assembled credentials to said client device;
   receiving, by said computer-based system, a request from said client device that includes at least a portion of said assembled credentials;
   validating, by said computer-based system, said assembled credentials by matching received values of said assembled credentials to stored values of said assembled credentials; and
   providing, by said computer-based system, access to a transaction service in response to said validating.

2. The method of claim 1, wherein said biometric sample comprises an image of a facial feature.

3. The method of claim 1, wherein said biometric sample is acquired by said client device.

4. The method of claim 1, wherein said client device comprises a mobile communication device equipped with a digital camera.

5. The method of claim 1, wherein said computer-based system is a trusted third-party server.

6. The method of claim 1, wherein said assembled credentials comprise a security token with which said client device may access said transaction service regardless of responding to said challenge.

7. The method of claim 1, wherein said providing access to said transaction service is further in response to a limited use Personal Identification Number (PIN).

8. The method of claim 7, further comprising:
   identifying, by said computer-based system, a primary account having an associated account number;
   receiving, by said computer-based system and from an intelligent token, a request for said limited use PIN;
   associating, by said computer-based system, said limited use PIN with said primary account;
   issuing, by said computer-based system, said limited use PIN to said intelligent token to facilitate said access to said transaction service;
   receiving, by said computer-based system, transaction information for authorization, wherein the transaction information includes said limited use PIN;
   processing, by said computer-based system, said transaction information to determine whether said transaction information includes said limited use PIN and interfacing with a limited use PIN system to determine whether authorization is appropriate, wherein authorization determination includes:
     receiving, by said computer-based system, account information associated with said account number;
     determining, by said computer-based system, whether conditions-of-use parameters associated with said limited use PIN are satisfied, the conditions-of-use parameters defining at least a predetermined restriction on use of the limited use PIN;
     issuing, by said computer-based system, an appropriate approval code, in response to conditions of use parameters associated with the limited use PIN and the primary account being satisfied; and
     declining, by said computer-based system, the authorization request in response to the conditions associated with the primary account and the limited use PIN not being satisfied.

9. The method of claim 1, further comprising:
establishing, by said computer-based system, a master account for said client device;
assigning, by said computer-based system, a pool of limited use account identifiers that correspond to said master account prior to a purchase by said client device, said pool of limited use account identifiers including a plurality of limited use account identifiers each identifying a separate financial account at an issuer, each formatted for processing by payment card networks, and each issued without an associated with an intelligent device, each of said pool of limited use account identifiers being different from said master account identifier;
receiving, by said computer-based system and from said client device, a request for a purchase of an item from a merchant;
identifying, by said computer-based system, said pool of limited use account identifiers associated with said client device; and
assigning, by said computer-based system, one of said plurality of limited use account identifiers from said pool for use by said client device to access said transaction service.

10. The method of claim 1, further comprising:
receiving, by said computer-based system, an initial authorization request, said initial authorization request including transaction information identifying a transaction including merchant information, an account identifier corresponding to a financial account, and a transaction amount;
identifying, by said computer-based system, a pre-authorization record associated with said account identifier;
determining, by said computer-based system, that said transaction amount complies with authorization criteria including a pre-authorized amount in said pre-authorization record, wherein said pre-authorization record corresponds to a predetermined purchase transaction;
transmitting, by said computer-based system, an authorization message to said merchant;
determining, by said computer-based system and based on said transaction information, that said transaction involves a partial shipment; and,
at least one of: updating, by said computer-based system, said pre-authorization record or creating, by said computer-based system, a new pre-authorization record in response to said transaction involving said partial shipment.

11. The method of claim 1, wherein said verifying said challenge response comprises processing said response to verify an intelligent token.

12. The method of claim 1, further comprising receiving, by said computer-based system, a registration of a biometric sample, wherein said registration comprises a proffered biometric sample.

13. The method of claim 12, wherein said receiving said registration further comprises processing database information contained in at least one of: said intelligent token, an intelligent token reader, a biometric sensor, a remote server, or a merchant server.

14. The method of claim 13, wherein said comparing further comprises comparing said proffered biometric sample to said stored biometric sample by using at least one of a third-party security vendor device or a local CPU.

15. The method of claim 1, wherein said biometric sample comprises at least a portion of one of: voiceprint, fingerprint, facial features, ear features, sound signature, handwriting signature, vascular patterns, DNA, hand geometry, smell, keystroke/typing features, iris, retina, and brainwaves.

16. The method of claim 1, wherein said biometric sample is primarily associated with first user information, wherein said first user information comprises personal information, charge card information, debit card information, savings account information, membership information, PayPal account information, Western Union Account information, electronic bill payment information, automatic bill payment information and loyalty point information, and wherein said biometric sample is secondarily associated with at least one of second user information, wherein said second information comprises personal information, credit card information, debit card information, savings account information, membership information, PayPal account information, Western Union Account information, electronic bill payment information, automatic bill payment information and loyalty point information, and wherein said second user information is different than said first user information.

17. The method of claim 1, further comprising issuing, by said computer-based system, a secure token to said client device based on said validating, wherein said secure token at least one of: enables said transaction in accordance with rules associated with said secure token or enables authorization of said transaction independent of a transaction account issuer.

18. The method of claim 1, wherein said transaction service includes at least one of: access to view electronic file, access to download an electronic file, or a purchase authorization.

19. An article of manufacture including a non-transitory, tangible computer readable storage medium having instructions stored thereon that, in response to execution by a computer-based system for conducting a transaction, cause said computer-based system to perform operations comprising:
transmitting, by said computer-based system, a challenge to a client device having an intelligent token, wherein said intelligent token generates a challenge response that is encrypted with a public key and digitally signed with a private key that is based on biometric data representing a biometric sample;
receiving, by said computer-based system, said challenge response;
verifying, by said computer-based system, said digital signature associated with said challenge response;
decrypting, by said computer-based system, said challenge response;
verifying, by said computer-based system, said biometric data;
assembling, by said computer-based system and based on features of said biometric data, credentials in response to verifying said challenge response, wherein said assembling includes encrypting said credentials;
storing, by said computer-based system, said assembled credentials;
transmitting, by said computer-based system, said assembled credentials to said client device;
receiving, by said computer-based system, a request from said client device that includes at least a portion of said assembled credentials;
validating, by said computer-based system, said assembled credentials by matching received values of said assembled credentials to stored values of said assembled credentials; and
providing, by said computer-based system, access to a transaction service in response to said validating.

20. A system comprising:

a processor for conducting a transaction, a tangible, non-transitory memory configured to communicate with said processor, said tangible, non-transitory memory having instructions stored thereon that, in response to execution by said processor, cause said processor to perform operations comprising:

transmitting, by said processor, a challenge to a client device having an intelligent token, wherein said intelligent token generates a challenge response that is encrypted with a public key and digitally signed with a private key that is based on biometric data representing a biometric sample;

receiving, by said processor, said challenge response;

verifying, by said processor, said digital signature associated with said challenge response;

decrypting, by said processor, said challenge response;

verifying, by said processor, said biometric data;

assembling, by said processor and based on features of said biometric data, credentials in response to verifying said challenge response, wherein said assembling includes encrypting said credentials;

storing, by said processor, said assembled credentials;

transmitting, by said processor, said assembled credentials to said client device;

receiving, by said processor, a request from said client device that includes at least a portion of said assembled credentials;

validating, by said processor, said assembled credentials by matching received values of said assembled credentials to stored values of said assembled credentials; and providing, by said processor, access to a transaction service in response to said validating.

* * * * *